US009861916B2

(12) United States Patent
Lin et al.

(10) Patent No.: US 9,861,916 B2
(45) Date of Patent: Jan. 9, 2018

(54) LIQUID RECOVERY FILTER

(71) Applicants:ZhenWu Lin, Pasadena, CA (US);
Jacob Andrews, Washington, DC (US);
Hannah C. Hertrick, Ashburn, VA (US)

(72) Inventors: ZhenWu Lin, Pasadena, CA (US);
Jacob Andrews, Washington, DC (US);
Hannah C. Hertrick, Ashburn, VA (US)

(73) Assignee: Saint-Gobain Performance Pastics Corporation, Solon, OH (US)

( * ) Notice: Subject to any disclaimer, the term of this patent is extended or adjusted under 35 U.S.C. 154(b) by 329 days.

(21) Appl. No.: 14/521,437

(22) Filed: Oct. 22, 2014

(65) Prior Publication Data

US 2015/0041380 A1 Feb. 12, 2015

Related U.S. Application Data

(63) Continuation-in-part of application No. 13/460,583, filed on Apr. 30, 2012, and a continuation-in-part of
(Continued)

(51) Int. Cl.
*B01D 35/16* (2006.01)
*B01D 29/90* (2006.01)
(Continued)

(52) U.S. Cl.
CPC ......... *B01D 35/16* (2013.01); *B01D 19/0031* (2013.01); *B01D 29/21* (2013.01);
(Continued)

(58) Field of Classification Search
CPC ........ B01D 35/16; B01D 29/52; B01D 29/58; B01D 35/30; B01D 19/0031; B01D 29/21; B01D 29/90; B01D 36/001
(Continued)

(56) References Cited

U.S. PATENT DOCUMENTS 4,126,559 A 11/1978 Cooper
4,361,483 A 11/1982 Pall
(Continued)

FOREIGN PATENT DOCUMENTS

CN 201006357 Y 1/2008
CN 201208523 Y 3/2009
(Continued)

OTHER PUBLICATIONS

Website, www.entegris.com/Resources/Images/15171.pdf, data sheet for Entegris Torrento High-Flux, High-Retention Filters, 15 sheet printed from the Internet on Nov. 23, 2011.
(Continued)

*Primary Examiner* — Madeline Gonzalez
(74) *Attorney, Agent, or Firm* — Lorusso & Associates

(57) ABSTRACT

A liquid recovery filter assembly for recovering filtered liquid trapped within a core or downstream side of a filter element. Multiple embodiments each include a recovery port and a recovery filter in fluid communication with the core or downstream side of the filter element. The recovery port is opened following filtration operations to permit and to facilitate filtered liquid to flow from a downstream or outlet port, thus allowing recovery of liquid remaining in the filter core or downstream side following filtering operations. The recovery filter permits the introduction of pressurized gas to force the filtered liquids from the filter assembly without compromising the sterility and/or non-contaminant condition of the liquid. Additional aspects include exchangeable filter cartridges or filter elements in single and multi-round configurations, embodiments with aspiration tubes and dip tubes and still others with hydrophilic/hydrophobic recovery filters that function as filters and as valves for the recovery port.

31 Claims, 39 Drawing Sheets

Related U.S. Application Data application No. PCT/US2013/037671, filed on Apr. 23, 2013.

(60) Provisional application No. 61/992,029, filed on May 12, 2014.

(51) Int. Cl.
  B01D 36/00 (2006.01)
  B01D 19/00 (2006.01)
  B01D 29/21 (2006.01)
  B01D 35/30 (2006.01)
  B01D 29/52 (2006.01)
  B01D 29/58 (2006.01)

(52) U.S. Cl.
  CPC ............ B01D 29/52 (2013.01); B01D 29/58 (2013.01); B01D 29/90 (2013.01); B01D 35/30 (2013.01); B01D 36/001 (2013.01)

(58) Field of Classification Search
  USPC ....... 210/435–438, 440, 443, 446, 472, 120, 210/248, 457
  See application file for complete search history.

(56) References Cited

U.S. PATENT DOCUMENTS

| | | | |
|---|---|---|---|
| 4,411,791 A | 10/1983 | Ward | |
| 5,328,609 A | 7/1994 | Magnusson et al. | |
| 5,462,679 A | 10/1995 | Verdegan et al. | |
| 5,776,342 A * | 7/1998 | Hiranaga | B01D 27/005 210/442 |
| 5,928,523 A | 7/1999 | Hobrecht et al. | |
| 6,168,722 B1 | 1/2001 | Olsen et al. | |
| 6,294,090 B1 | 9/2001 | Nussbaumer et al. | |
| 6,517,711 B1 | 2/2003 | Rummler et al. | |
| 6,602,412 B2 | 8/2003 | Garber | |
| 7,281,632 B2 | 10/2007 | Zia | |
| 7,404,493 B2 | 7/2008 | Nozaki | |
| 8,110,412 B2 | 2/2012 | Lansford | |
| 2002/0056675 A1 * | 5/2002 | Hegde | B01D 19/0031 210/188 |
| 2005/0172808 A1 | 8/2005 | Yi | |
| 2007/0017879 A1 | 1/2007 | Proulx et al. | |
| 2008/0060992 A1 | 3/2008 | Komine et al. | |
| 2008/0121583 A1 | 5/2008 | Nohren | |
| 2009/0001019 A1 | 1/2009 | Frometa et al. | |
| 2009/0184063 A1 | 7/2009 | Brennan et al. | |
| 2009/0194475 A1 | 8/2009 | Norris et al. | |

FOREIGN PATENT DOCUMENTS

| | | |
|---|---|---|
| CN | 201997161 U | 10/2011 |
| GB | 2140699 | 12/1984 |
| JP | 08-192006 | 7/1996 |
| JP | 2001276515 | 10/2001 |
| JP | 2003210912 | 7/2003 |
| JP | 2008-501512 | 1/2008 |
| JP | 2009544426 | 12/2009 |
| WO | WO 2011/085012 A2 | 7/2011 |
| WO | WO 2012/136801 A1 | 10/2012 |

OTHER PUBLICATIONS

Website, www.pall.com/pdfs/Microelectronics/MEHITKCEN.pdf, UltiKleen G3 and G2 Hit KC Assemblies, description, specifications, performanc and ordering information, 6 sheets printed from internet on Nov. 23, 2011.

* cited by examiner

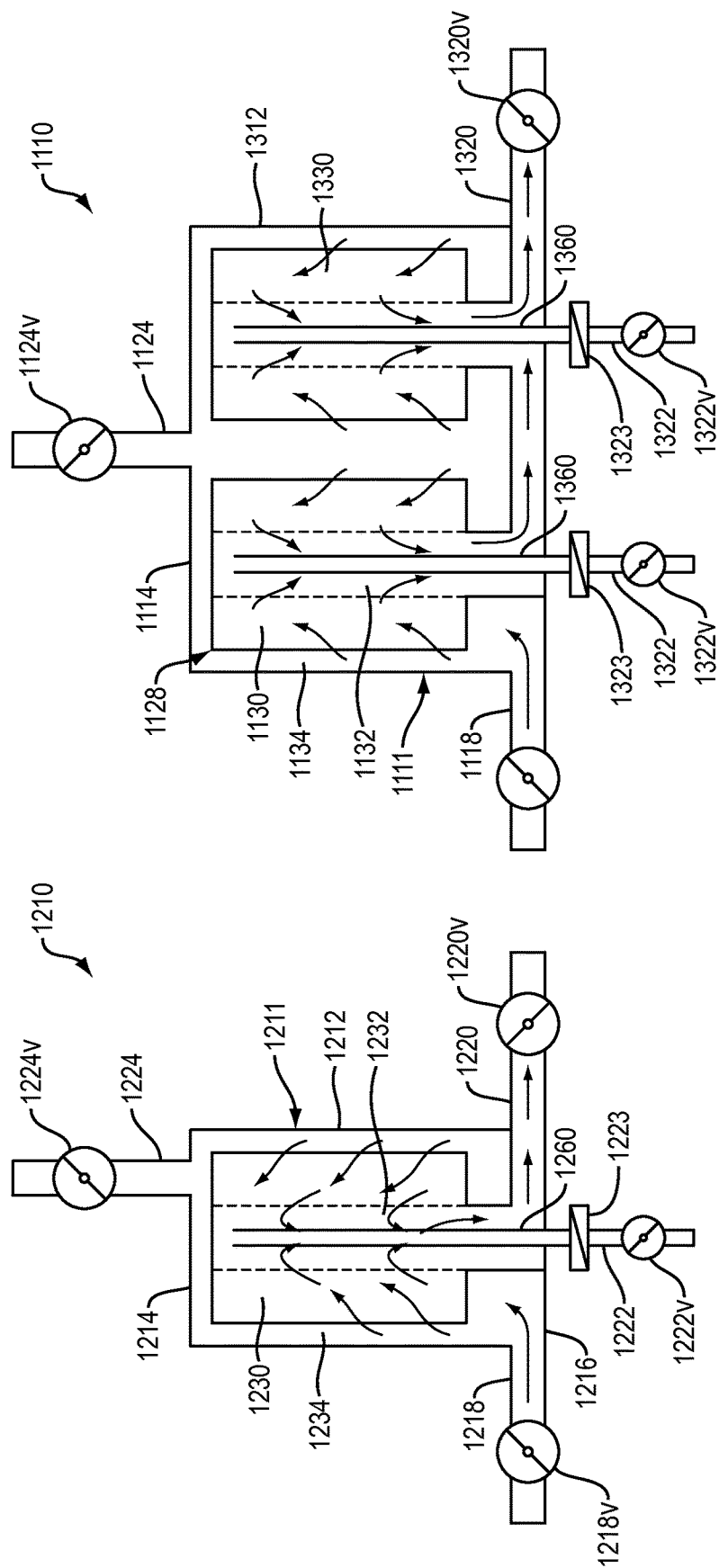

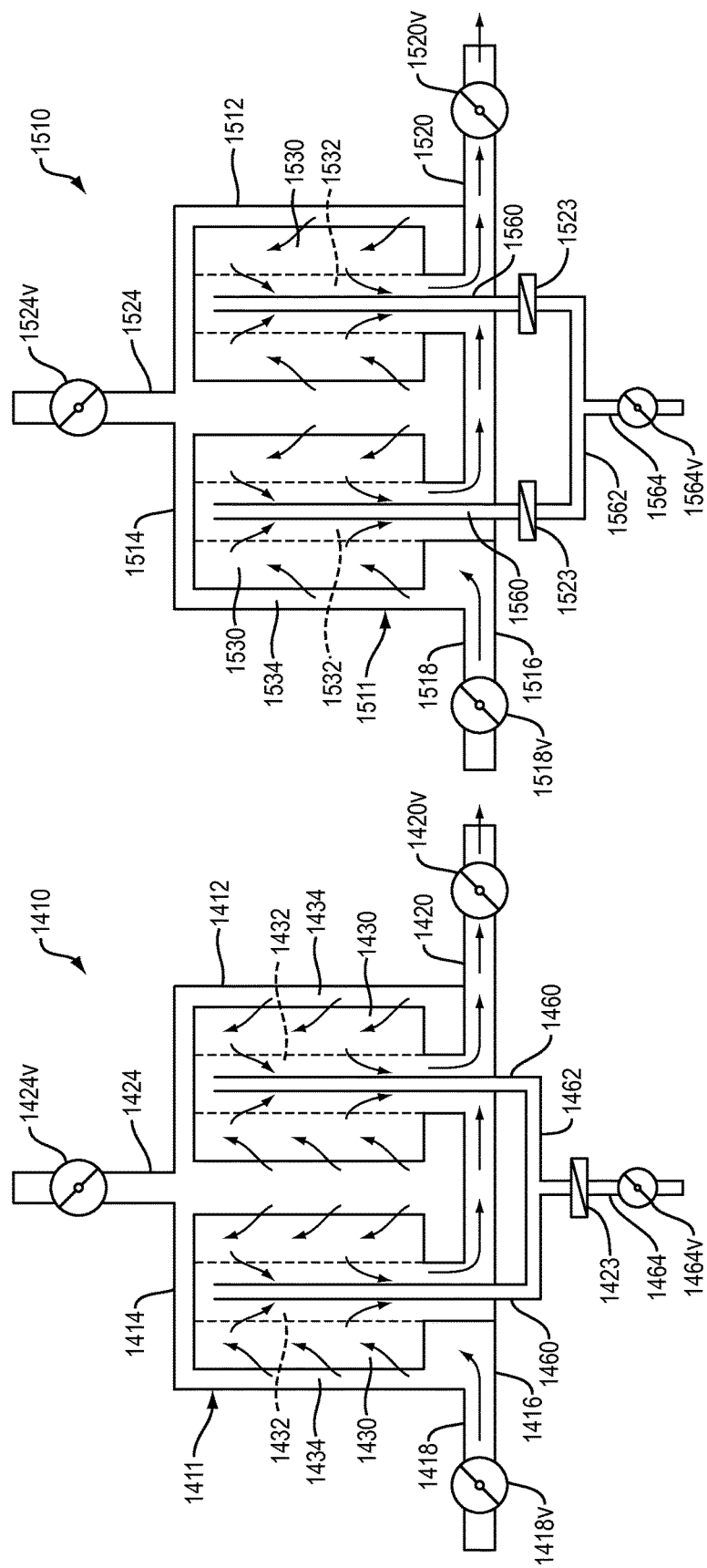

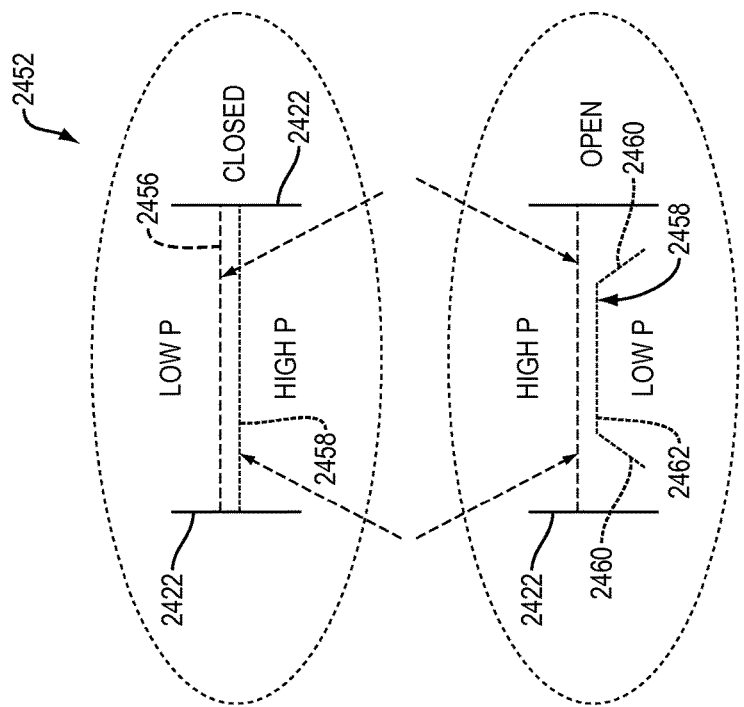
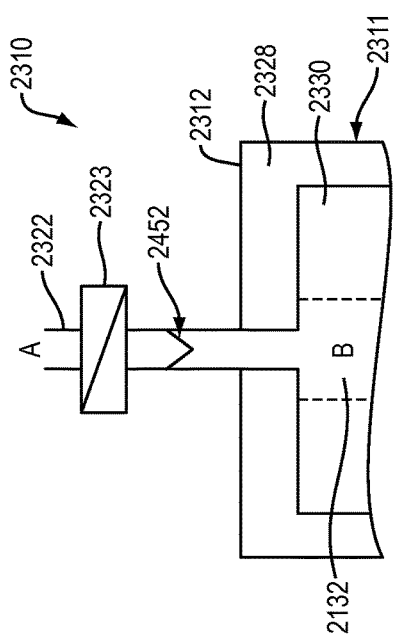
FIG. 37
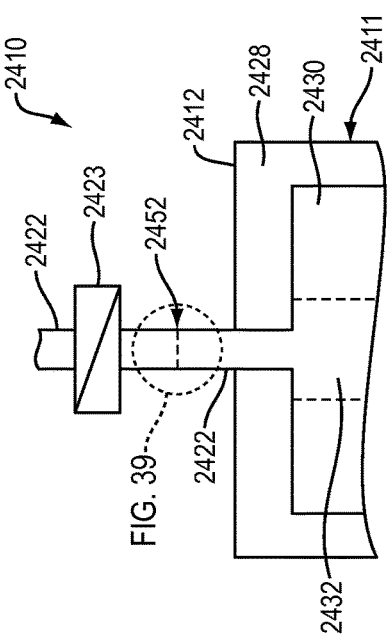
FIG. 38

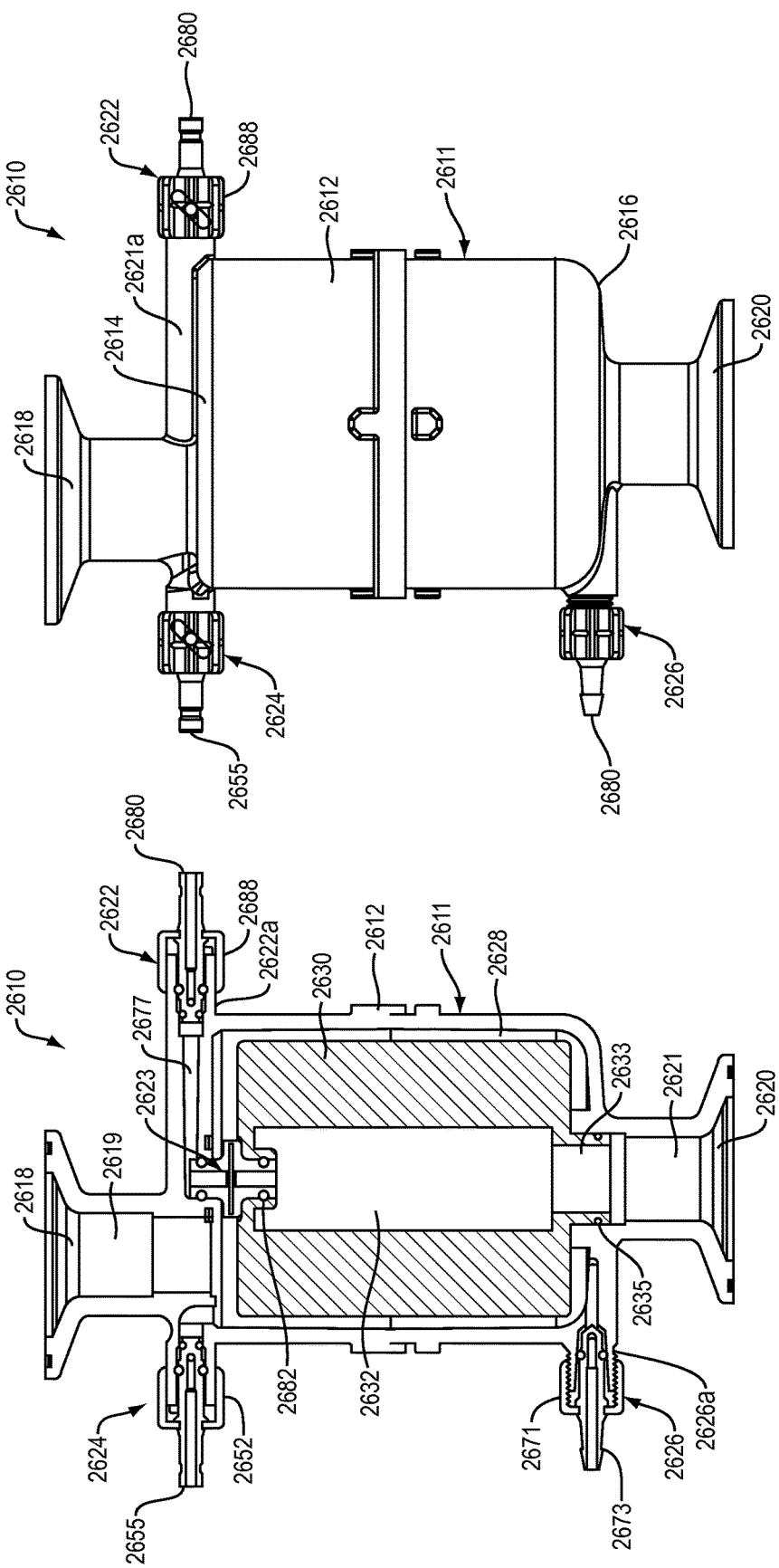

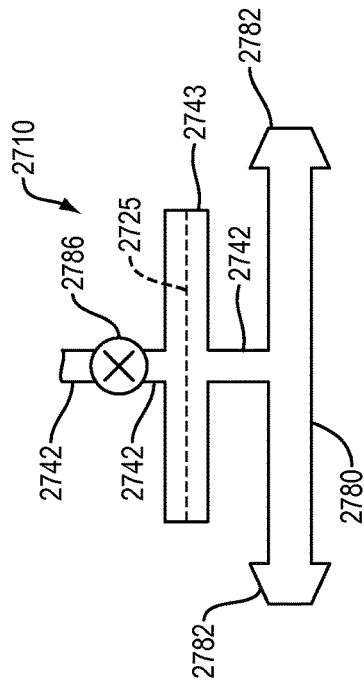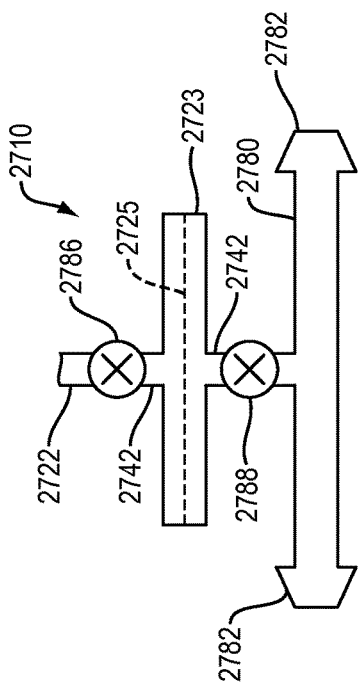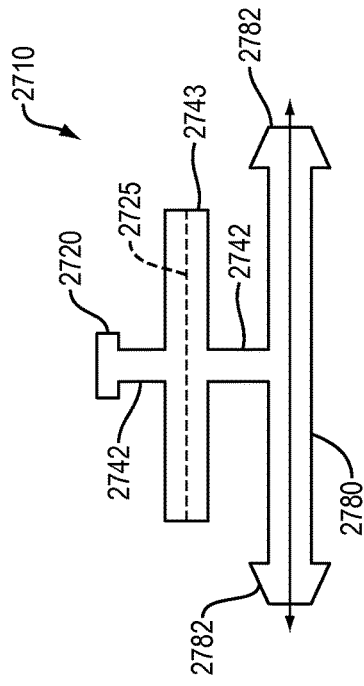

LIQUID RECOVERY FILTER

CROSS-REFERENCE TO RELATED APPLICATIONS

This application is a continuation-in-part of U.S. Ser. No. 13/460,583 filed Apr. 30, 2012, and PCT Application Serial No. PCT/US13/37671 filed 23 Apr. 2013, the contents all of which are incorporated in their entirety herein by reference. This application also claims the benefit of U.S. Provisional Application Ser. No. 61/992,029 filed May 12, 2014, the contents of which are incorporated in their entirety herein by reference.

BACKGROUND OF THE DISCLOSURE

1. Field of the Disclosure

The present disclosure relates generally to filtration devices and systems, and particularly to liquid recovery filter assemblies having inlet and outlet ports and, in some embodiments, vent, drain and/or recovery ports for the drainage and recovery of filtered liquids from the filter housing and enclosed filter after filtering operations. More particularly, the disclosure relates to apparatus and methods to retrieve liquids retained in filtration apparatus after filtration processes.

2. Description of the Related Art

Innumerable filtration devices and systems have been developed for the cleaning and purification of a wide range of gases and liquids. One area that requires extremely high quality filtration is in the field of pharmaceutical manufacture, where a number of different liquids are involved in the manufacturing processes of a large number of drugs and medications. These various liquids are often quite costly to produce, and as a result, much effort and expense is expended to recover such liquids in a sterile manner during the manufacturing process, insofar as practicable.

During liquid filtration processes, liquid is passed through the filter assembly(s) and the filtered liquid is recovered from the downstream or outlet side of the enclosed filter element. In one type of filter element used, the filter element conventionally has a generally toroidal configuration wherein the unfiltered liquid passes through the filter element from outside the filter and through the filter material to a hollow inner core. Other filter element configurations may also be used in a similar manner or in a reverse manner flowing from the inner core to the outside of the element. One problem with such filter configurations is that when the filtration process is completed, there is a volume of purified, filtered liquid still resident in the filter element, as well as unfiltered liquid remaining within the filter housing and outside the filter element. These liquids are often quite valuable, as noted above. Discarding these liquids when the filtration process is completed or interrupted results in the loss of a considerable amount of valuable and usable liquid, particularly after numerous filtration processes.

One method used to remove the resident filtered liquids is to introduce pressurized gas into the system to force the liquids out of the filter assembly. This approach, although effective, is problematic due to the relatively high bubble points of the filter materials used for many specific applications, including many of the filtration processes common in the pharmaceutical industry. When the filtration material of the filter element is wetted (as is typically the case after use for liquid processing), bulk gas flow through the filter element is blocked by the wetted filter material at pressures below the bubble point pressure, as is commonly known in the art. Therefore, gas pressurized to pressures below the bubble point pressure cannot efficiently clear the downstream (filtered) liquid.

Filter materials with pore sizes about and below 0.2 microns have particularly high bubble point pressures that require relatively high gas pressures (typically greater than 40 psi for membrane-based absolute-rated filters wet with water or other liquid of similar surface tension) to evacuate the liquid in the wetted filter material. Even filter materials with pore sizes greater than 0.2 microns can have bubble points higher than the pressure limits of other components that commonly make up filter assemblies. The introduction of high pressure gas can compromise the physical and functional integrity of the filter element and/or filter assembly by, for example, causing the filter element to separate from its attachment points, or causing the filter element to physically break and potentially compromise the desired separation of unfiltered and filtered liquids, allowing them to mix downstream. Mixture of the filtered and unfiltered liquids would invariably compromise the intended purity or sterility of the filtered liquid. In addition, assemblies using, for example, barbed connectors for hoses can experience hose breakage or separation from the barbed connectors when gas at a relatively high pressure is introduced into the filtering apparatus. Moreover, pressure-sensitive components such as those incorporating thin films have pressure ratings and operational limits well below the bubble points of many filter materials.

What is needed is a filter recovery system that provides a means to remove valuable filtered liquids from a filter apparatus in a sterile or otherwise contamination-free manner. What is also needed is a filter recovery system that permits the use of a gas applied at a relatively low pressure to effectively remove resident filtered liquids while maintaining the sterility and/or any other required characteristics of the liquids in the downstream locations within, and external to (further downstream of), a filter assembly. These and other problems are solved by the disclosed liquid recovery filter apparatus as shown and described in the appended drawings, disclosure summary, and more particularly in the detailed description of the disclosure.

SUMMARY OF THE DISCLOSURE

The liquid recovery filter assembly disclosed herein comprises a number of embodiments, wherein each of the embodiments includes a filter housing or shell containing a filter element secured therein. All of the embodiments have an inlet port that extends into the upstream or inlet side of the housing, and an outlet port extending from the downstream or outlet side of the housing. The terms "inlet side," "upstream," "upstream side," and similar terms all refer to the section or volume of the filter assembly located on the inlet portion of the apparatus, i.e., the portion of the filter assembly that may contain unfiltered liquid during operation. The terms "outlet side," "downstream," "downstream side," and similar terms all refer to the sections or volumes of the filter assembly located within the core of the filter element(s) for filter elements having a core and with an outside-in flow path, sections or volumes of the filter assembly located at a downstream end or on a side of the filter element that contains filtered liquid that has passed through the filter element during operation of the filter assembly, or in components, e.g., tubes and connectors, downstream of the filter core and the filter assembly.

For all embodiments, the demarcation or boundary between "upstream," i.e., "unfiltered" liquid and "downstream," i.e., "filtered" liquid is the filter element constructed from filtration material and any associated non-porous filter element features including, but not limited to, filter cartridge end caps, end cap adaptors, sealing mechanisms and the like used to define and connect the filter element to the filter assembly housing. More particularly, "upstream" is defined and demarcated by an upstream designated surface of the filtration material and any associated non-porous filter element feature. Likewise, "downstream" is defined and demarcated by a downstream designated surface of the filtration material and any associated non-porous filter element features. Any liquids resident in the filter apparatus upstream of the "upstream" surface of the filtration material shall be considered "unfiltered liquid" for the purposes of this disclosure. Any liquids resident in the filter apparatus downstream of the "downstream" surface of the filtration material shall be considered "filtered liquid" for purposes of this disclosure. Any liquids resident in the filter apparatus contained between the upstream surface and the downstream surface of the filtration material shall be considered "filtration material holdup" for purposes of this disclosure. As used herein, "filter material" and/or "filtration material" shall mean any filter membrane, filter media, or any other material or substance used to filter fluids including liquids and gases. The filter assemblies disclosed herein are constructed so that essentially all liquid introduced into any embodiment of the filter assemblies will pass through the filter element from the designated inlet port to the designated outlet port of the filter assembly.

The filter housing or shell may also have upstream or inlet side vents or passages, and/or upstream or inlet side drain ports or passages. These optional upstream ports or passages allow the upstream portion of the filter housing to be drained of unfiltered liquid, i.e., liquid that has not passed through the filter element from the upstream or inlet side to the downstream or outlet side of the filter element during a filtration operation. These ports are also used to remove gas trapped on the upstream side of the filter membrane, to monitor pressure, to perform integrity tests, and for other purposes as are commonly known in the art.

Each of the liquid recovery filter embodiments may further include downstream or outlet side ports or passages in addition to the primary outlet port that communicate liquidly with the downstream core, or downstream end/side of the filter element. These downstream or outlet ports are normally closed during filtering operations, but may be opened in some applications to remove air bubbles or when the filtration operation has been completed. The opening of these downstream ports allows air or other gas to flow into the core or downstream end/side of the filter element, thus "breaking the seal" or hydraulic lock commonly formed within the core, or downstream side, of the filter element. In some currently available filter assemblies, this allows the valuable filtered liquid contained within the core or downstream side of the filter element to flow from the filter assembly. Exposure to the environment external to the filter assembly, however, through opened downstream ports commonly present in related art filter assemblies, may bring unwanted contamination that if brought in contact with a batch of filtered product, could compromise the batch. The embodiments disclosed herein provide filter assembly constructions that permit recovery of filtered liquid from the downstream side and prevent the contamination of downstream filtered liquids.

Two basic configurations of the liquid recovery filter are disclosed herein (along with several additional embodiments of each), one having a downstream or outlet port disposed at the bottom of the filter assembly, and the other having a downstream or outlet port disposed at or near the top of the assembly. The second of these configurations includes a dip tube (extending internally from the outlet port) to allow liquid to flow from the bottom of the core, or bottom of the downstream side of the filter element and out of the outlet port for recovery. The first basic configuration, i.e., having the primary outlet port or passage disposed below the filter element, includes embodiments that differ due to the different locations or arrangements of the primary inlet and outlet ports or passages. The second basic configuration, i.e., having the primary outlet port or passage extending from the top or upper portion of the filter assembly, includes additional embodiments that also differ due to the different arrangements of the primary inlet and outlet ports or passages. All of the embodiments disclosed herein include means for recovering filtered liquid from the core or downstream side of the filter element aseptically and/or without contamination of the filtered liquid.

Also disclosed are port/valve configurations, settings and port assignments that permit liquid to be introduced into the filter assemblies in a reverse direction with the reassignment of inlet, outlet, vent, drain, and recovery ports to remove the resident filtered liquids in a sterile or contamination-free manner from the apparatus after a filtering event. In these configurations, what would be considered downstream elements are reassigned as upstream elements and what would be considered upstream elements are reassigned as downstream elements. It should be understood that a recovery filter should be secured to any port that will function as, and be assigned as, a downstream recovery port. As used herein, "recovery port" is defined as a port that allows sterile or otherwise contaminant-free gas to be introduced into the liquid recovery filter assembly from an external source into the downstream side of the filter assembly.

In a further aspect of the disclosure, an aspiration tube is incorporated into the downstream side of the filter assembly and extends out of the housing to form a recovery port. The tube can be formed to extend into a lower end of the assembly or filter element, or may extend through the filter element core to a point proximal to an upper end of the filter element and any length in between these two extremes. For filter assembly embodiments with multiple enclosed filter elements, each element has a dedicated aspiration tube. The tubes may be joined via a manifold to share a single recovery port and inline air filter, or may have dedicated recovery ports and inline air filters among some of the disclosed embodiments.

In a still further aspect of the disclosure, single and multi-round filter assemblies include replaceable filter cartridges. The filter assembly housings may include removable sections (such as a lid, end cap, removable bowl, access panel, etc.) to permit entry into the assemblies to remove and replace used filter cartridges. The filter housings include receiving walls or posts to secure the filter cartridges in the housings. These embodiments may also include aspiration tubes to assist the liquid recovery function to force filtered liquids from the filter assemblies.

In a yet further aspect of the disclosure, a hydrophobic or combination hydrophilic/hydrophobic filter is secured in an end cap or other location on a filter cartridge to permit aseptic or contamination-free removal of filtered liquids remaining in the filter assembly after a filtration operation with the use of gases introduced under pressure. The combination hydrophilic/hydrophobic filter provides a dual function to filter gases introduced into the filter assemblies and to act as a valve to eliminate the need for a recovery port and a mechanical valve. In some embodiments, however, the hydrophilic/hydrophobic filter could be attached to a recovery port with or without a mechanical valve.

These and other features of the present disclosure will become readily apparent upon further review of the following drawings and detailed disclosure.

BRIEF DESCRIPTION OF THE DRAWINGS

FIG. 17 is a sectional view in elevation of a single-round liquid recovery filter assembly with an aspiration tube according to yet another aspect of the disclosure.

FIG. 18 is a sectional view in elevation of a multi-round liquid recovery filter assembly with aspiration tubes according to a yet further aspect of the disclosure.

FIG. 19 is a sectional view in elevation of a multi-round liquid recovery filter assembly with aspiration tubes according to a still further aspect of the disclosure.

FIG. 20 is a sectional view in elevation of a multi-round liquid recovery filter assembly with aspiration tubes according to still another aspect of the disclosure.

FIG. 37 is a partial sectional view in elevation and in partial phantom of a liquid recovery assembly with a collapsible one-way valve according to a yet further aspect of the disclosure.

FIG. 38 is a partial sectional view in elevation and in partial phantom of a liquid recovery assembly with a membrane one-way valve according to a still further aspect of the disclosure.

FIG. 39 is a partial sectional view in partial phantom of a membrane valve according to the embodiment of the disclosure shown in FIG. 38.

FIG. 41 is a side sectional view of a liquid recovery assembly with a recovery filter secured inside the assembly housing according to still another aspect of the disclosure.

FIG. 42 is a side view in elevation of the liquid recovery assembly shown in FIG. 41.

FIG. 43 is a side sectional view in elevation and in partial phantom of a line clearing filter inlet/outlet assembly according to a further aspect of the disclosure.

FIG. 44 is a side sectional view in elevation and in partial phantom of a line clearing fitter inlet/outlet assembly with a valve according to a yet further aspect of the disclosure.

FIG. 45 is a side sectional view in elevation and in partial phantom of a line clearing filter inlet/outlet assembly with an upstream recovery valve and a downstream recovery valve according to a still further aspect of the disclosure.

It should be understood that similar reference characters denote corresponding features consistently throughout the attached drawings.

DETAILED DESCRIPTION OF THE DISCLOSURE

The liquid recovery filter comprises several embodiments, each configured for the recovery of liquids within the filter capsule, filter housing, the filter element, and any attached downstream components, e.g., tubes and connectors, downstream of the filter core and the filter assembly after the completion of filtration operations, e.g., when a batch has been filtered and/or the filter element is to be changed, etc. It should be understood that the filter capsule or housing embodiments may be constructed as permanently sealed structures (with the exception of their various ports or passages), or constructed as reusable units with removable end caps and/or multi-piece housings, permitting access to the filter element therein for replacement or cleaning and reuse, or may be configured as replaceable modular units having pre-installed filter elements.

Figure 1:
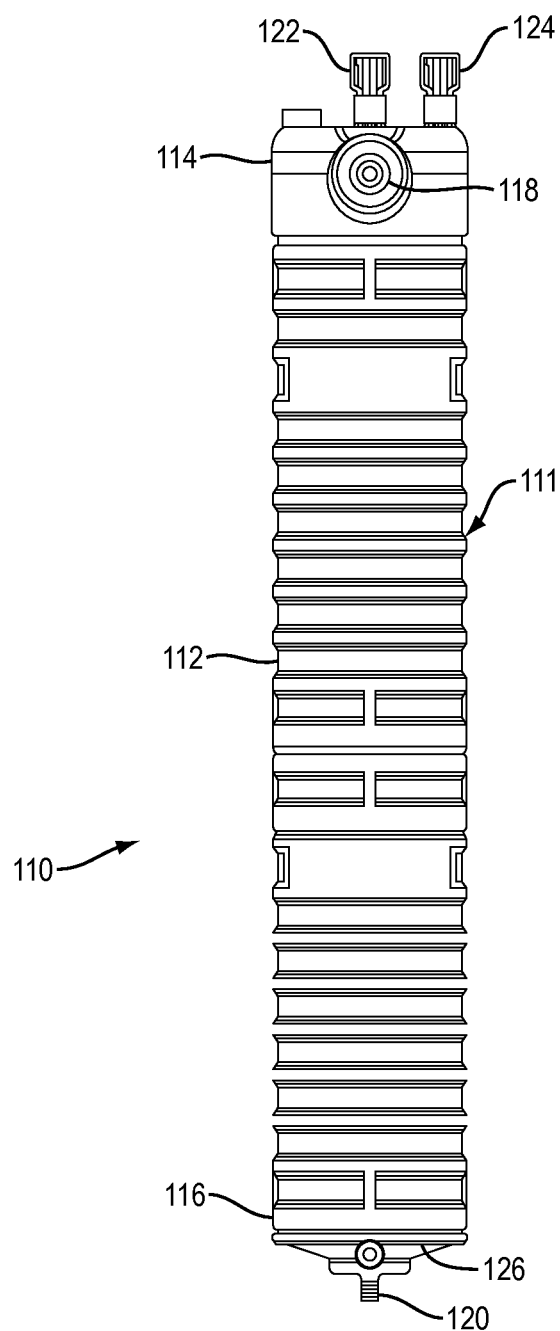
FIG. 1 is a front elevation view of a first embodiment of a liquid recovery filter according to one aspect of the disclosure, illustrating its general external configuration.

Referring to FIG. 1, a liquid recovery filter assembly is shown designated generally as 110. Filter assembly 110 includes a filter housing or shell designated generally as 111 having a shell wall 112 with an upper end 114 and an opposite lower end 116, both secured to, or integral with, shell wall 112 that may be substantially cylindrical in one embodiment. As used herein, relative terms "upper" and "lower" are used as component designations to define the spatial orientation of components based on the influence of gravity on the direction of liquid flow in the filter assemblies with gravitationally influenced flow defined as going from an upper end to a lower end. It should be understood that any of the filter assembly embodiments disclosed herein may be oriented in multiple spatial orientations, e.g., upside down and sideways relative to the orientation shown in any figure, wherein the different orientations may reverse or alter the functional meaning of the "upper" and "lower" designations without altering the relative orientation and cooperation of the various filer assembly components. Filter assembly 110 may be oriented as shown in FIG. 1, with inlet end 114 disposed above outlet end 116. It should be understood the orientation can vary and be reversed as needed for a particular application.

Filter assembly 110 includes an upstream or inlet port 118, and a generally opposite downstream or outlet port 120 for the flow of liquid to and from the device. A recovery port 122, apart from its function in this disclosure to maximize recovery of filtered liquids from the filter assembly, may function as a vent to the outlet or downstream side of a filter element secured in the filter assembly (as disclosed below). An upstream vent port 124 extends from upper end 114 and is in fluid communication with an upstream internal volume of the filter assembly defined as being between housing 111 and an upstream designated surface of the filter element therein. An upstream drain port 126 extends from lower end 116 and can be used to drain liquids from the upstream side of the enclosed filter element, i.e., the upstream internal volume defined above.

All of the liquid recovery device embodiments disclosed herein include combinations or sub-combinations of these various vents, ports, and passages. However, the relationship and orientation of the various vents, ports, and passages are arranged differently in different embodiments. Some embodiments relative to others include one or more additional ports or passages to accommodate specific arrangements, orientations and functions of the other ports and passages. It should be understand that all ports may be configured with adaptors to allow connection to a tube, pipe, sub-assembly, equipment, etc. These adaptors can be of any type including, but not limited to, barbed, threaded, gasket and clamp, quick connect, compression-type, as well as any other adaptor disclosed herein and/or known in the art. Moreover, the operational states and settings of the ports and associated valves (disclosed further herein) may be varied and ports reassigned function to permit the reverse flow of liquid through the assembly embodiments.

Figure 4:
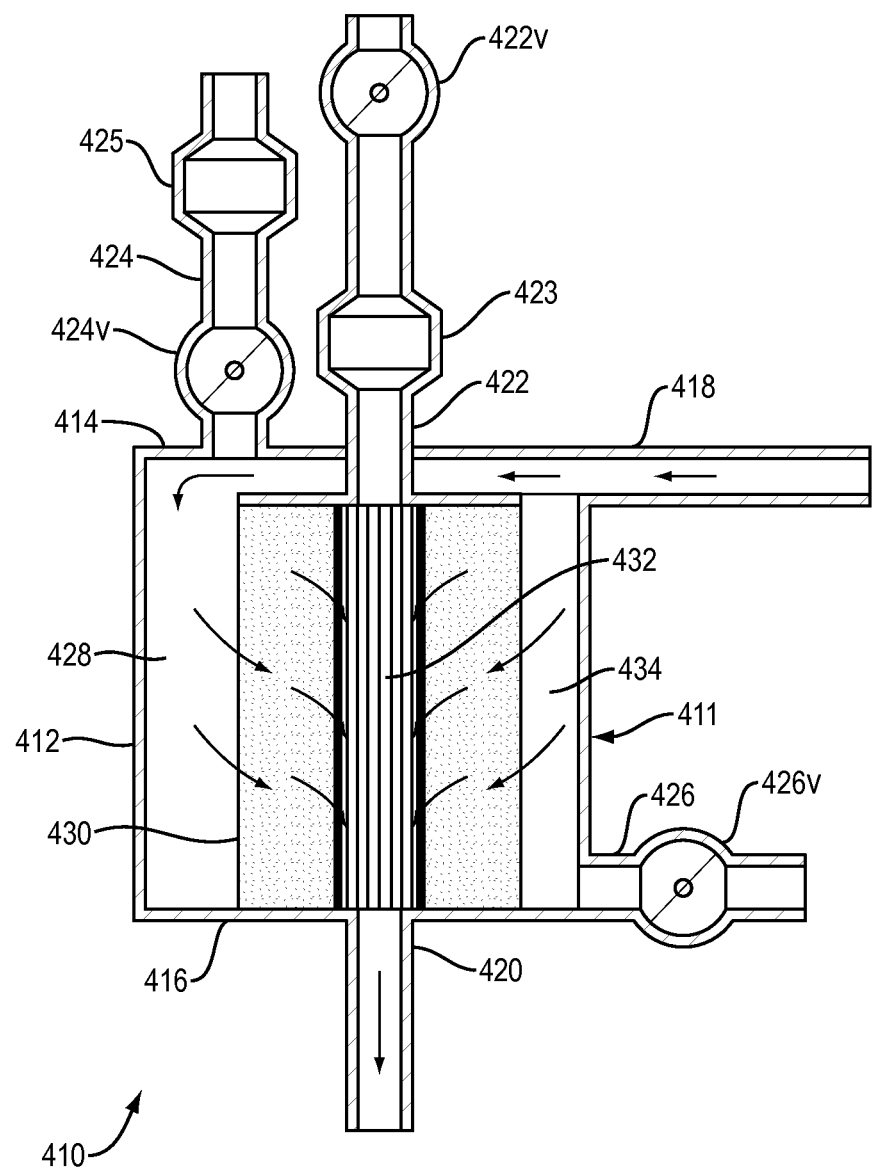
FIG. 4 is an elevation view in section of a liquid recovery filter according to a still further aspect of the disclosure having a generally L-shaped flow path, illustrating its internal configuration.

The locations and orientations of the various ports 118 through 126 most closely resemble the configuration of the liquid recovery filter embodiment shown in FIG. 4, disclosed in detail below. Moreover, while filter assembly 110 is shown having a relatively tall and narrow configuration, it should be understood that other dimensional and geometrically shaped configurations may be constructed, depending upon the shape and configuration of the filter element contained therein, the placement of the various inlet and outlet ports or passages, the spatial limitations of the apparatus to which the filter assembly is attached, and other factors. The various fittings and connectors, illustratively barbed connectors and quick connects (shown in other figures), for the various ports and passages of filter assembly 110 are conventional in the industry and are disclosed as a matter of illustration and not limitation.

Figure 2:
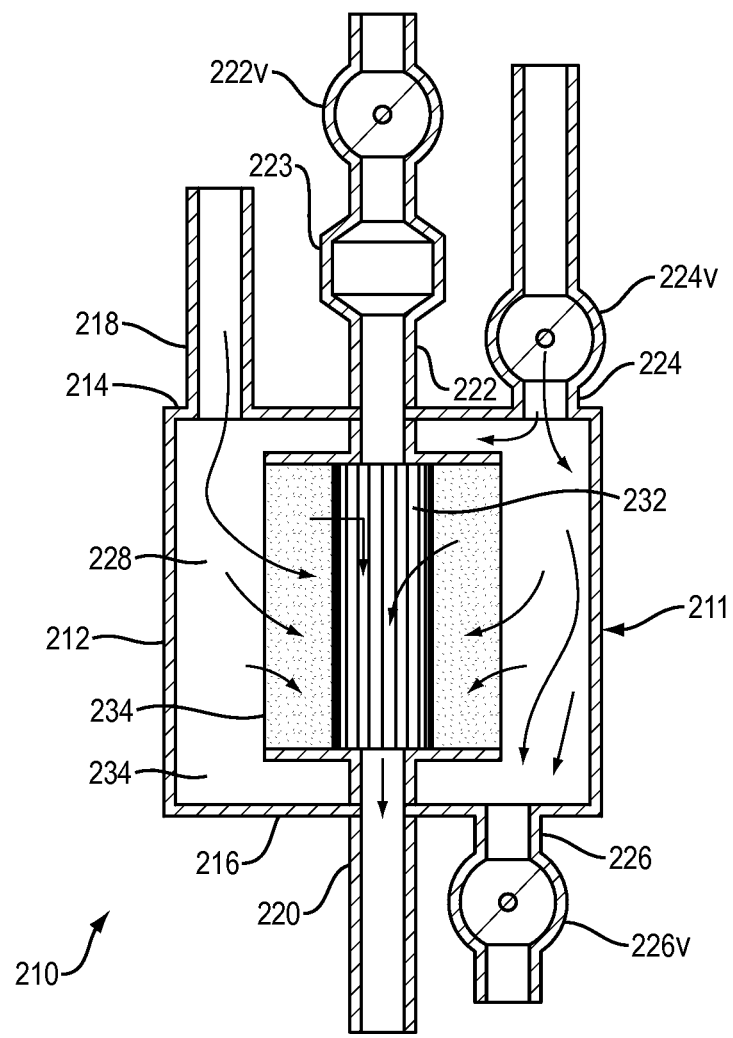
FIG. 2 is an elevation view in section of a liquid recovery filter according to another aspect of the disclosure having a generally inline flow path, illustrating its internal configuration.
Figure 10:
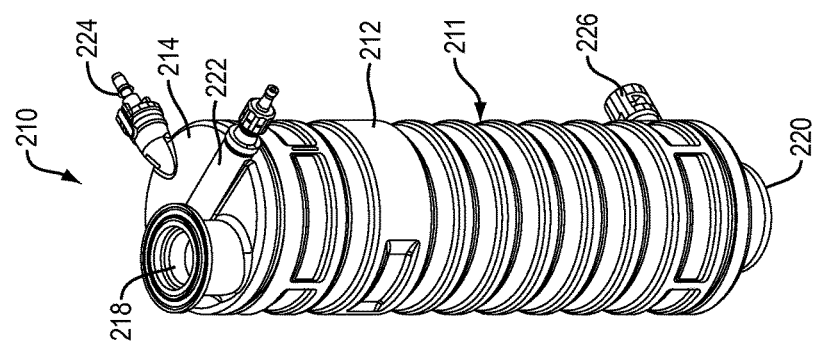
FIG. 10 is a front top perspective view of a liquid recovery filter assembly according to the embodiment shown in FIG. 2.

Referring now to FIGS. 2 and 10, in another aspect of the disclosure, a liquid recovery filter is shown designated generally as filter assembly 210. It should be understood that the length and width of any of the filter embodiments shown in the drawings are by way of illustration and not limitation, and will depend upon the configuration of the filter element installed therein according to the intended use and operating environment.

Filter assembly 210 includes a housing or shell designated generally as 211 having a shell wall 212 with an inlet end 214 and an opposite outlet end 216, each secured to, or integral with, shell wall 212. The combination of shell wall 212, and ends 214 and 216 define an internal volume 228. An inlet port 218 extends from inlet end 214 substantially axially parallel to a longitudinal axis of the enclosed filter, as defined by its inlet and outlet ends. It should be understood that the parallel orientation of inlet port 218 relative to the longitudinal axis of the enclosed filter may be altered (angled away from a parallel orientation including an orthogonal orientation), to accommodate particular spatial needs. Inlet port 218 is in fluid communication with an upstream internal volume 234 defined by the combination of shell 211 and an upstream designated surface of a filter element 230 (more particularly an upstream designated surface of the filter element and filtration material as defined above) secured in the filter assembly.

An outlet port 220 extends coaxially (with the filter) from outlet end 216 and is in fluid communication with a core 232, or downstream side of filter element 230. As shown in FIG. 2, outlet port 220 has a longitudinal axis aligned with the longitudinal axis of the enclosed filter element. It should be understood this orientation can be altered (offset), in similar fashion to inlet port 218 to accommodate specific spatial needs.

A recovery port 222 extends from upper inlet end 214 of filter housing 211. Recovery port 222 communicates with the outlet portion or core 232 of the filter element disposed within housing 211, as described in more detail below. Recovery port 222 is shown as being oriented coaxially with the enclosed filter element in FIG. 2 and radially in FIG. 10. It should be understood that although the lumen of recovery port 222 must be in physical communication with core 232, i.e., an extension of the core space, a recovery filter 223 (disclosed in more detail below) may block the flow of liquids from the core into port 222 (but not gas flow from the port into the core), the coaxial or radial orientation can be altered to accommodate spatial needs. Recovery filter 223 is shown connected in-line (outside of, or within housing 211 as disclosed hereinbelow) to recovery port 222 such that any air, gas, or other fluid introduced into recovery port 222 must first pass through recovery filter 223 prior to contacting the downstream filtered liquid.

Recovery filter 223—as well as all recovery filters throughout this disclosure—is chosen to have the appropriate properties, e.g., porosity, pore size, material compatibility with gas or liquids exposed to the filter, and efficiency rating to ensure that fluids entering the filter assembly through recovery port 222 are of an appropriate purity for contact with the downstream filtered liquid. In the case of sterile filtration in the pharmaceutical industry, a sterile filter could be selected as the recovery filter. However, recovery filters with other efficiency ratings (more or less efficient than a sterile filter) and with specific purification properties (such as adsorptive capacities through the use of activated carbon, desiccants, soda-lime, etc. or other depending on the purity requirements of the downstream filtered liquid) could be selected.

As a further alternative, filter materials with hydrophobic property functions may be used to prevent or reduce the likelihood of the recovery filter being wet by the processing liquid. Of course, it should be understood that there could be applications when a filter material with hydrophilic properties and/or combined hydrophilic/hydrophobic properties may be used as the recovery filter and should be considered within the scope of the disclosure. Preventing the recovery filter from being wetted is beneficial, as it allows the recovery filter to more easily pass air or gas introduced through recovery port 222. In some cases, the use of oleophobic or super-hydrophobic recovery filters or recovery filters with other surface properties is beneficial to further reduce the likelihood of wetting by the processing fluid. Recovery filter 223 may be of any type (e.g. disc, pleated cartridge, etc.) as is known in the art for filters and can be removable and/or replaceable, or permanently attached to recovery port 222 in a permanent, reusable or replaceable housing any method known for attaching filters as is known in the art.

An upstream vent port 224 also extends from inlet end 214 to vent upstream internal volume 234. Lastly, an upstream drain port 226 extends from outlet end 216 for draining liquids from upstream internal volume 234.

As previously disclosed, filter shell or housing 211 defines internal volume 228 having a filter element 230 disposed therein. The filter element may have a generally toroidal configuration and a hollow downstream core 232. It should be understood that filter element 230 as well as all filter elements or cartridges disclosed herein (functioning as a processing filter that performs the primary filtering function of the filter assembly) may conform to any regular or irregular geometric shape and configuration, e.g., pleated, hollow fiber, tubular, stacked disc, and may be formed from a variety of materials. e.g., polymeric, ceramic, or metallic membranes, hydrophobic membrane, hydrophilic membrane, nonwoven media and combinations thereof, with varying pore sizes, porosities, surface areas, and the like and still be within the scope and spirit of the disclosed and claimed filter assembly embodiments. It further should be understood for filter elements made from, for example, hollow fiber and tubular materials, there is no "core", but one or more lumen that collectively function as a core in similar fashion to the core disclosed herein. It should be also further understood that filter 230 may be secured in any of the disclosed filter housings via thermal or sonic bonding, adhesive, O-ring seals and any combination of these methods as well any other method such as mated threading used to secure filters in housings as are well known in the art.

As previously disclosed, recovery filter 223 provides a barrier to contamination entering the downstream portion of filter assembly 210. Recovery filter 223 may be secured in any of the disclosed embodiments via permanent methods including thermal or sonic bonding, adhesive, and any combination of these methods as well any other method to secure filters as is well known in the art or via removable non-permanent or semi-permanent methods such as mated threading, O-ring seals, sanitary fittings and any combination of these methods as well as any other non-permanent or semi-permanent method used to secure filters as is well known in the art.

As previously disclosed, the combination of shell or housing 211 and an upstream designated surface of filter element 230 define an upstream volume 234. For filter elements not having a generally toroidal configuration with a downstream core, upstream volume portion 234 is defined similarly by housing 211 and an upstream designated surface of the filter element.

To control the flow of liquids through filter assembly 210, each of the various ports 218 through 226 may include a dedicated valve therein. Although each port may be configured with a valve, different embodiments may be configured with valves for only some and even none of the passages and/or ports. Multiple combinations of passages and ports with or without valves are within the contemplation and scope of the disclosure. As used herein, numeric reference characters designating valves will include a "v" at the end of the numerical designation. Dedicated valves for selective ports of filter assembly 210 are designated as valves $222v$ through $226v$. Valves $222v$, $224v$ and $226v$ are shown schematically in FIG. 2. All optional dedicated valves may be any suitable type of valve, e.g., needle valves, known and used in the art.

In the embodiment shown in FIGS. 2 and 10, during normal filtering operations, valves $222v$, $224v$, and $226v$ often remain closed. With this port and associated valve setting configuration, liquid enters via inlet port 218 and passes into upstream volume 234, through permeable filter element 230, into hollow core 232 where the liquid is now filtered liquid and exits filter assembly 210 through the downstream or outlet port 220. In the case of filtration processes common in the biopharmaceutical industry, the filtered liquid is sterile.

The above-described operation should not present any problems with liquid recovery, as long as the filter element is in good working order, the various passages are clear and the operation is essentially continuous. However, when the filtration process is completed, or the filter must be disconnected from the downstream process for some reason, e.g., because the filter has become plugged, to clean the liquid delivery lines or passages, to replace the filter or filter element, etc., some quantity of both unfiltered and filtered liquid is typically trapped within the filter assembly 210. As this liquid is often quite valuable, particularly in the pharmaceutical industry, it represents a fairly substantial financial cost, or loss, if it is discarded when filter assembly 210 is removed or replaced. Furthermore, efforts to capture the liquid from commercially available filter assemblies or products risk breach of asepsis on the downstream/sterile side of the filter assembly in pharmaceutical applications, or general contamination in non-sterile applications. Moreover, there may be additional costs associated with disposing of a filter containing such a liquid, particularly if the liquid is considered to be a biohazard or requires special handling to contain and/or discard.

The various aspects and embodiments of the liquid recovery filter assemblies disclosed herein are configured to address this problem by providing structural and procedural means to evacuate the filter housing or shell wall, core, and downstream lines of resident liquid in a sterile or otherwise contamination-free manner through the designated filter outlet port when the filtering operation is terminated. This permits the recovery of the valuable liquid within the filter for use, storage, packaging, or further downstream processing.

With respect to filter assembly 210, liquid, filtered and unfiltered, resident in the assembly (and/or lines downstream of the assembly) after the desired liquid filtration process has been accomplished, may be removed from the assembly via a two-step process. At this point in the process, valves $222v$, $224v$ and $226v$ remain in a closed condition, the same condition in which these valves are commonly maintained during the primary filtering operation. One or more of these valves may be opened during start-up of the primary filtering operation to facilitate initial liquid flow through the filter assembly, but are otherwise commonly closed during the primary filtering operation. In some applications, some or all of these valves remain opened or partially opened to continually remove gas as it builds up in the upstream or downstream portions, or to monitor pressure in the filter assembly, or for other purposes as are well known in the art.

Filtration of the unfiltered liquid remaining within the upstream or inlet side volume portion 234 is accomplished by forcing it through the filter element 230 as processed or filtered liquid from the filter outlet passage 220. Positive gas pressure can be used to achieve this goal by attaching a compressed air/gas line to the upstream tubing, the filter inlet port 218, the filter upstream vent port 224, or the filter upstream drain port 226 to drive air/gas into the filter assembly. If the compressed gas is attached to an upstream port other than the inlet, the valve(s) on the port to which the compressed air/gas is attached must be opened to allow the compressed air to enter into the upstream volume portion 234. In this case, the inlet would need to be closed by way of a valve, tubing clamp, welded tubing, or other means well known in the art to prevent the compressed air/gas from escaping and to allow pressure to build at the upstream or inlet side of the filter element.

The upstream port may be constructed with a filter of similar design and function to a recovery filter to preclude further contamination of the liquid prior to being forced through the filter element by the air or gas introduced through the upstream passage. However, since the liquid will be filtered by the process filter element 230 prior to reaching the downstream (clean) side, this is generally unnecessary. If positive gas pressure, a peristaltic pump or other positive displacement pump, or any means capable of driving gas into the filter housing is used to bring liquid to the filter, the same means can be used to drive air or gas into the filter assembly after the liquid source is exhausted. The upstream ports not used to introduce air or gas into the filter assembly. e.g. valves 222v, 224v and 226v when bringing air or gas into the system via inlet port 218, will be closed to allow the pressure on upstream volume portion 234 to build up in the filter assembly from about 5 to about 10 psi, but higher pressures can be used, if required to achieve flow due to a plugged filter element, or a high viscosity liquid so long as maximum pressure limits are not exceeded.

Once the pressure buildup has reached this pressure range and the unfiltered liquid remaining within the upstream side has passed to the downstream side, the clamp or valve upstream of the port used to introduce air or gas into the filter assembly, e.g., inlet 218 when bringing air or gas into the system via the inlet port 218, is engaged to stop all flow into filter assembly 210. It should be understood that in order to maintain pressure within the desired range, the flow of gas may be periodically stopped to give liquid time to flow to the downstream side and then restarted to make-up pressure lost as a result of liquid (as well as low levels of gas) flowing to the downstream side. Alternatively, if positive gas pressure is used, a regulator can be used to maintain pressure within the desired range. At this point in the process, the downstream side of filter element 230 should be at or about ambient pressure.

To initiate the second step, valve 222v is opened. This permits any liquid remaining in outlet core 232 to flow into outlet port 220 and out of filter assembly 210 via gravity or compressed air/gas assist. The gas may be, illustratively, air, nitrogen, carbon dioxide, etc., as application appropriate. If compressed air is to be used for this purpose, a compressor or like device is attached, if needed, to recovery port 222 and regulated to the appropriate pressure. Any air introduced into recovery port 222 must first pass through recovery filter 223 to ensure the filtered liquids forced out of outlet core 232 remain sterile and/or free from contamination. The compressed air/gas should be introduced into the assembly from about 1 to about 2 psi, or at some pressure lower than the upstream pressure to prevent flow from the downstream side to the upstream side of filter element 230. The pressure is also chosen to provide the desired liquid recovery rate as well as to maintain a pressure below the maximum pressure rating or maximum recommended operating pressure for all components in the system that may become pressurized.

During this second step of the liquid recovery process, it should be noted that valves 224v and 226v remain closed if pressurizing on the upstream side via inlet port 218. Once this second step is completed, i.e., all, or substantially all, of the liquid resident in outlet core 232 has been evacuated, the compressed air/gas source can be turned off, and/or the pressure can be otherwise relieved.

A brief discussion of the characteristics of a conventional filter element, similar to element 230 is warranted. Filter elements used in many areas of the pharmaceutical industry, and likewise for other industries and operations, often utilize extremely fine filtration membranes having pore size ratings on the order of fractional micron sizes. One characteristic of microporous membranes and filters constructed of these membranes is known as the "bubble point" of the membrane or filter, i.e., the differential pressure required to force air (or other gas) through the wetted membrane or filter element. As is well known in the art, the smaller the filter pore size, the greater the bubble point. The bubble point of many filters used in the pharmaceutical industry may be 40 psi, or even higher, so the pressure required to force a gas through the wetted filter membrane can exceed the maximum pressure rating of componentry often used to produce single-use systems common in the pharmaceutical industry.

With this explanation in mind, to maximize filtered liquid recovery with respect to currently available filter assemblies (as well as for any of the filter assembly embodiments disclosed herein), air (or other gas) applied to the open upstream vent port 224 or inlet port 218 at sufficient pressure to force the residual unfiltered liquid through the filter element 230 and out of the upstream volume 234 can efficiently remove much of the unfiltered liquid within upstream volume 234. However, in order to recover the liquid as filtered and processed liquid, the liquid must further travel through core 232 and outlet passage 220 as well as any lines downstream of the filter assembly. Due to the properties of a conventional filter element, the gas applied to the upstream side of filter element 230 cannot travel through the membrane to evacuate core 232 and outlet passage 220 as well as any lines downstream of the filter assembly unless the bubble point pressure is exceeded. This presents a problem, as described previously, due to the common use of relatively high bubble point filter elements coupled with the pressure limitations commonly found in systems and filter assemblies themselves.

Although not part of the filtered liquid recovery process for which this disclosure is directed, should any unfiltered liquids remain in upstream internal volume 234 after pressure is applied to force unfiltered liquids through the filter membrane, drain valve 226v may be opened to permit the unfiltered liquids to drain via gravity (often once the upstream volume 234 has been depressurized for safety purposes) through upstream drain port 226. Valve 224v may also be opened to overcome any vacuum effect to facilitate liquid flow out of drain port 226.

The filtered liquid remaining in core 232 and outlet passage 220 as well as any lines downstream of the filter assembly cannot easily be recovered using currently available filter assemblies without risk to asepsis or contamination of the filtered liquid. Due to the use of recovery port 222 and recovery filter 223, the pressure of gas needed to evacuate the resident liquid within the downstream portion of the filter assembly will be lower than what would be needed if recovery port 222 was not incorporated into the disclosed filter assemblies and contamination of the filtered liquid being removed from filter core 232 by the air or gas introduced through recovery port 222 will be prevented.

The configuration of filter assembly 210 may also perform the intended liquid filter and recovery functions when the liquid flow is reversed through the assembly. It should be understood that to operate filter assembly 210 in the reverse flow direction, the filter assembly may have to be spatially reoriented gravitationally to have reassigned ports positioned in locations to optimize performance with respect to their reassigned functions. For example, a port reassigned as an outlet port should be oriented gravitationally in a low or down position relative to the body of the filter assembly. This requirement may be eliminated in some embodiments if a dip tube (disclosed hereinbelow) is used.

In one possible reverse functional configuration, the assembly is reoriented such that such that outlet port 220, reassigned as an inlet port, is located at the gravitational top or high position. Upstream drain port 226 (and an optional drain port valve 226v, if present) is reassigned as a downstream recovery port (and a reassigned optional downstream recovery port valve) and will incorporate an inline recovery filter similar to, or the same as, recovery filter 223. Recovery port 222 (and an optional recovery port valve 222v, if present) is reassigned as an upstream drain port (and a reassigned optional upstream drain port valve) and often maintained in a closed condition during the main filtering operation.

The use of a recovery filter 223 on port 222 is optional in this functional configuration and may require removal in applications where the recovery filter's properties (such as its hydrophobicity) would prevent port 222 from performing its designated draining function, if such a function is desired. When used in this manner, liquid introduced into port 220 (with valve 220v open, if present), flows into core 232 (or the lumen of the filter element if constructed from, for example, hollow fiber or tubular material), and radially outwardly through filter element 230 into internal volume 234 (now a downstream volume) and out of the filter assembly through port 218 as processed liquid. In this functional configuration, the remaining port(s), e.g., port 224 in the embodiment shown in FIG. 2, is/are maintained in a closed condition by, for example, closing inlet valve 224v in the embodiment shown in FIG. 2, or could be eliminated from the embodiment, as use of these ports risk contamination of the downstream filtered liquid when not coupled with a recovery filter.

To remove the resident unfiltered liquid (resident in core 232) after the primary filtration process, pressurized gas is introduced into the filter assembly via recovery port 222 (reassigned as an upstream drain port), or through port 220 in a similar fashion by using the reassigned ports as disclosed previously for the functional configuration that flows from volume 234 to core 232. Alternatively, a reassigned upstream vent port at the reassigned gravitational top 216 (not pictured in FIG. 2) could be used to introduce the pressurized gas.

Reassigned recovery port 222 may include an inline recovery filter reassigned as an upstream filter 223 to preclude further contamination of the liquid prior to being forced through the filter element 230 by the air or gas introduced through the reassigned upstream vent passage 222. However, as previously described, since the liquid will be filtered by the process filter element 230 prior to reaching the reassigned downstream volume 234 (clean) side, this is generally unnecessary. Also, as previously described, the inclusion of a recovery filter reassigned as an upstream filter 223 may limit the reassigned function of port 222 as an upstream drain port, if the recovery filter's properties (such as its hydrophobicity) would prevent liquid from flowing through port 222. Once the resident unfiltered liquid is forced through filter element 230, filtered liquid remaining in internal volume 234 may be removed by introducing pressurized gas into the filter assembly via port 226, to force the remaining liquid through port 218, in a similar fashion (by using the reassigned ports) as disclosed previously for the functional configuration which flows from volume 234 to core 232.

Figure 3:
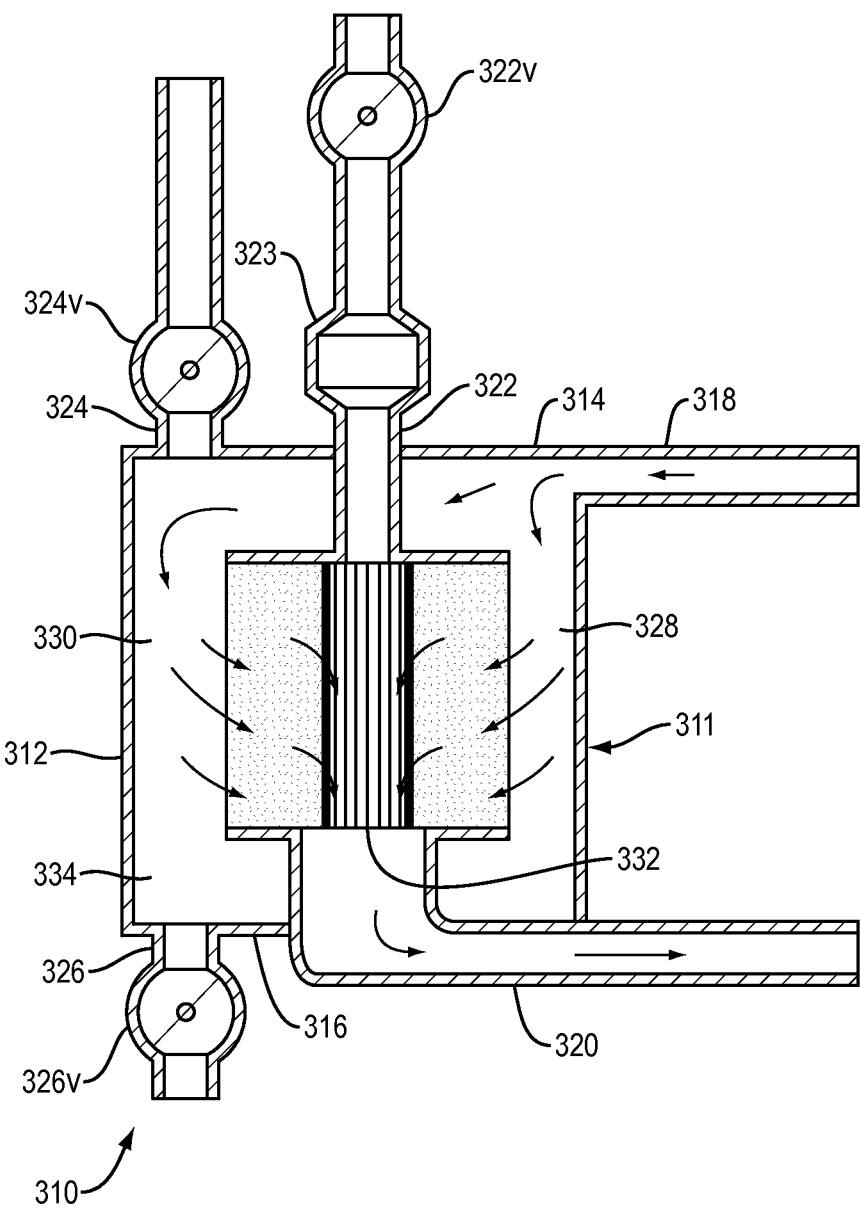
FIG. 3 is an elevation view in section of a liquid recovery filter according to a further aspect of the disclosure having a generally C-shaped flow path, illustrating its internal configuration.
Figure 8:
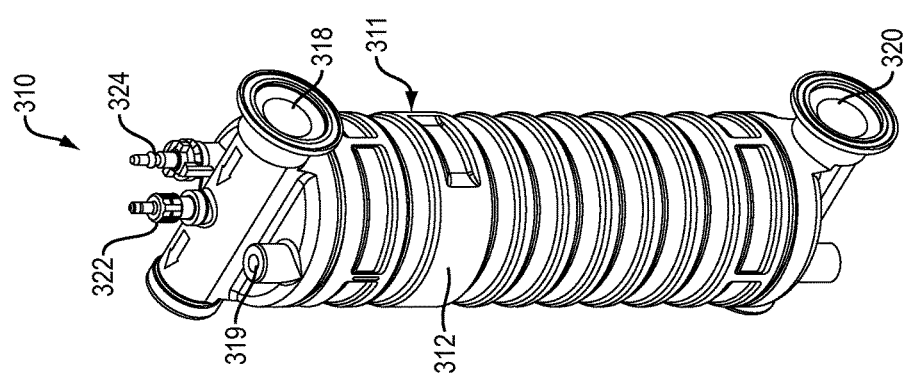
FIG. 8 is a front top perspective view of a liquid recovery filter assembly according to the embodiment shown in FIG. 3.
Figure 7:
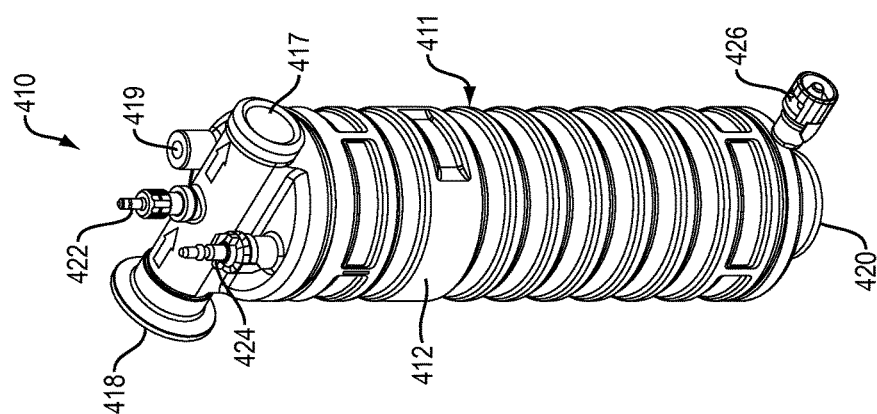
FIG. 7 is a front top perspective view of a liquid recovery filter assembly according to the embodiment shown in FIG. 4.
Figure 13:
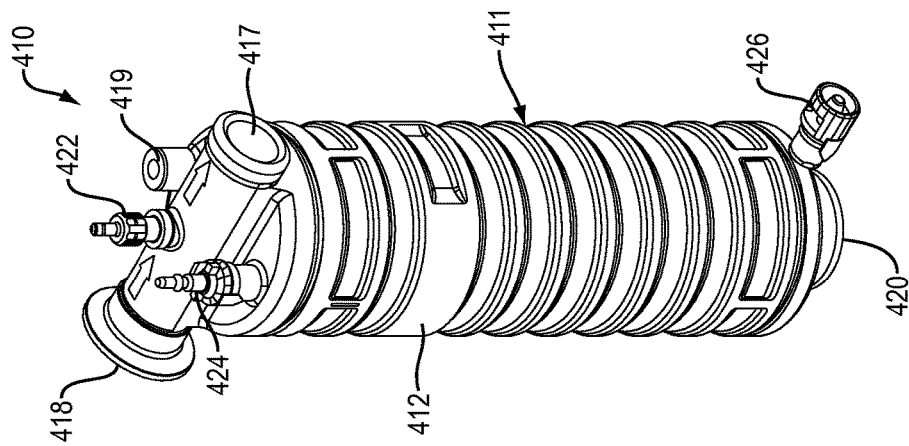
FIG. 13 is a front top perspective view of a liquid recovery filter assembly according to the embodiment shown in FIGS. 4, 7, 11 and 12.
Figure 12:
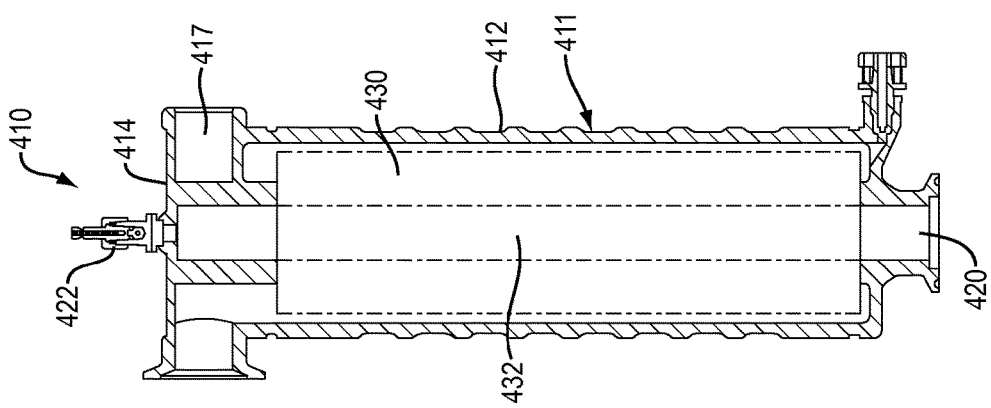
FIG. 12 is a side sectional view of the liquid recovery filter assembly shown in FIGS. 4, 7 and 11.
Figure 11:
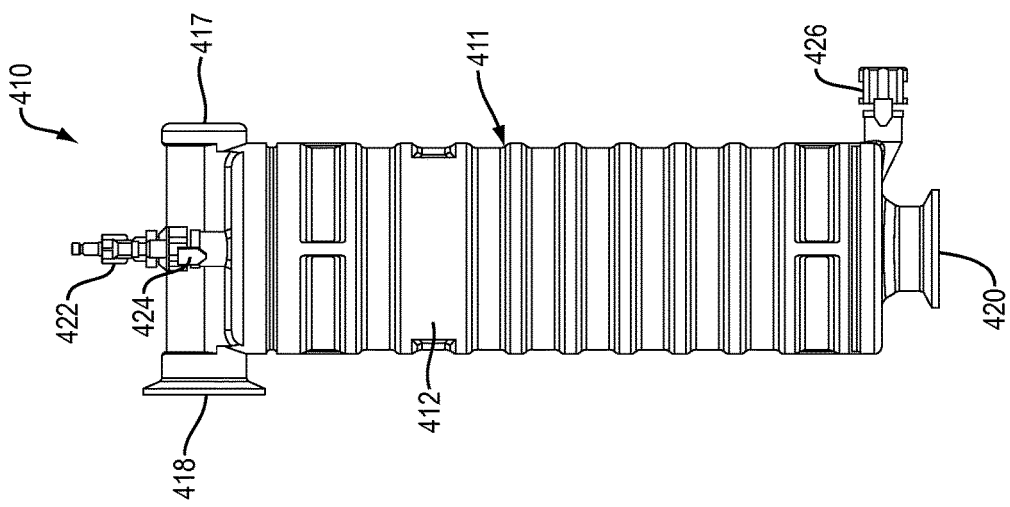
FIG. 11 is a side view in elevation of the liquid recovery filter assembly shown in FIGS. 4 and 7.

Referring now to FIGS. 3 and 8, in another aspect of the disclosure, an alternative embodiment of the liquid recovery filter assembly is shown designated generally as 310. Filter assembly 310 includes all of the components and elements disclosed above for filter assembly 210, i.e., a filter housing or shell 311 having a shell wall 312 with mutually opposed first or upper and second or lower ends designated 314 and 316, respectively, (the combination of which define an internal volume 328), and a toroidal filter element 330 secured therein. An upstream surface (or designated upstream surface) of filter element 330 and surrounding housing 311 define an upstream or inlet volume 334 therebetween. In the embodiment shown, filter element 330 has a hollow core 332, but may also be one of the other filter constructions disclosed herein.

An upstream vent port 324 and its optional associated valve 324v extend from upper end 314. An opposite upstream drain port 326 and its optional associated valve 326v extend from lower end 316 as shown schematically in FIG. 3, but not in FIG. 8. A downstream recovery port 322 extends from upper end 314 and has an optional recovery port valve 322v secured inline therein. A recovery filter 323 is secured in line with port 322 between upper end 314 and valve 322v, or may be enclosed in filter housing 311 and in fluid communication with port 322 as disclosed in detail hereinbelow. Recovery filter 323 should be selected from among the same construction material options and the same property/characteristic options disclosed for recovery filter 223.

The difference between filter assembly 210 and filter assembly 310 lies in the orientation of their respective inlet and outlet ports or passages. It will be seen in FIG. 3 that an upstream or inlet port 318 and its optional associated valve 318v extend radially from upper end 314. It should be understood this port (and optional associated valve) may extend also from any point on shell wall 312 upstream of filter element 330.

A downstream or outlet port 320 and its associated valve 320v extend from filter core 332 radially from lower end 316. It should be understood this port (and optional associated valve) may extend also from any point on shell wall 312 downstream of filter element 330. This configuration may be more readily installed in certain processing systems than the inline configuration of filter assembly 210. The liquid flow paths through filter assembly 310 during normal filtering operations and during the draining or recovery of liquids from filter assembly 310 are essentially the same as those disclosed above for filter assembly 210.

During normal filtering and recovery operations, filter assembly 310 is operated in the same manner as disclosed for filter assembly 210. The positions of the valves present on filter assembly 310 (open, closed, partially open) during normal filtering and recovery operations are identical to the corresponding valve positions of the corresponding valves of filter assembly 210 during normal filtering and recovery operations, e.g., upstream vent port valve 324v, and upstream drain port valve 326v (corresponding to upstream vent port valve 224v and upstream drain port valve 226v) are commonly closed during the primary filtration function. As such, the disclosure regarding the operation of filter assembly 210 for normal (primary) filtering and recovery operations is incorporated here by reference.

The configuration of filter assembly 310 may also perform the intended liquid filter and recovery functions when the liquid flow is reversed through the assembly. It should be understood that to operate filter assembly 310 in the reverse flow direction, the filter assembly may have to be spatially reoriented gravitationally to have reassigned ports positioned in locations to optimize performance with respect to their reassigned functions. For example, a port reassigned as an outlet port should be oriented gravitationally in a low or down position relative to the body of the filter assembly. This requirement may be eliminated in some embodiments if a dip tube (disclosed hereinbelow) is used.

In one possible reverse functional configuration, the assembly is reoriented such that outlet port 320, reassigned as an inlet port, is located at the gravitational top or high position. Upstream drain port 326 is reassigned as a downstream recovery port and will incorporate an inline recovery filter similar to, or the same as, recovery filter 323. Recovery port 322 is reassigned as an upstream drain port and often maintained in a closed condition during the main filtering operation. The use of a recovery filter 323 on port 322 is optional in this functional configuration and would need to be removed in certain cases, as disclosed above. When used in this manner, liquid introduced into port 320 (with valve 320v open, if present), flows into core 332 (or the lumen of the filter element if constructed from, for example, hollow fiber or tubular material), and radially outwardly through filter element 330 into internal volume 334 (now a downstream volume) and out of the filter assembly through port 318 as processed liquid. In this functional configuration, the remaining port(s) (port 324 in the embodiment shown in FIG. 3) is/are maintained in a closed condition (by, for example, closing valve 324v in the embodiment shown in FIG. 3) or could be eliminated from the embodiment as use of these ports risk contamination of the downstream filtered liquid when not coupled with a recovery filter. Once the intended volume of liquid is filtered through assembly 310, valve 320v is closed to cease flow.

The procedure to remove the resident unfiltered and filtered liquid within assembly 310 when operated in the reverse direction is the same as that disclosed for filter assembly 210 when operated in the reverse direction. Accordingly, the procedure disclosed for removing filtered and unfiltered liquid from filter assembly 210 when operated in a reverse direction is incorporated here by reference with respect to filter assembly 310.

Referring now to FIGS. 4, 7, 11, 12 and 13, another alternative embodiment of the liquid recovery filter assembly is shown designated generally as 410. Filter assembly 410 includes all of the components and elements disclosed above for filter assemblies 210 and 310, i.e., a filter housing or shell 411 having a shell wall 412 with mutually opposed first or upper and second or lower ends designated 414 and 416, respectively, the combination of which define an internal volume 428. A toroidal filter element 430 is secured therein. An upstream surface (or designated upstream surface) of filter element 430 and surrounding housing 411 define an upstream volume 434 therebetween. In the embodiment shown, filter element 430 has a hollow core 432, but may also be one of the other filter constructions disclosed herein.

An upstream vent port 424 and its optional associated valve 424v extend from upper end 414. An opposite upstream drain port 426 and its optional associated valve 426v extend from lower end 416. A downstream recovery port 422 extends from upper end 414 and has an optional recovery port valve 422v secured inline therein. A recovery filter 423 is secured in line with port 422 between upper end 414 and valve 422v, or may be enclosed in filter housing 411 and in fluid communication with port 422 as disclosed in detail hereinbelow. Recovery filter 423 should be selected from among the same construction material options and the same property/characteristic options disclosed for recovery filter 223.

Filter assembly 410 may be considered a hybrid of filter assemblies 210 and 310. An upstream or inlet port 418 and its optional associated valve 418v extend radially from upper end 414 in essentially the same orientation as the corresponding component 318 of filter assembly 310. It should be understood this port (and optional associated valve) may extend also from any point on shell wall 412 upstream of filter element 430. A downstream or outlet port 420 and its optional associated valve 420v extend coaxially from filter shell wall 412 in the manner of outlet port 220 of filter housing 210. It should be understood this port orientation can be altered (offset), in similar fashion as described for inlet port 218 to accommodate specific spatial needs.

During normal filtering and recovery operations, filter assembly 410 is operated in the same manner as disclosed for filter assemblies 210 and 310. The positions of the valves present on filter assembly 410 (open, closed, partially open) during normal filtering and recovery operations are identical to the corresponding valve positions of the corresponding valves of filter assembly 210 during normal filtering and recovery operations, e.g., upstream vent port valve 424v, and upstream drain port valve 426v (corresponding to upstream vent port valve 224v and upstream drain port valve 226v) are commonly closed during the primary filtration function. As such, the disclosure regarding the operation of filter assembly 210 for normal (primary) filtering and recovery operations is incorporated here by reference.

The configuration of filter assembly 410 may also perform the intended liquid filter and recovery functions when the liquid flow is reversed through the assembly. It should be understood that to operate filter assembly 410 in the reverse flow direction, the filter assembly may have to be spatially reoriented gravitationally to have reassigned ports positioned in locations to optimize performance with respect to their reassigned functions. For example, a port reassigned as an outlet port should be oriented gravitationally in a low or down position relative to the body of the filter assembly. This requirement may be eliminated in some embodiments if a dip tube (disclosed hereinbelow) is used.

In one possible reverse functional configuration, the assembly is reoriented such that outlet port 420, reassigned as an inlet port, is located at the gravitational top or high position. Upstream drain port 426 (and if present, optional drain port valve 426v) is reassigned as a downstream recovery port (and optional downstream recovery port valve) and will incorporate an inline recovery filter similar to, or the same as, recovery filter 423. Recovery port 422 (and if present, optional recovery port valve 426v) is reassigned as an upstream drain port (and optional reassigned upstream drain port valve) and often maintained in a closed condition during the main filtering operation. The use of a recovery filter 423 on port 422 is optional in this functional configuration and may need to be removed in certain cases, as disclosed above. When used in this manner, liquid introduced into port 420 (with valve 420v open, if present), flows into core 432 (or the lumen of the filter element if constructed from, for example, hollow fiber or tubular material), and radially outwardly through filter element 430 into internal volume 434 (now a downstream volume) and out of the filter assembly through port 418 as processed liquid. In this functional configuration, the remaining port(s) (port 424 in the embodiment shown in FIG. 4) is/are maintained in a closed condition (by, for example, closing valve 424v in the embodiment shown in FIG. 4), or could be eliminated from the embodiment, as use of these ports risk contamination of the downstream filtered liquid when not coupled with a recovery filter.

The procedure to remove the resident unfiltered and filtered liquid within assembly 410 when operated in the reverse direction is the same as that disclosed for filter assembly 210 when operated in the reverse direction. Accordingly, the procedure disclosed for removing filtered and unfiltered liquid from filter assembly 210 when operated in a reverse direction is incorporated here by reference with respect to filter assembly 410.

Figure 5:
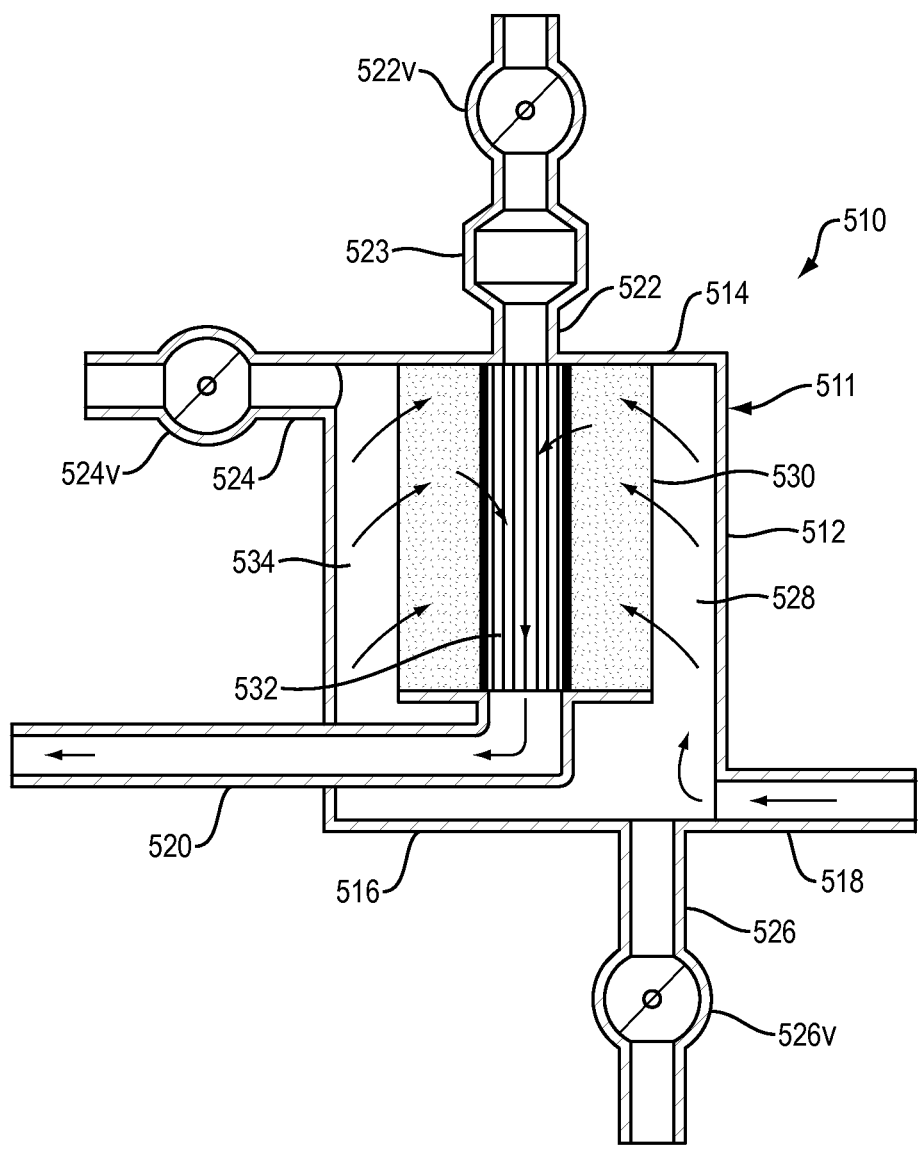
FIG. 5 is an elevation view in section of a liquid recovery filter according to yet another aspect of the disclosure having a generally T-shaped flow path, illustrating its internal configuration.
Figure 9:
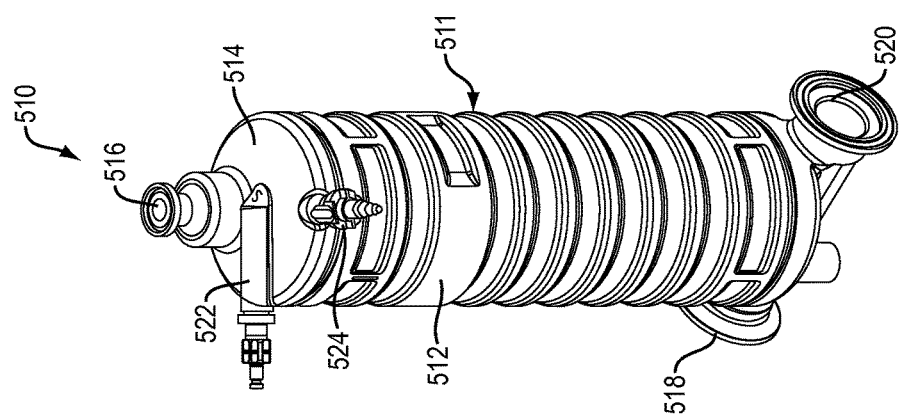
FIG. 9 is a front top perspective view of a liquid recovery filter assembly according to the embodiment shown in FIG. 5.

Referring now to FIGS. 5 and 9, a liquid recovery filter assembly 510 is shown that includes corresponding components to those disclosed above for filter assemblies 210 through 410, i.e., a filter housing or shell 511 having a shell wall 512 with mutually opposed first or upper and second or lower ends designated 514 and 516, respectively, collectively defining an internal volume 528. A toroidal filter element 530 is secured therein. An upstream surface (or upstream designated surface) of filter element 530 and surrounding housing 511 define an upstream or inlet volume 534 therebetween. Filter element 530 has a hollow core 532, but may also be one of the other filter constructions disclosed herein.

An upstream vent port 524 and its optional associated valve 524v extend from upper end 514. An opposite upstream or inlet side drain port 526 and its optional associated valve 526v extend from lower end 516 as shown schematically in FIG. 5, but not in FIG. 9. A downstream recovery port 522 extends from upper end 514 and has an optional recovery port valve 522v secured inline therein. A recovery filter 523 is secured in-line with port 522 between upper end 514 and valve 522v, or may be enclosed in filter housing 511 and in fluid communication with port 522 and filter core 532 as disclosed in detail hereinbelow. Recovery filter 523 should be selected from among the same construction material options and the same property/characteristic options disclosed for recovery filter 223.

The placement of an upstream or inlet port 518 (and an optional inlet port valve 518v secured in-line with the port) extending substantially radially from lower end 516 and a downstream or outlet port 520 (and an optional outlet port valve 520v secured in-line with the port) also extending substantially radially from lower end 516 (albeit from an opposite or different radial direction relative to a filter assembly longitudinal axis) requires liquid passing through filter assembly 510 to flow initially upward into upstream volume 534 through filter element 530 then downwardly through core 532 and into outlet port 518 from which the filtered liquid exits the filter assembly. This flow path should not present any problems with flow, particularly with pressurized filtering systems. Apart from this flow path distinction, liquid flow through filter assembly 510 is substantially as disclosed above for the other filter assembly embodiments.

During normal filtering and recovery operations, filter assembly 510 is operated in the same manner as disclosed for filter assembly 210. The positions of the valves present on filter assembly 510 (open, closed, partially open) during normal filtering and recovery operations are identical to the corresponding valve positions of the corresponding valves of filter assembly 210 during normal filtering and recovery operations, e.g., upstream vent port valve 524v, and upstream drain port valve 526v (corresponding to upstream vent port valve 224v and upstream drain port valve 226v) are commonly closed during the primary filtration function. As such, the disclosure regarding the operation of filter assembly 210 for normal (primary) filtering and recovery operations is incorporated here by reference.

The configuration of filter assembly 510 may also perform the intended liquid filter and recovery functions when the liquid flow is reversed through the assembly. It should be understood that to operate filter assembly 510 in the reverse flow direction, the filter assembly may have to be spatially reoriented gravitationally to have reassigned ports positioned in locations to optimize performance with respect to their reassigned functions. For example, a port reassigned as an outlet port should be oriented gravitationally in a low or down position relative to the body of the filter assembly. This requirement may be eliminated in some embodiments if a dip tube (disclosed hereinbelow) is used.

In one possible reverse functional configuration that differs from the reverse functional configurations of filter assembly embodiments 210, 310, 410 and 610, the assembly may be maintained in the orientation shown schematically in FIGS. 5 and 9, such that outlet port 520, reassigned as an inlet port, remains located at the gravitational bottom or low position. It should be noted that reorientation is not necessary for this functional configuration compared to the orientation shown as the reassigned outlet port is located at the gravitational bottom or low position in the orientation shown schematically in FIGS. 5 and 9. Upstream vent port 524 is reassigned as a downstream recovery port and will incorporate an inline recovery filter similar to, or the same as, recovery filter 523. Recovery port 522 is reassigned as an upstream vent port and often maintained in a closed condition during the main filtering operation.

The use of a recovery filter 523 on port 522 is optional in this functional configuration. When used in this manner, liquid introduced into port 520 (with valve 520v open, if present), flows into core 532 (or the lumen of the filter element if constructed from, for example, hollow fiber or tubular material), and radially outwardly through filter element 530 into internal volume 534 (now a downstream volume) and out of the filter assembly through port 518 as processed liquid. In this functional configuration, the remaining port(s) (port 526 in the embodiment shown in FIG. 5) is/are maintained in a closed condition (by, for example, closing valve 526v in the embodiment shown in FIG. 5) or could be eliminated from the embodiment, as use of these ports risk contamination of the downstream filtered liquid when not coupled with a recovery filter. Once the intended volume of liquid is filtered through assembly 510, valve 520v may be closed to cease flow.

The procedure to remove the resident unfiltered and filtered liquid within assembly 510 when operated in the reverse direction is the same as that disclosed for filter assembly 210 when operated in the reverse direction, with the noted exception that in filter assembly 510, port 524 is reassigned as a downstream recovery port (providing comparable functionality to port 226 reassigned as a downstream recovery port in filter assembly 210) and port 526 is maintained closed, or may be removed. Accordingly, the procedure disclosed for removing filtered and unfiltered liquid from filter assembly 210 when operated in a reverse direction is incorporated here by reference with respect to filter assembly 510.

Figure 6:
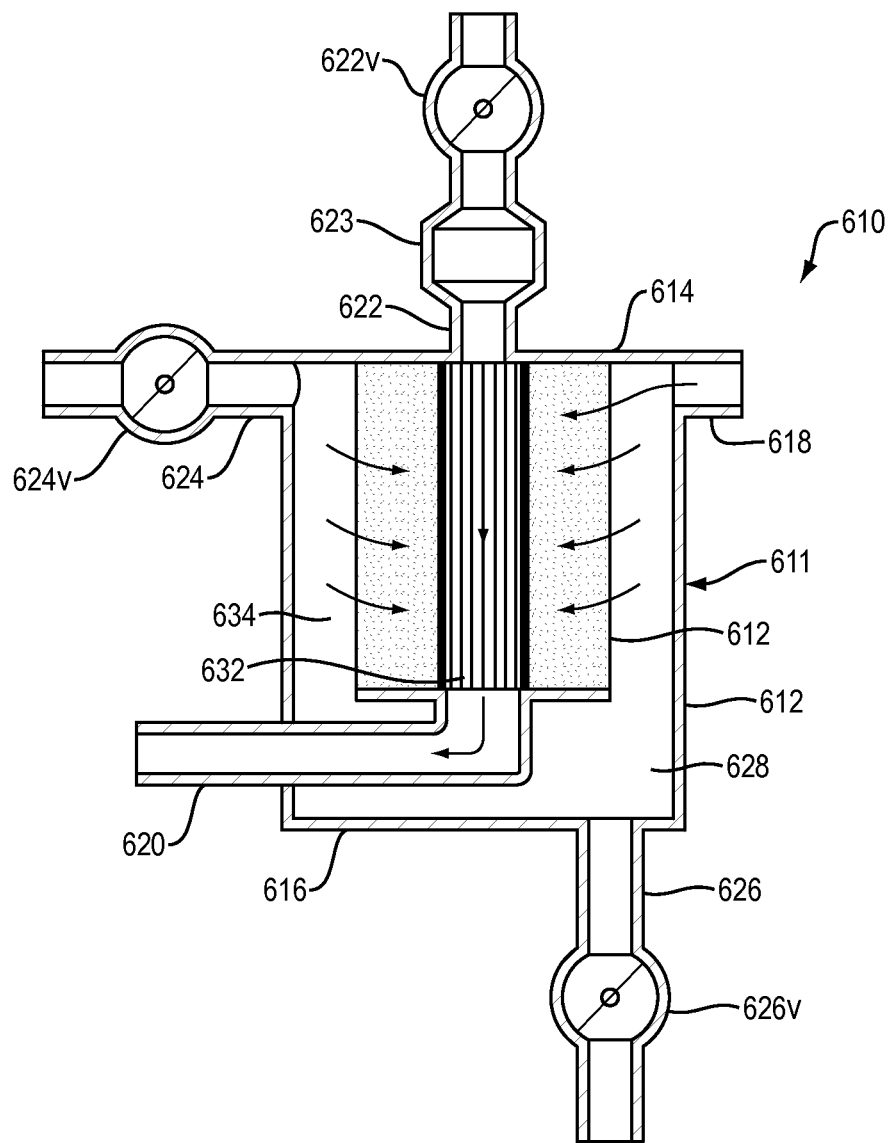
FIG. 6 is an elevation view in section of a liquid recovery filter according to another aspect of the disclosure having a generally S-shaped flow path, illustrating its internal configuration.

Referring now to FIG. 6, a yet further aspect of the liquid recovery filter assembly designated generally as 610 has a configuration that differs from that of filter assembly 510, i.e., filter assembly 610's filter inlet port extends radially from an upper end of the filter assembly rather than from a lower end as shown for filter assembly 510. Filter assembly 610, however, includes several components corresponding to those disclosed above for filter assemblies 210 through 510, i.e., a filter housing or shell 611 having a shell wall 612 with mutually opposed first or upper and second or lower ends 614 and 616, respectively, collectively defining an internal volume 628. A toroidal filter element 630 is secured therein. Filter element 630 and surrounding housing 611 define an upstream or inlet volume 634 therebetween. Filter element 630 has a hollow core 632.

An upstream vent port 624 and its associated valve 624v extend radially from upper or inlet end 614. An opposite upstream or inlet side drain port 626 and its associated valve 626v extend downwardly from lower end 616. A recovery port 622 and its optional associated valve 622v extend from upper end 614 and are in fluid communication with core 632. A recovery filter 623 is secured in-line and in fluid communication with port 622 between core 632 and recovery port valve 622v. Recovery filter 623 should be selected from among the same construction material options and the same property/characteristic options disclosed for recovery filter 223.

Liquid flow through filter housing 610 is essentially the same as disclosed above for filter assembly 310. Liquid flow during normal filtering operations initially passes through radially disposed inlet port 618 and its normally open valve 618v at upper end 614, and then enters upstream internal volume 634. The liquid then passes through filter element 630 into filter core 632, and downwardly out of core 632 to flow out of filter assembly 610 from radially disposed downstream or outlet port 620 and its normally open valve 620v at lower end 614.

During normal filtering and recovery operations, filter assembly 610 is operated in the same manner as disclosed for filter assemblies 210 through 510. The positions of the valves present on filter assembly 610 (open, closed, partially open) during normal filtering and recovery operations are identical to the corresponding valve positions of the corresponding valves of filter assembly 210 during normal filtering and recovery operations, e.g., upstream vent port valve 624v, and upstream drain port valve 626v (corresponding to upstream vent port valve 224v and upstream drain port valve 226v) are commonly closed during the primary filtration function. As such, the disclosure regarding the operation of filter assembly 210 for normal (primary) filtering and recovery operations is incorporated here by reference.

The configuration of filter assembly 610 may also perform the intended liquid filter and recovery functions when the liquid flow is reversed through the assembly. It should be understood that to operate filter assembly 610 in the reverse flow direction, the filter assembly may have to be spatially reoriented gravitationally to have reassigned ports positioned in locations to optimize performance with respect to their reassigned functions. For example, a port reassigned as an outlet port should be oriented gravitationally in a low or down position relative to the body of the filter assembly. This requirement may be eliminated in some embodiments if a dip tube (disclosed hereinbelow) is used.

In one possible reverse functional configuration, the assembly is reoriented such that outlet port 620, reassigned as an inlet port, is located at the gravitational top or high position. Upstream drain port 626 is reassigned as a downstream recovery port and will incorporate an inline recovery filter similar to, or the same as, recovery filter 623. Recovery port 622 is reassigned as an upstream drain port and often maintained in a closed condition during the main filtering operation.

The use of a recovery filter 623 on port 622 is optional in this functional configuration and may need to be removed in certain cases, as disclosed above. When used in this manner, liquid introduced into port 620 (with valve 620v open, if present), flows into core 632 (or the lumen of the filter element if constructed from, for example, hollow fiber or tubular material), and radially outwardly through filter element 630 into internal volume 634 (now a downstream volume) and out of the filter assembly through port 618 as processed liquid. In this functional configuration, the remaining port(s) (port 624 in the embodiment shown in FIG. 6) is/are maintained in a closed condition (by, for example, closing valve 624v in the embodiment shown in FIG. 6), or may be eliminated from the embodiment, as use of these ports risk contamination of the downstream filtered liquid when not coupled with a recovery filter. Once the intended volume of liquid is filtered through assembly 610, valve 620v is closed to cease flow.

The procedure to remove the resident unfiltered and filtered liquid within assembly 610 when operated in the reverse direction is the same as that disclosed for filter assembly 210 when operated in the reverse direction. Accordingly, the procedure disclosed for removing filtered and unfiltered liquid from filter assembly 210 when operated in a reverse direction is incorporated here by reference with respect to filter assembly 610.

Figure 21:
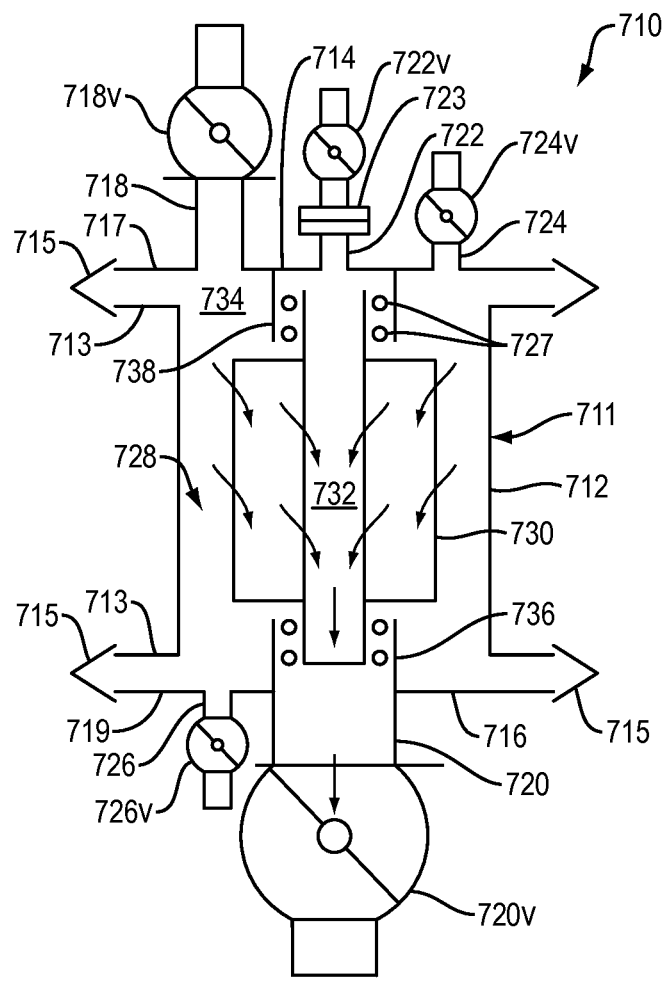
FIG. 21 is a sectional view in elevation of a single-round liquid recovery filter assembly with a double open ended filter cartridge according to yet another aspect of the disclosure.

Referring now to FIG. 21, in another aspect of the disclosure, a liquid recovery filter is shown designated generally as filter assembly 710. This schematic representation shows an embodiment very similar to 210 disclosed in FIGS. 2 and 10; however, additional detail and features are shown to highlight how a replaceable filter cartridge may be disposed in a filter assembly housing or shell that can be disassembled to retrieve and replace used cartridges. Filter assembly 710 is configured as a single round housing that encloses a single filter cartridge. It should be understood that the length and width and overall geometric configuration of the filter assembly embodiment shown in FIG. 21 is by way of illustration and not limitation, and will depend upon the configuration of the filter element installed therein according to the intended use and operating environment.

Filter assembly 710 includes a housing or shell 711 having a shell wall 712 with an upper end cap 714 and an opposite lower end cap 716, both of which are secured to shell wall 712. It should be understood that either end cap can be integral to shell wall 712 as long as one of the end caps is removable to permit extraction and replacement of the enclosed filter cartridge. The combination of shell wall 712, upper end cap 714 and lower end cap 716 define a filter assembly inner chamber 728.

In the configuration shown, the two end caps are secured to shell wall 712 with band clamps 715 that secure shell wall flanges 713 to upper end cap flanges 717 and lower end cap flanges 719. It should be understood that various other methods of attachment may be used such as bolt and nut assemblies or other types of clamps such as sanitary style clamps. A gasket may or may not be used between the registered surfaces of the shell wall and end cap(s).

An inlet port 718 extends (upwardly based on the filter assembly orientation shown in FIG. 21) from upper end cap 714 axially parallel to a longitudinal axis of the enclosed filter, as defined by its inlet and outlet ends. It should be understood that the parallel orientation of inlet port 718 relative to the longitudinal axis of the enclosed filter may be altered (angled away from a parallel orientation including an orthogonal orientation), to accommodate particular spatial needs. Inlet port 718 may also connect directly to shell wall 712 rather than upper end cap 714. Inlet port 718 is in fluid communication with an upstream internal volume 734 defined by the combination of shell wall 712, upper end cap 714, lower end cap 716 and a designated upstream surface of an enclosed filter element disclosed in more detail below.

An outlet port 720 extends coaxially (with the filter) downwardly from lower end cap 716 and is in liquid communication with a filter core 732, or downstream side of the enclosed filter element. As shown in FIG. 21, outlet port 720 has a longitudinal axis aligned with the longitudinal axis of the enclosed filter element. It should be understood this orientation can be altered (offset), in similar fashion to inlet port 718 to accommodate specific spatial needs. Alternatively, the orientation of inlet port 718 and outlet port 720 may be arranged to conform to the orientations disclosed in embodiments 210 through 610, or to any orientation known in the art for the arrangement of inlet and outlet ports for filter assemblies.

A recovery port 722 extends from upper end cap 714. Recovery port 722 communicates with the outlet portion or core 732 of the filter cartridge, as described in more detail below. Recovery port 722 is shown as being oriented coaxially with the enclosed filter element. It should be understood that although port 722 must be in fluid communication with the core of the enclosed filter cartridge, the coaxial orientation can be altered to accommodate spatial needs.

A recovery filter 723 is secured to port 722 between the two ends of the port and is in fluid communication with a lumen formed by the port. Recovery filter 723 should be selected from among the same construction material options and the same property/characteristic options disclosed for recovery filter 223. A recovery port valve 722v is secured to port 722 on a side of recovery filter 723 distal from upper end 714. Valve 722v is maintained in a closed position during normal filtering operations and is opened to permit the introduction of pressurized gas to recovery filtered liquids resident in the filter core (or to function as a vent).

An optional upstream vent port 724 also extends from upper end cap 714 to vent upstream internal volume 734. Lastly, an optional upstream drain port 726 extends from lower end cap 716 for draining liquids from upstream internal volume 734. This general external configuration of filter assembly 710 is similar to filter assembly 210.

As previously disclosed, filter housing 711 defines internal volume 728 having a filter cartridge 730 disposed therein. The filter cartridge may have a generally toroidal configuration (such as the pleated cartridge filter shown in cross-section) and a hollow outlet core 732. It should be understood that filter cartridge 730 may conform to any of the embodiments disclosed herein and be made from any of the materials disclosed herein, or from those generally well known in the art for filter elements.

To secure a first end of filter cartridge 730 in filter assembly 710, upper end cap 714 is formed with an upper cartridge receiving wall 738 dimensioned and shaped to conform to the shape of the cartridge registration or mounting surfaces of filter cartridge 730 as are well known in the art. For cylindrical cartridges, receiving wall 738 is circular in cross-section (although other cross-sectional shapes are possible and within the scope of this disclosure), and has an inner diameter greater than the diameter of the mounting surfaces of filter cartridge 730. Alternatively, receiving wall 738 can be substituted with a mounting post with an outside diameter less than an inner diameter of an annular axially projecting mounting surface on the cartridge.

With either mounting configuration, to secure filter cartridge 730 to upper end cap 714, one or more O-rings 727 are positioned between the capsule and filter registration surfaces as shown in FIG. 21 to create a releasable, but substantially liquid tight seal between wall 738 and filter cartridge 730. As previously stated, it should also be understood that the relative diameters of the receiving wall or post 738 and the cartridge mounting surfaces can be reversed wherein the inner diameter of the mounting surfaces are greater than the out diameter of the receiving wall or post. In this reversed configuration, the O-rings seal the inner mounting surface of the filter cartridge to the outer surface of the receiving wall or post. It should also be understood that other mounting methods, e.g., gasket seals, threading one cartridge end and using an O-ring seal on the other, or an O-ring seal on one end and a flat gasket seal on the other end, as well as other methods commonly known in the art for attaching filter elements into housings may be used to secure the filter cartridge to the shell wall.

To secure a second end of filter cartridge 730 in filter assembly 710, lower end cap 716 is formed with a lower cartridge receiving wall 736 dimensioned and shaped to conform to the shape of the cartridge registration surfaces of filter cartridge 730 as are well known in the art. For cylindrical cartridges, lower receiving wall 736 is circular in cross-section (although other cross-sectional shapes are possible and within the scope of this disclosure) and has an inner diameter greater than the diameter of the mounting surfaces of filter cartridge 730. To secure filter cartridge 730 to lower end cap 716, one or more O-rings 727 are positioned between the surfaces as shown in FIG. 21 to create a releasable, but substantially liquid and air tight seal between wall 736 and filter cartridge 730. It should also be understood that the relative diameters of the receiving wall or post 736 and the cartridge mounting surfaces can be reversed wherein the inner diameter of the mounting surfaces are greater than the outer diameter of the receiving wall or post. In this reversed configuration, the O-rings seal the inner mounting surface of the filter cartridge to the outer surface of the receiving wall or post. It should be understood that other mounting methods, as described elsewhere in the disclosure as well as other methods commonly known in the art for attaching filter elements into housings, may be used to secure the filter cartridge to the shell wall. It further should be understood that the filter cartridge can be permanently secured to one of the end caps and that such end cap can be removed from housing 711.

In practice, for the embodiment shown in FIG. 21, upper end cap 714 will be removed from filter assembly 710 and filter cartridge 730 will be placed into internal volume 728 and inserted into lower receiving wall 736. Upper end cap 714 will then be placed onto shell wall 712 with upper receiving wall 738 aligned with a top end of filter cartridge 730. Once upper end cap 714 is fully registered against shell wall 712, clamp 715, (or any other method used to secure the end caps), is secured to the shell wall and end cap flanges to complete the assembly (or re-assembly) process to prepare filter assembly 710 for use, or further assembly to a larger assembly. It should be understood that other methods disclosed herein as well as other methods known in the art for securing end caps to housing walls may be used and are within the contemplation and scope of the disclosure. It further should be understood this process may also be reversed whereby the lower cap is removed and the filter cartridge is inserted into the filter housing and secured to the upper receiving wall or post first and then secured to the receiving wall or post of the outlet end cap when the outlet end cap is placed back on the filter housing or shell wall.

It should be understood further that the foregoing assembly procedure relates to filter cartridges designed to be removed and replaced. For assemblies designed for one-time or continual use, it should be also further understood that filter cartridge 730 may be secured in any of the disclosed filter housings via thermal or sonic bonding, adhesive, O-ring seals and any combination of these methods as well as any another other method used to secure filters in housings or capsules as disclosed herein and/or well known in the art.

As previously disclosed, the combination of filter housing 711 and an upstream designated surface of filter element 730 define an upstream volume 734. Unfiltered liquid enters upstream volume 734 of filter assembly 710 via upstream or inlet passage 718 and passes through liquid permeable filter element 730 to hollow outlet core 732 of filter cartridge 730, and then exits filter assembly 710 through outlet port 720 as filtered liquid.

To control the flow of liquids through filter assembly 710, each of the various passages or ports 718 through 726 may include a dedicated valve therein. Although each passage or port may be configured with a valve, different embodiments may be configured with valves for only some and even none of the passages and/or ports. Multiple combinations of passages and ports with or without valves are within the contemplation and scope of the disclosure. For purposes of illustration as well as for completeness of the disclosure, dedicated valves for selective ports of filter assembly 710 are designated as valves 722v through 726v. Valves 722v through 726v are shown schematically in FIG. 21, and may be any suitable type of valve known in the art.

In the embodiment shown in FIG. 21, during normal filtering and recovery operations, filter assembly 710 is operated in the same manner as disclosed for filter assemblies 210 through 610. The positions of the valves present on filter assembly 710 (open, closed, partially open) during normal filtering and recovery operations are identical to the corresponding valve positions of the corresponding valves of filter assembly 210 during normal filtering and recovery operations, e.g., upstream vent port valve 724v, and upstream drain port valve 726v (corresponding to upstream vent port valve 224v and upstream drain port valve 226v) are commonly closed during the primary filtration function. As such, the disclosure regarding the operation of filter assembly 210 for normal (primary) filtering and recovery operations is incorporated here by reference.

The configuration of filter assembly 710 may also perform the intended liquid filter and recovery functions when the liquid flow is reversed through the assembly. It should be understood that to operate filter assembly 710 in the reverse flow direction, the filter assembly may have to be spatially reoriented gravitationally to have reassigned ports positioned in locations to optimize performance with respect to their reassigned functions. For example, a port reassigned as an outlet port should be oriented gravitationally in a low or down position relative to the body of the filter assembly. This requirement may be eliminated in some embodiments if a dip tube (disclosed hereinbelow) is used.

In one possible reverse functional configuration, the assembly is reoriented such that outlet port 720, reassigned as an inlet port, is located at the gravitational top or high position. Upstream drain port 726 (and if present, optional drain port valve 726v) is reassigned as a downstream recovery port (and optional downstream recovery port valve) and will incorporate an inline recovery filter similar to, or the same as, recovery filter 723. Recovery port 722 (and if present, optional recovery port valve 726v) is reassigned as an upstream drain port (and optional reassigned upstream drain port valve) and often maintained in a closed condition during the main filtering operation.

The use of a recovery filter 723 on port 722 is optional in this functional configuration and may need to be removed in certain cases, as disclosed above. When used in this manner, liquid introduced into port 720 (with valve 720v open, if present), flows into core 732 (or the lumen of the filter element if constructed from, for example, hollow fiber or tubular material), and radially outwardly through filter element 730 into internal volume 734 (now a downstream volume) and out of the filter assembly through port 718 as processed liquid. In this functional configuration, the remaining port(s) (port 724 in the embodiment shown in FIG. 21) is/are maintained in a closed condition (by, for example, closing valve 724v in the embodiment shown in FIG. 21), or could be eliminated from the embodiment, as use of these ports risk contamination of the downstream filtered liquid when not coupled with a recovery filter.

The procedure to remove the resident unfiltered and filtered liquid within assembly 710 when operated in the reverse direction is the same as that disclosed for filter assembly 210 when operated in the reverse direction. Accordingly, the procedure disclosed for removing filtered and unfiltered liquid from filter assembly 210 when operated in a reverse direction is incorporated here by reference with respect to filter assembly 710.

Figure 22:
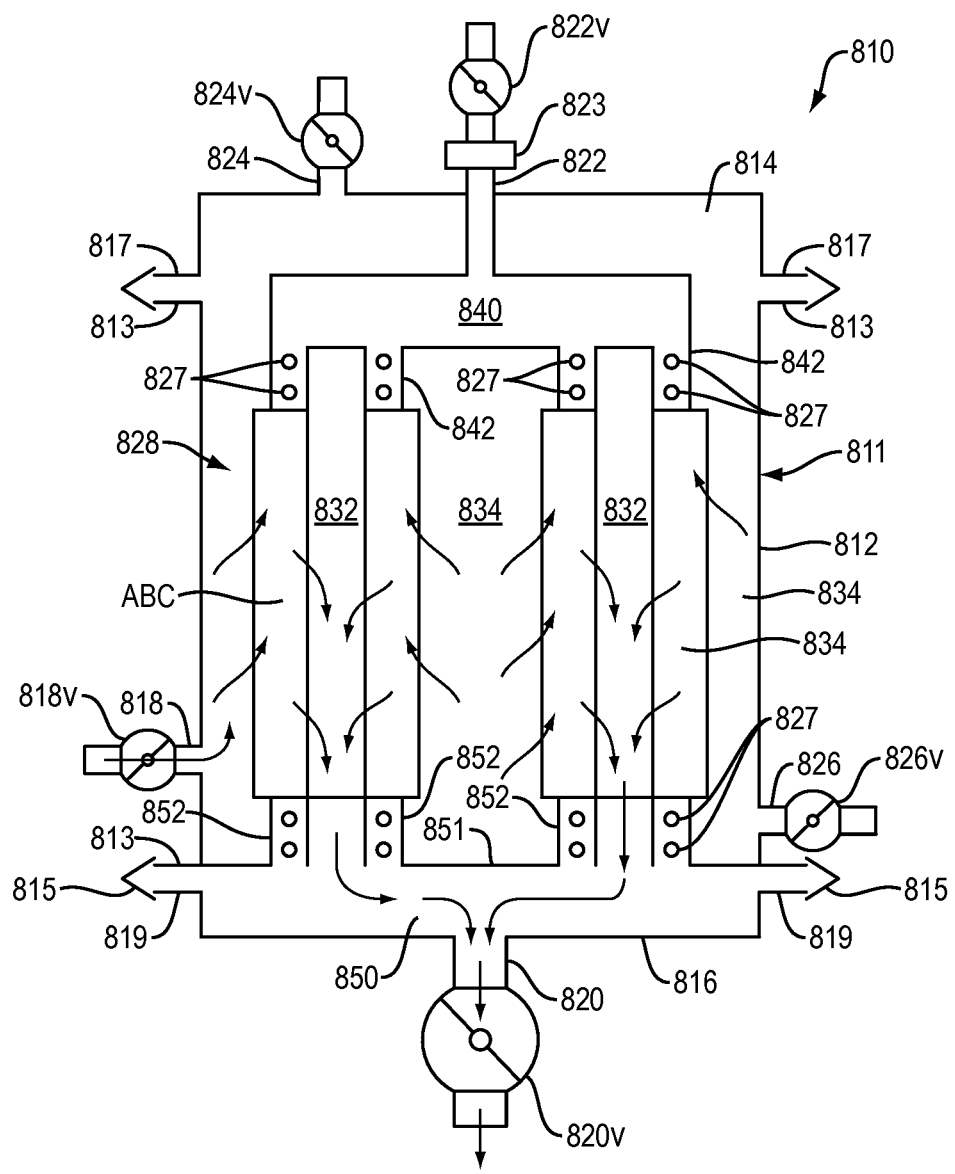
FIG. 22 is a sectional view in elevation of a multi-round liquid recovery filter assembly with double open ended filter cartridges according to still another aspect of the disclosure.

Referring now to FIG. 22, in another aspect of the disclosure, a liquid recovery filter is shown designated generally as filter assembly 810. This embodiment is similar to the embodiment shown in FIG. 21 in that it incorporates replaceable filter cartridges disposed in a filter assembly housing or shell wall that can be disassembled to retrieve and replace used cartridges. Filter assembly 810 is configured as a multi-round housing that encloses two or more filter cartridges. It should be understood that the length and width of the filter assembly embodiment shown in FIG. 22 is by way of illustration and not limitation, and will depend upon the configuration of the filter elements installed therein according to the intended use and operating environment.

Filter assembly 810 includes a housing or shell 811 having a shell wall 812 with an upper inlet end cap 814 and an opposite lower outlet end cap 816, both of which are secured to shell wall 812 and that collectively define an internal volume 828. It should be understood that either end cap can be integral to shell wall 812 as long as one of the end caps is removable to permit extraction and replacement of the enclosed filter cartridges. In the configuration shown, the two end caps are secured to shell wall 812 with band clamps 815 that secure shell wall flanges 813 to upper end cap flanges 817 and lower end cap flanges 819. It should be understood that various other methods of attachment may be used such as bolt and nut assemblies, or other types of clamps such as sanitary type clamps. A gasket may or may not be used between the registered surfaces of the shell wall and end caps.

An inlet port 818 extends laterally from shell wall 812. It should be understood that the location of inlet port 818 in terms of its height or radial position as well as its orientation relative to the longitudinal axis of the enclosed filter may be altered (raised, lowered, rotated, angled away from an orthogonal orientation, etc.), to accommodate particular spatial needs. Inlet port 818 may also may also connect directly to inlet cap 814 rather than shell wall 812. Inlet port 818 is in liquid communication with an upstream internal volume 834 defined by the combination of housing 811 and an upstream designated surface of filter element 830.

An outlet port 820 extends substantially parallel to the longitudinal axes of enclosed filter cartridges 830 downwardly from lower end cap 816 and is in liquid communication with filter cores 832, or downstream side of the enclosed filter cartridges via an outlet manifold 850 that connects cores 832 with outlet 820. As shown in FIG. 22, outlet port 820 has a longitudinal axis substantially parallel with the longitudinal axis of the enclosed filter cartridges. It should be understood this orientation can be altered (offset), in similar fashion to inlet port 818 to accommodate specific spatial needs. Alternatively, the orientation of inlet port 818 and outlet port 820 may conform to the orientations disclosed in embodiments 210 through 610, or to any orientation known in the art for the arrangement of inlet and outlet ports for filter assemblies.

As shown in FIG. 22, outlet manifold 850 is formed by a combination of a bottom end 851 of shell wall 812 that has portions defining lower end filter cartridge receiving walls 852 disclosed in more detail below. It should be understood that outlet manifold 850 may be formed entirely as an integral part of outlet end cap 816, or an integral part of shell wall 812.

A recovery port 822 extends from upper end cap 814. Recovery port 822 communicates with the outlet portions or cores 832 of the filter cartridges via an outlet vent manifold 840, as described in more detail below. Recovery port 822 is shown as being oriented substantially parallel with the longitudinal axes of the enclosed filter cartridges. It should be understood that although port 822 must be in liquid communication with the cores of the enclosed filter cartridges, the substantially parallel orientation can be altered to accommodate spatial needs.

A recovery filter 823 is secured to port 822 between the two ends of the port and is in fluid communication with a lumen formed by the port. Recovery filter 823 should be selected from among the same construction material options and the same property/characteristic options disclosed for recovery filter 223. A recovery port valve 822v is secured to port 822 on a side of recovery filter 823 distal from upper end 814. Valve 822v is maintained in a closed position during normal filtering operations and is opened to permit the introduction of pressurized gas to recovery filtered liquids resident in the filter core (or to function as a vent).

An upstream vent port 824 also extends from inlet end cap 814 to vent upstream internal volume 834 (defined by the combination of housing 811 and upstream designated surfaces of the filter cartridges). Lastly, an upstream drain port 826 extends laterally from a lower end of shell wall 812 for draining liquids from upstream internal volume 834 and may be located at any radial orientation relative to the location of inlet 818. This general external configuration of filter assembly 810 is similar to filter assembly 110 of FIG. 1, with the exception of the orientation of inlet port 818 and upstream drain passage 826.

As previously disclosed, filter housing 811 defines an internal volume 828 having two or more filter cartridges 830 disposed therein in what can be a circular arrangement of filter cartridges although other orientations (linear, rows, etc.) may be used. The filter cartridges may have a generally toroidal configuration (such as the pleated cartridge filters as shown in cross-section) and hollow outlet cores 832. It should be understood that filter cartridges 830 may conform to any of the embodiments disclosed herein and be made from any of the materials disclosed herein, or from those generally well known in the art for filter elements.

To secure a first end of filter cartridges 830 in filter assembly 810, vent manifold 840, secured to inlet end cap 814, is formed with a plurality of upper cartridge receiving walls 842 dimensioned and shaped to conform to the shape of the cartridge registration or mounting surfaces of filter cartridges 830 as are well known in the art. For cylindrical cartridges, receiving walls 842 will be circular in cross-section (although other cross-sectional shapes are possible and within the scope of this disclosure) and have an inner diameter greater than the diameter of the mounting surfaces of filter cartridges 830.

To secure filter cartridge 830 to inlet cap 814, one or more O-rings 827 are positioned between the surfaces as shown in FIG. 22 to create a releasable, but substantially liquid and air tight seal between walls 838 and filter cartridges 830. It should also be understood that the relative diameters of the receiving walls or posts 838 and the cartridges' mounting surfaces can be reversed wherein the inner diameter of the mounting surfaces are greater than the out diameter of the receiving walls or posts. In this reversed configuration, the O-rings seal the inner mounting surfaces of the filter cartridges to the outer surfaces of the receiving wall or post. It should also be understood that other mounting methods, e.g., flat gasket seals, threading one cartridge end and using an O-ring seal on the other, or an O-ring seal on one end and a flat gasket seal on the other end, as well as other methods commonly known in the art for attaching filter elements into housings (as well as any of the methods disclosed for filter assembly 710), may be used to secure the filter cartridges to the shell walls.

To secure second ends of filter cartridges 830 in filter assembly 810, the bottom end of shell wall 812, (or portions of outlet end cap 816), is formed with a plurality of lower cartridge receiving walls 852 dimensioned and shaped to conform to the shape of the cartridge registration surfaces of filter cartridges 830 as are well known in the art. For cylindrical cartridges, lower receiving walls 836 will be circular in cross-section (although other cross-sectional shapes are possible and within the scope of this disclosure) and have inner diameters greater than the diameters of the mounting surfaces of filter cartridges 830. To secure filter cartridges 830 to outlet cap 816, (or bottom end of shell wall 812), one or more O-rings 827 are positioned between the surfaces as shown in FIG. 22 to create a releasable, but substantially liquid and air tight seal between walls 852 and filter cartridges 830.

It should be understood that the relative diameters of the receiving walls or posts 836 and the cartridges' mounting surfaces can be reversed wherein the inner diameter of the mounting surfaces are greater than the out diameter of the receiving walls or posts. In this reversed configuration, the O-rings seal the inner mounting surfaces of the filter cartridges to the outer surfaces of the receiving walls or posts. It also should be understood that other mounting methods, described elsewhere in this disclosure as well as other methods commonly known in the art for attaching filter elements to and into housings, may be used to secure the filter cartridge to the shell wall.

In practice, for the embodiment shown in FIG. 22, inlet cap 814 will be removed from filter assembly 810 and filter cartridges 830 will be placed into internal volume 828 and each inserted into one of the lower receiving walls 836. Inlet cap 814 will then be placed onto shell wall 812 with upper receiving walls 842 each aligned with a top end of one of the plurality of filter cartridges 830. Once upper end cap 814 is fully registered against shell wall 812, clamps 815, (or any other method used to secure the end caps), is secured to the shell wall and end cap flanges to complete the assembly (or re-assembly) process to prepare filter assembly 810 for use, or further assembly to a larger assembly. It should be understood this process may also be reversed whereby the outlet cap is removed and the filter cartridges are inserted into the filter housing and secured to the upper receiving walls or posts first and then secured to the receiving walls or posts of the outlet end cap when the outlet end cap is placed back on the filter housing or shell wall.

It should be understood the foregoing assembly procedure relates to filter cartridges designed to be removed and replaced. For assemblies designed for one-time or continual use, it should be also further understood that filter cartridges 830 may be secured in any of the disclosed filter housings via thermal or sonic bonding, adhesive, O-ring seals and any combination of these methods as well any another other method used to secure filters in housings or capsules as disclosed herein and/or well known in the art.

As previously disclosed, the combination of housing 811 and an upstream designated surface of filter cartridges 830 define an upstream volume 834. Unfiltered liquid enters upstream volume 834 via inlet port 818 and passes through liquid permeable filter cartridges 830 to hollow outlet cores 832 of filter cartridges 830, and then exits filter assembly 810 through outlet manifold 850 and then outlet port 820 as filtered liquid.

To control the flow of liquids through filter assembly 810, each of the various ports 818 through 826 may include a dedicated valve therein. Although each port may be configured with a valve, different embodiments may be configured with valves for only some and even none of the ports. Multiple combinations of ports with or without valves are within the contemplation and scope of the disclosure. For purposes of illustration as well as for completeness of the disclosure, dedicated valves for selective ports of filter assembly 810 are designated as valves 822v through 826v. Valves 822v through 826v are shown schematically in FIG. 22, and may be any suitable type of valve known in the art.

In the embodiment shown in FIG. 22, during normal filtering and recovery operations, filter assembly 810 is operated in the same manner as disclosed for filter assemblies 210 through 710. The positions of the valves present on filter assembly 810 (open, closed, partially open) during normal filtering and recovery operations are identical to the corresponding valve positions of the corresponding valves of filter assembly 210 during normal filtering and recovery operations, e.g., upstream vent port valve 824v, and upstream drain port valve 826v (corresponding to upstream vent port valve 224v and upstream drain port valve 226v) are commonly closed during the primary filtration function. As such, the disclosure regarding the operation of filter assembly 210 for normal (primary) filtering and recovery operations is incorporated here by reference.

The configuration of filter assembly 810 may also perform the intended liquid filter and recovery functions when the liquid flow is reversed through the assembly. It should be understood that to operate filter assembly 810 in the reverse flow direction, the filter assembly may have to be spatially reoriented gravitationally to have reassigned ports positioned in locations to optimize performance with respect to their reassigned functions. For example, a port reassigned as an outlet port should be oriented gravitationally in a low or down position relative to the body of the filter assembly. This requirement may be eliminated in some embodiments if a dip tube (disclosed hereinbelow) is used.

In one possible reverse functional configuration, the assembly is reoriented such that outlet port 820, reassigned as an inlet port, is located at the gravitational top or high position. Upstream drain port 826 (and if present, optional drain port valve 826v) is reassigned as a downstream recovery port (and optional downstream recovery port valve) and will incorporate an inline recovery filter similar to, or the same as, recovery filter 823. Recovery port 822 (and if present, optional recovery port valve 826v) is reassigned as an upstream drain port (and optional reassigned upstream drain port valve) and often maintained in a closed condition during the main filtering operation.

The use of a recovery filter 823 on port 822 is optional in this functional configuration and may need to be removed in certain cases, as disclosed above. When used in this manner, liquid introduced into port 820 (with valve 820v open, if present), flows into core 832 (or the lumen of the filter element if constructed from, for example, hollow fiber or tubular material), and radially outwardly through filter element 830 into internal volume 834 (now a downstream volume) and out of the filter assembly through port 818 as processed liquid. In this functional configuration, the remaining port(s) (port 824 in the embodiment shown in FIG. 22) is/are maintained in a closed condition (by, for example, closing valve 824v in the embodiment shown in FIG. 22), or could be eliminated from the embodiment, as use of these ports risk contamination of the downstream filtered liquid when not coupled with a recovery filter.

The procedure to remove the resident unfiltered and filtered liquid within assembly 810 when operated in the reverse direction is the same as that disclosed for filter assembly 210 when operated in the reverse direction. Accordingly, the procedure disclosed for removing filtered and unfiltered liquid from filter assembly 210 when operated in a reverse direction is incorporated here by reference with respect to filter assembly 810.

Figure 14:
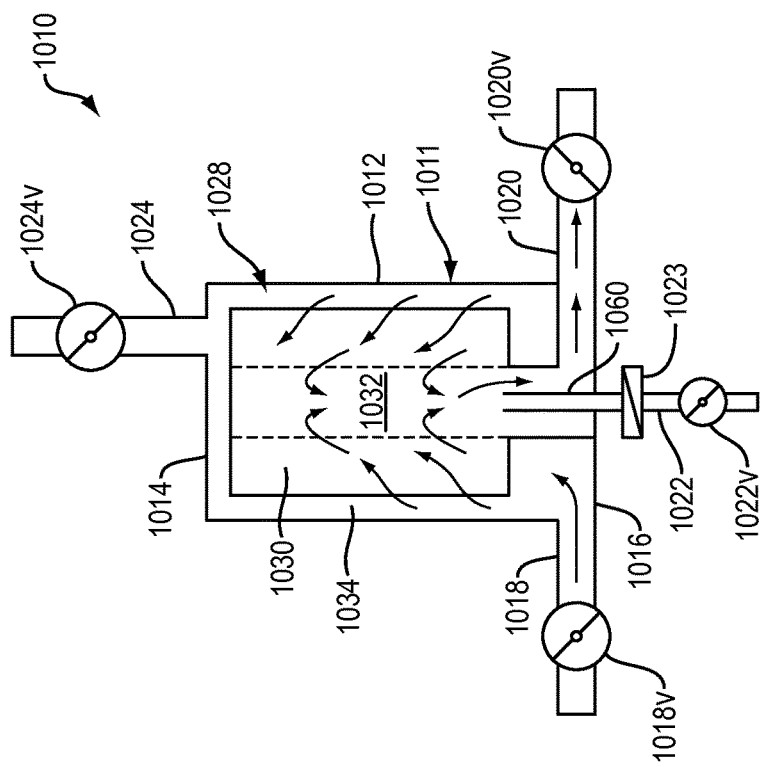
FIG. 14 is a sectional view in elevation of a single-round liquid recovery filter assembly with an aspiration tube according to another aspect of the disclosure.

Referring now to FIG. 14, in another aspect of the disclosure, a liquid recovery filter is shown designated generally as filter assembly 1010. This embodiment differs from the previously disclosed embodiments in that it incorporates an aspiration tube 1060 in place of a recovery port or passage. The filter assembly shown in FIG. 14 has a filter element secured in a capsule or housing. It should be understood that an aspiration tube can be used in place of a downstream recovery port with a filter configuration incorporating a filter cartridge, such as those shown in FIGS. 21 and 22. Filter assembly 1010 is configured as a single round housing that encloses a single filter element 1030. It should be understood further that the length and width of the filter assembly embodiment shown in FIG. 14 is by way of illustration and not limitation, and will depend upon the configuration of the filter element installed therein according to the intended use and operating environment.

Filter assembly 1010 includes a housing or shell 1011 having a shell wall 1012 with an upper end 1014 and an opposite lower end 1016. It should be understood that either end can be integral to shell wall 1012, or modular in construction as end caps, particularly if a replaceable filter cartridge is secured in the housing or shell wall to permit extraction and replacement of the enclosed filter cartridge. It should also be understood that upper end 1014 is referenced as upper and lower end 1016 is referenced as lower as much function is gained from using this embodiment in this orientation for liquid recovery; however during normal filtration and other times during use it may be possible and even advantageous for end 1016 to be oriented gravitationally above end 1014. The means and/or methods used to secure such end caps is the same as disclosed for the end caps described for filter assemblies 210 through 810.

An inlet port 1018 extends laterally from shell wall 1012 or from lower end 1016. It should be understood that the orientation of inlet port 1018 relative to the longitudinal axis of the enclosed filter may be altered (angled away from its orthogonal orientation), to accommodate particular spatial needs. Inlet port 1018 is in liquid communication with an internal upstream volume 1034 defined by the combination of shell 1011 and an upstream designated surface of filter element 1030.

An outlet port 1020 also extends laterally from shell wall 1012 or from lower end 1016 and is in liquid communication with a filter core 1032, or downstream side of the enclosed filter element. As shown in FIG. 14, outlet port 1020 has a longitudinal axis orthogonal to the longitudinal axis of the enclosed filter element. It should be understood this orientation can be altered (offset), in similar fashion to inlet port 1018 to accommodate specific spatial needs. Furthermore and alternatively, the orientation of inlet port 1018 and outlet port 1020 may be configured to the orientations disclosed in embodiments 210 through 610 or to any orientation known in the art for the arrangement of inlet and outlet ports for filter assemblies.

Outlet aspiration tube 1060 extends into a lower end of core 1032 from lower end 1016 and is in fluid communication with downstream recovery port 1022, core 1032, and the exterior of filter assembly 1010 through recovery port 1022. It should be understood that aspiration tube 1060 can extend any distance into core 1032 including the distance shown in FIG. 14 and have openings formed anywhere along its length to direct air or gas into the downstream side of element 1030 so as to facilitate and allow downstream liquids to be recovered. Recovery port 1022 extends outwardly from end 1016 and is in fluid communication with the outlet portion or core 1032 of the filter element via tube 1060, as described in more detail below. Recovery port 1022 is shown as being oriented coaxially with the enclosed filter element. It should be understood that although recovery port 1022 must be in fluid communication with the core of the enclosed filter element, the coaxial orientation can be altered to accommodate spatial needs.

A recovery filter 1023 is secured to recovery port 1022 between the two ends of the port and is in fluid communication with a lumen formed by the port. Recovery filter 1023 should be selected from among the same construction material options and the same property/characteristic options disclosed for recovery filter 223. A recovery port valve 1022v is secured to port 1022 on a side of recovery filter 1023 distal from lower end 1016. Valve 1022v is maintained in a closed position during normal filtering operations and is opened to permit the introduction of pressurized gas to recover filtered liquids resident in the filter core (or to function as a vent).

An upstream vent port 1024 extends from upper end 1014 to vent upstream internal volume 1034 and can be also used to perform other functions including, but not limited to integrity testing and pressurization during liquid recovery. Lastly, an optional upstream drain port (not shown) may be included and extend from lower end 1016 for draining liquids from upstream internal volume 1034. This general external configuration of filter assembly 1010 is similar to filter assembly 510 of FIG. 5, with the exception of the absence of an upstream drain port and the location of port 1022 compared with the location port 522, which is reoriented to lower end 1016 due to the use of tube 1060.

As previously disclosed, filter shell 1011 defines internal volume 1028 having a filter element 1030 disposed therein. The filter element may have a generally toroidal configuration (such as the pleated filter shown in cross-section) and a hollow outlet core 1032. It should be understood that filter element 1030 may conform to any of the embodiments disclosed herein and be made from any of the materials disclosed herein, or any materials known in the art for filter elements. Filter element 1030 may be secured in any of the disclosed filter housings via thermal or sonic bonding, adhesive, O-ring seals and any combination of these methods as well as any another other method used to secure filters in housings or capsules as disclosed herein and/or as well known in the art. For filter elements in the form of filter cartridges, the cartridges may be secured in the housing in the same manner and with the same features as disclosed and shown in FIGS. 21 and 22.

As previously disclosed, the combination of shell 1011 and a designated upstream surface of filter element 1030 define an upstream volume 1034. Unfiltered liquid enters upstream volume 1034 of filter assembly 1010 via inlet port 1018 and passes through filter element 1030 to hollow outlet core 1032, and then exits filter assembly 1010 through outlet port 1020 as filtered liquid.

To control the flow of liquids through filter assembly 1010, each of the various ports or tubes 1018 through 1024 (and upstream drain ports in some embodiments) may include a dedicated valve therein. Although each tube or port may be configured with a valve, different embodiments may be configured with valves for only some and even none of the tubes and/or ports. Multiple combinations of tubes and ports with or without valves are within the contemplation and scope of the disclosure. For purposes of illustration as well as for completeness of the disclosure, dedicated valves for selective ports of filter assembly 1010 are designated as valves 1022v through 1024v. Valves 1022v through 1024v are shown schematically in FIG. 14, and may be any suitable type of valve known in the art.

Tube 1060 and downstream recovery port 1022 may be made from aluminum, stainless steel, metallic alloys, or other metal-based materials. Other suitable materials include polymeric materials including, but not limited to, polypropylene, nylon, polyester, polyethylene. PSA and combinations thereof that are generally compatible with the fluids and/or gasses intended to be introduced into the filter assembly as is known in the art.

In the embodiment shown in FIG. 14, during normal filtering and recovery operations, filter assembly 1010 is operated in the same manner as disclosed for filter assemblies 210 through 810. The positions of the valves present on filter assembly 1010 (open, closed, partially open) during normal filtering and recovery operations are identical to the corresponding valve positions of the corresponding valves of filter assembly 210 during normal filtering and recovery operations, e.g., upstream vent port valve 1024v, and upstream drain port valve 1026v, if present, (corresponding to upstream vent port valve 224v and upstream drain port valve 226v) are commonly closed during the primary filtration function. As such, the disclosure regarding the operation of filter assembly 210 for normal (primary) filtering and recovery operations is incorporated here by reference.

The configuration of filter assembly 1010 may also perform the intended liquid filter and recovery functions when the liquid flow is reversed through the assembly. It should be understood that to operate filter assembly 1010 in the reverse flow direction, the filter assembly may have to be spatially reoriented gravitationally to have reassigned ports positioned in locations to optimize performance with respect to their reassigned functions. For example, a port reassigned as an outlet port should be oriented gravitationally in a low or down position relative to the body of the filter assembly.

This requirement may be eliminated in some embodiments if a dip tube (disclosed hereinbelow) is used.

In one possible reverse functional configuration, similar to the reverse functional configuration disclosed for embodiment 510, the assembly may be maintained in the orientation shown schematically in FIG. 14, such that outlet port 1020, reassigned as an inlet port, remains located at the gravitational bottom or low position. It should be noted that reorientation is not necessary for this functional configuration compared to the orientation shown as the reassigned outlet port is located at the gravitational bottom or low position in the orientation shown schematically in FIG. 14. Upstream vent port 1024 is reassigned as a downstream recovery port and will incorporate an inline recovery filter similar to, or the same as, recovery filter 1023. Recovery port 1022 is reassigned as an upstream vent port and often maintained in a closed condition during the main filtering operation. It should be understood, that outlet aspiration tube 1060, as shown in FIG. 14 and described as extending into a lower end of core 1032, would provide improved venting efficiency if it were to extend upwardly toward, and in close proximity to, a top end of core 1032, similar to aspiration tube 1260 shown in FIG. 17 and disclosed in further detail below.

The use of a recovery filter 1023 on port 1022 is optional in this functional configuration. When used in this manner, liquid introduced into port 1020 (with valve 1020v open, if present), flows into core 1032 (or the lumen of the filter element if constructed from, for example, hollow fiber or tubular material), and radially outwardly through filter element 1030 into internal volume 1034 (now a downstream volume) and out of the filter assembly through port 1018 as processed liquid. In this functional configuration, any the remaining port(s), if present, is/are maintained in a closed condition (by, for example, closing their associated valve) or could be eliminated from the embodiment, as shown in FIG. 14, as use of additional downstream ports risk contamination of the downstream filtered liquid when not coupled with a recovery filter. Once the intended volume of liquid is filtered through assembly 1010, valve 1020v may be closed to cease flow.

The procedure to remove the resident unfiltered and filtered liquid within assembly 1010 when operated in the reverse direction is the same as that disclosed for filter assembly 210 when operated in the reverse direction, with the noted exception that in filter assembly 1010, port 1024 is reassigned as a downstream recovery port (providing comparable functionality to port 226 reassigned as a downstream recovery port in filter assembly 210) and port 1026 is not depicted. Accordingly, the procedure disclosed for removing filtered and unfiltered liquid from filter assembly 210 when operated in a reverse direction is incorporated here by reference with respect to filter assembly 1010.

Referring now to FIG. 17, in an embodiment substantially similar to the one shown in FIG. 14, a filter assembly designated generally as 1210 incorporates the same features as filter assembly 1010 except the aspiration tube designated 1260 in filter assembly 1210 extends from its point of entry at a bottom end of a filter shell wall 1212 into a filter core 1232 and extends upwardly toward, and in close proximity to, a top end of a filter element 1230. This aspiration tube places the point of gas introduction at a higher point in filter core 1232 than its counterpart, aspiration tube 1060 in filter assembly 1010. This configuration may improve the efficiency of liquid flow out of filter assembly by more advantageously introducing gas into the filter assembly at a location less likely to interfere with the flow of liquid out through core 1232 and outlet 1220.

The function and operation of filter assembly 1210 is essentially the same as described and disclosed for filter assembly 1010. The description of the construction of filter assembly 1010 also corresponds to the construction of filter assembly 1210. The disclosure of the construction, operation and function of filter assembly 1010 is thus incorporated here to describe the construction, operation and function of filter assembly 1210. It should be noted that the reference character designations for filter assembly 1010 correspond to, and may be transferred to, filter assembly 1210 by removing the second digit "0" of each reference character and replacing it with a "2".

Figure 15:
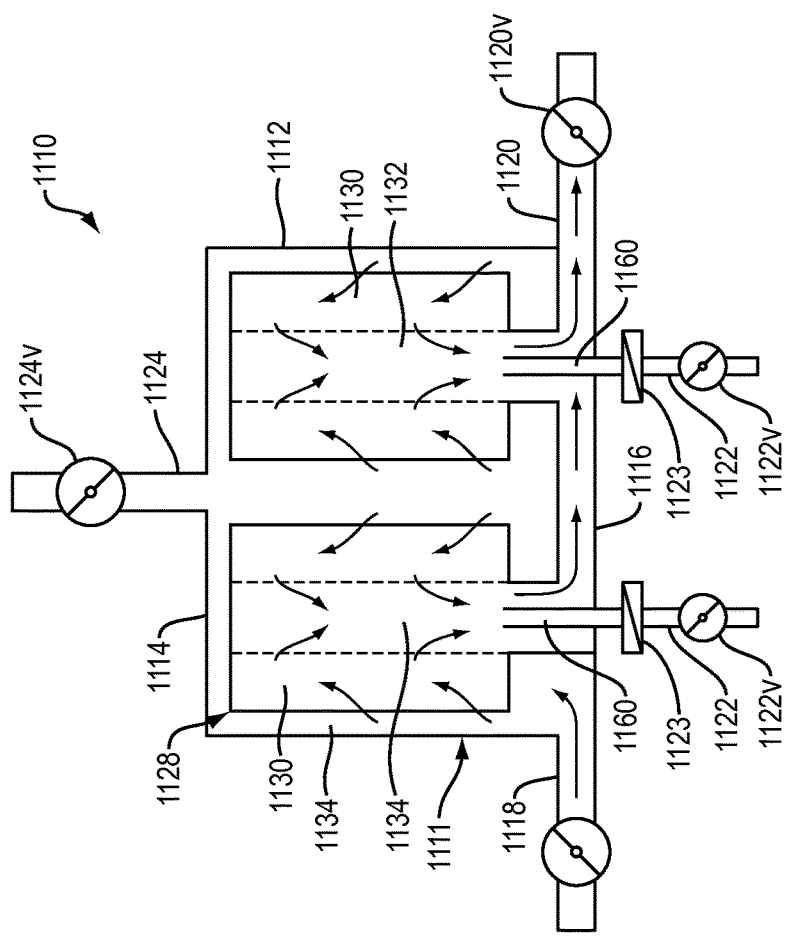
FIG. 15 is a sectional view in elevation of a multi-round liquid recovery filter assembly with aspiration tubes according to a further aspect of the disclosure.

Referring now to FIG. 15, in a yet further aspect of the disclosure, a multi-round filter assembly incorporating dedicated aspiration tubes and recovery filters for each enclosed filter element/cartridge is shown designated generally as 1110. This embodiment differs from the previously disclosed single-round filter housing embodiment shown in FIG. 14 in that it incorporates multiple filter elements/cartridges, each with dedicated aspiration tubes 1160 and recovery filters 1123. Each aspiration tube has a dedicated recovery port 1122 and an optional associated valve 1122v. The filter assembly shown in FIG. 15 has a filter element secured in a capsule or housing. It should be understood that dedicated aspiration tubes can be used in place of downstream recovery ports with a filter configuration incorporating filter cartridges, such as those shown in FIGS. 21 and 22. It should be understood further that the length and width of the filter assembly embodiment shown in FIG. 15 is by way of illustration and not limitation, and will depend upon the configuration of the filter element installed therein according to the intended use and operating environment.

Filter assembly 1110 includes a housing or shell 1111 having a shell wall 1112 having an upper end 1114 and an opposite lower end 1116. It should be understood that either end can be integral to shell wall 1112, or modular in construction as end caps, particularly if a replaceable filter cartridge is secured in the housing or shell wall to permit extraction and replacement of the enclosed filter cartridge. The means and/or methods used to secure such end caps are the same as those disclosed for the end caps described for filter assemblies 710 and 810.

An inlet port 1118 extends laterally or radially from shell wall 1112. It should be understood that the orientation of inlet port 1118 relative to the longitudinal axis of the enclosed filter may be altered (angled away from its orthogonal orientation), to accommodate particular spatial needs. Inlet port 1118 is in liquid communication with an internal upstream volume 1134 defined by the combination of shell 1111 and an upstream designated surface of filter element 1030.

An outlet port 1120 also extends laterally from shell wall 1112 or from lower end 1116 and is in liquid communication with filter core 1132, or the downstream side of the enclosed filter elements. As shown in FIG. 15, outlet port 1120 has a longitudinal axis orthogonal to the longitudinal axis of the enclosed filter element. It should be understood that this orientation can be altered (offset), in similar fashion to inlet port 1118 to accommodate specific spatial needs.

Outlet aspiration tubes 1160 each extend into a lower end of one filter core 1132 from lower end 1116 and are in fluid communication with downstream recovery ports 1122, cores 1132, and the exterior of filter assembly 1110 through recovery ports 1122. It should be understood, that aspiration tube 1160 can extend any distance into core 1132 including the distance shown in FIG. 15 and have openings formed anywhere along its length to direct air or gas into the downstream side of element 1130 so as to facilitate and allow downstream liquids to be recovered. Recovery ports 1122 extend outwardly from end 1116. Each downstream recovery port 1122, communicates with the outlet portion or core 1132 of one filter element 1130 via tube 1160, as described in more detail below. Each recovery port 1122 is shown as being oriented coaxially with its corresponding enclosed filter element/cartridge 1130. It should be understood that although recovery port 1122 must be in fluid communication with the core of the enclosed filter element, the coaxial orientation can be altered to accommodate spatial needs.

A recovery filter 1123 is secured to recovery port 1122 between the two ends of the port and is in fluid communication with a lumen formed by the port. Recovery filter 1123 should be selected from among the same construction material options and the same property/characteristic options disclosed for recovery filter 223. A recovery port valve 1122v is secured to port 1122 on a side of recovery filter 1123 distal from lower end 1116. Valve 1122v is maintained in a closed position during normal filtering operations and is opened to permit the introduction of pressurized gas to recover filtered liquids resident in the filter core (or to function as a vent).

An upstream vent port 1124 also extends from upper end 1114 to vent an upstream internal volume 1134 described in more detail below. Lastly, an optional upstream drain port (not shown) may be included and extend from lower end 1116 to drain liquids from upstream internal volume 1134. This general external configuration of filter assembly 1110 is similar to filter assembly 510 of FIG. 5, with the exception of the absence of an upstream drain port and the location of ports 1122 compared with the location of port 522, which is reoriented to lower end 1116 due to the use of tube 1160.

As previously disclosed, filter shell wall 1112 defines internal volume 1128 having a plurality of filter elements/cartridges 1130 disposed therein. The filter elements may have a generally toroidal configuration (such as the pleated filter shown in cross-section) and a hollow core 1132. It should be understood that filter elements 1130 may conform to any of the embodiments disclosed herein and be made from any of the materials disclosed herein for filter elements. Filter elements 1130 may be secured in any of the disclosed filter housings via thermal or sonic bonding, adhesive, O-ring seals and any combination of these methods as well as any another other method used to secure filters in housings as are well known in the art. For filter elements in the form of filter cartridges, the cartridges may be secured in the housing in the same manner and with the same features as disclosed and shown in FIGS. 21 and 22.

As previously disclosed, the combination of shell 1111 and a designated upstream surface of filter elements 1130 define an upstream volume. Unfiltered liquid enters upstream volume 1134 via inlet port 1118 and passes through liquid permeable filter elements 1130 to hollow cores 1132, and then exits filter assembly 1110 through outlet port 1120 as filtered liquid.

To control the flow of liquids through filter assembly 1110, each of the various ports or tubes 1118 through 1124 (and upstream drain ports in some embodiments) may include a dedicated valve therein. Although each port may be configured with a valve, different embodiments may be configured with valves for only some and even none of the ports. Multiple combinations of ports with or without valves are within the contemplation and scope of the disclosure with respect to this filter assembly embodiment. For purposes of illustration as well as for completeness of the disclosure, dedicated valves for selective ports of filter assembly 1110 are designated as valves 1122v through 1124v. Valves 1122v through 1124v are shown schematically in FIG. 15, and may be any suitable type of valve known and used in the art.

Tubes 1160 and downstream recovery ports 1122 may be made from the same materials described and disclosed for tube 1060 and recovery ports 1022. It should be understood that the list of potential materials described herein are not exhaustive and include those materials commonly used in the art to construct such features in filter housings and assemblies.

In the embodiment shown in FIG. 15, during normal filtering and recovery operations, filter assembly 1110 is operated in the same manner as disclosed for filter assemblies 210 through 1010. The positions of the valves present on filter assembly 1110 (open, closed, partially open) during normal filtering and recovery operations are identical to the corresponding valve positions of the corresponding valves of filter assembly 210 during normal filtering and recovery operations, e.g., upstream vent port valve 1124v, and upstream drain port valve 1126v, if present, (corresponding to upstream vent port valve 224v and upstream drain port valve 226v) are commonly closed during the primary filtration function. As such, the disclosure regarding the operation of filter assembly 210 for normal (primary) filtering and recovery operations is incorporated here by reference.

The configuration of filter assembly 1110 may also perform the intended liquid filter and recovery functions when the liquid flow is reversed through the assembly. It should be understood that to operate filter assembly 1110 in the reverse flow direction, the filter assembly may have to be spatially reoriented gravitationally to have reassigned ports positioned in locations to optimize performance with respect to their reassigned functions. For example, a port reassigned as an outlet port should be oriented gravitationally in a low or down position relative to the body of the filter assembly. This requirement may be eliminated in some embodiments if a dip tube (disclosed hereinbelow) is used.

In one possible reverse functional configuration, similar to the reverse functional configuration disclosed for embodiment 510, the assembly may be maintained in the orientation shown schematically in FIG. 15, such that outlet port 1120, reassigned as an inlet port, remains located at the gravitational bottom or low position. It should be noted that reorientation is not necessary for this functional configuration compared to the orientation shown as the reassigned outlet port is located at the gravitational bottom or low position in the orientation shown schematically in FIG. 15. Upstream vent port 1124 is reassigned as a downstream recovery port and will incorporate an inline recovery filter similar to, or the same as, recovery filter 1123. Recovery port 1122 is reassigned as an upstream vent port and often maintained in a closed condition during the main filtering operation. It should be understood, that outlet aspiration tubes 1060, as shown in FIG. 15 and described as extending into a lower end of cores 1132, would provide improved venting efficiency if they were to extend upwardly toward, and in close proximity to, a top end of cores 1132, similar to aspiration tubes 1360 shown in FIG. 18 and disclosed in further detail below.

The use of recovery filters 1123 on ports 1122 are optional in this functional configuration. When used in this manner, liquid introduced into port 1120 (with valve 1120v open, if present), flows into cores 1132 (or the lumen of the filter elements if constructed from, for example, hollow fiber or tubular material), and radially outwardly through filter elements 1130 into internal volume 1134 (now a downstream volume) and out of the filter assembly through port 1118 as processed liquid. In this functional configuration, any the remaining port(s), if present, is/are maintained in a closed condition (by, for example, closing their associated valve) or could be eliminated from the embodiment, as shown in FIG. 15, as use of additional downstream ports risk contamination of the downstream filtered liquid when not coupled with a recovery filter. Once the intended volume of liquid is filtered through assembly 1010, valve 1020*v* may be closed to cease flow.

The procedure to remove the resident unfiltered and filtered liquid within assembly 1110 when operated in the reverse direction is the same as that disclosed for filter assembly 210 when operated in the reverse direction, with the noted exception that in filter assembly 1110, port 1124 is reassigned as a downstream recovery port (providing comparable functionality to port 226 reassigned as a downstream recovery port in filter assembly 210) and port 1126 is not depicted. Accordingly, the procedure disclosed for removing filtered and unfiltered liquid from filter assembly 210 when operated in a reverse direction is incorporated here by reference with respect to filter assembly 1110.

Referring now to FIG. 18, another multi-round filter assembly is shown with identical features to the embodiment shown in FIG. 15 except the aspiration tubes designated 1360 in filter assembly 1310 extend from their point of entry at a bottom end of a filter shell wall 1312 into filter cores 1332 and extend upwardly toward, and in close proximity to, a top end of filter elements 1330. These aspiration tubes place the point of gas introduction at a higher point in filter cores 1332 than their counterpart, relatively short aspiration tubes 1160 in filter assembly 1110. This configuration may improve the efficiency of liquid flow out of filter assembly 1310 by more advantageously introducing gas into the filter assembly at a location less likely to interfere with the flow of liquid out through core 1332 and outlet 1320.

The function and operation of filter assembly 1310 is essentially the same as described and disclosed for filter assembly 1110. The description of the construction of filter assembly 1110 also corresponds to the construction of filter assembly 1310. The disclosure of the construction, operation and function of filter assembly 1110 is thus incorporated here to describe the construction, operation and function of filter assembly 1310. It should be noted that the reference character designations for components of filter assembly 1110 correspond to, and may be transferred to, character designations for components of filter assembly 1310 by removing the second digit "1" of each reference character and replacing it with a "3".

Referring now to FIG. 19, in another aspect of the disclosure, a multi-round filter assembly shown designated generally as 1410 includes aspiration tubes 1460 that share a common aspiration tube manifold 1462 and a single recovery filter 1423 secured to a manifold extension tube 1464 with an optional manifold extension tube valve 1464*v* also secured to extension tube 1464. The aspiration tubes 1160, tube manifold 1462, extension tube 1464, recovery filter 1423 and optional tube valve 1464*v* are all in fluid communication with cores 1432. The remaining features of filter assembly 1410 are identical to the features shown in FIG. 18 for filter assembly 1310 and could alternatively be constructed with shorter aspiration tubes, similar to assembly 1110 as shown in FIG. 15. More particularly, a housing or shell designated generally as 1211 includes a shell wall 1412, and upper end 1414 and a lower end 1416, the combination of which define an internal chamber in which one or more filter elements 1430 are secured. Each enclosed filter element defines a downstream designated core 1432 in fluid communication with aspiration tubes 1160 and all the tubes connected to tubes 1160. The function, operation and performance of filter assembly 1410 are the same as for filter assembly 1310. The description of the function, operation and performance of filter assembly 1310 is thus incorporated here with respect to filter assembly 1410.

Referring now to FIG. 20, in a still further aspect of the disclosure, a multi-round filter assembly shown designated generally as 1510 includes dedicated aspirating tubes 1560 and dedicated recovery filters 1523 secured to, and in fluid communication with, tubes 1560 that share a common recovery tube 1564 and optional recovery tube valve 1564*v* secured to recovery tube 1564. The remaining features of filter assembly 1510 are identical to the features shown in FIG. 18 for filter assembly 1310 and could alternatively be constructed with shorter aspiration tubes, similar to assembly 1110 as shown in FIG. 15. The function, operation and performance of filter assembly 1510 are the same as for filter assembly 1310. The description of the function, operation and performance of filter assembly 1310 is thus incorporated here with respect to filter assembly 1510.

Figure 23:
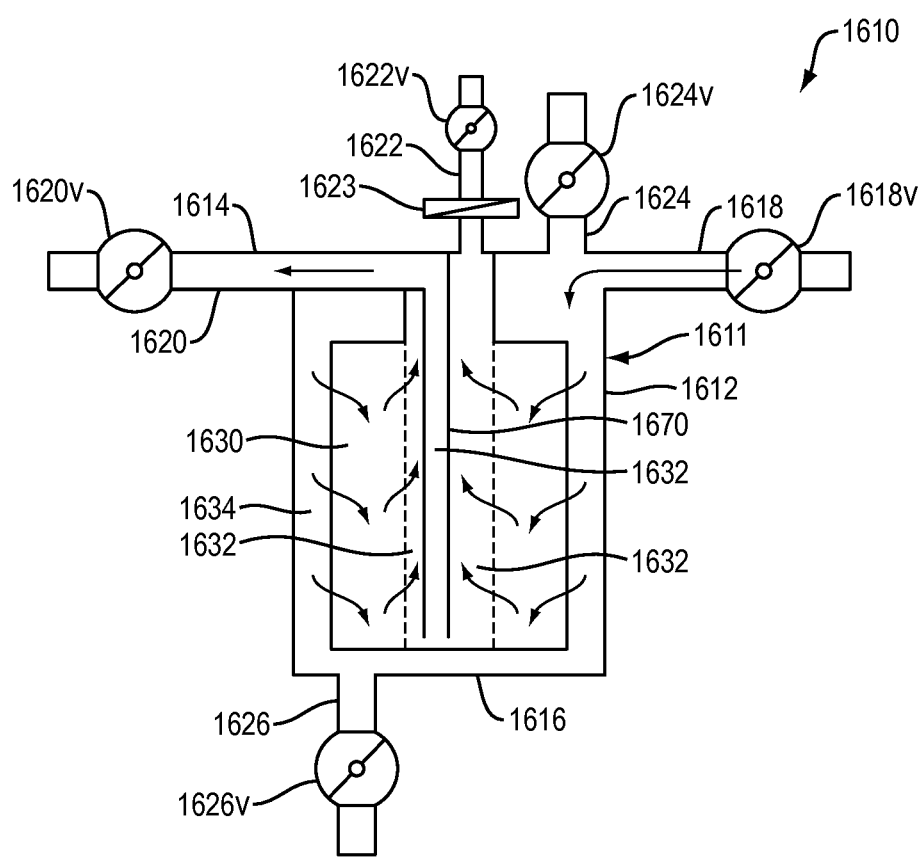
FIG. 23 is a sectional view in elevation of a liquid recovery assembly with a dip tube according to a still further embodiment of the disclosure.

Referring now to FIG. 23, in a yet further aspect of the disclosure, a filter assembly shown designated generally as 1610 incorporates the same features as filter assembly 510 shown in FIG. 5 in a gravitationally opposite orientation and with the addition of an outlet dip tube 1668. Outlet dip tube 1668 creates a partition within the downstream side of element 1630 and is in liquid communication with outlet port 1620 and core 1632. The partition formed by outlet dip tube 1668 directs fluid introduced through recovery port 1622 down to the bottom of core 1632 before flowing out through dip tube 1668 and through outlet port 1620. This flow path assures that air or gas introduced into recovery port 1622 clears all or substantially all liquid from the downstream core 1632 as opposed to taking the path of least resistance and flowing directly to outlet port 1620 as would be the case if embodiment 510 were to be used in its opposite gravitational orientation without the addition of a dip tube 568. The forward function, operation and performance of filter assembly 1610 are the same as for filter assembly 510, where each is operated in the gravitational orientation depicted in their respective FIGS. 5 and 23. The description of the forward function, operation and performance of filter assembly 510 is thus incorporated here with respect to filter assembly 1610.

To function in the gravitational orientation illustrated in FIG. 23 when the flow is reversed through the assembly, a dip tube is connected to inlet port 1618 (reassigned as an outlet port) to assure that air or gas introduced through upstream vent port 1624 (reassigned as a recovery port and configured with a recovery filter similar to, or the same as, recovery filter 1623) is forced to the bottom of volume 1634 (now a downstream volume) to allow for the recovery of filtered liquids. The use of the dip tube prevents the air or gas from exiting through reassigned outlet port 1618 without driving filtered liquids out of the downstream volume 1634. The reverse function, operation and performance of filter assembly 1610 are the same as those for filter assembly 510, where each is operated in the gravitational orientation depicted in FIGS. 5 and 23, respectively. The description of the reverse function, operation and performance of filter assembly 510 is thus incorporated here with respect to filter assembly 1610.

Figure 16:
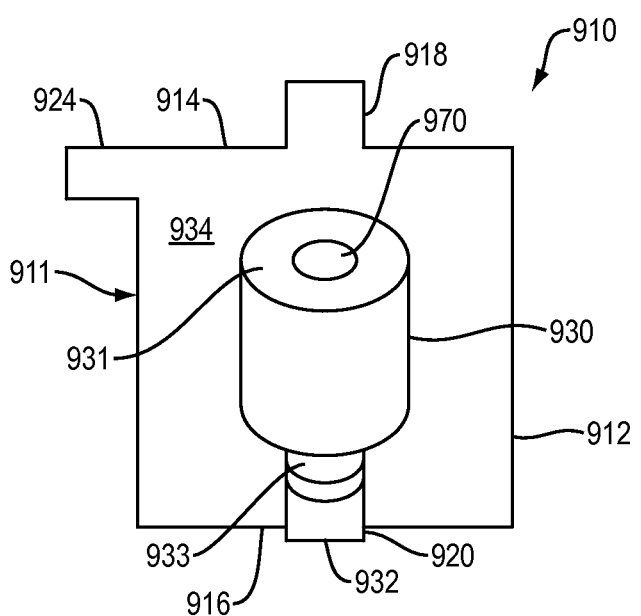
FIG. 16 is a sectional view of a liquid recovery filter assembly with a filter cartridge shown in perspective with a hydrophobic/hydrophilic filter insert according to a still further aspect of the disclosure.

Referring now to FIG. 16, in another aspect of the disclosure, a single hybrid hydrophilic/hydrophobic filter material, or a dual layer filter material with one layer having hydrophobic characteristics and the other layer having hydrophilic characteristics is positioned in an upper end cap of a filter cartridge to provide a functional valve to permit the processing of liquids through a process filter and maintain a pressure gradient from an upstream side of a processing filter to a downstream side of the processing filter when a recovery function is performed after the main liquid processing function. Use of this "valve" eliminates the need for a recovery port, or similar feature. This filter may also be used as the recovery filter in the other embodiments disclosed herein, which in some applications may eliminate the need for a valve in the other embodiments.

For purposes of clarity and illustration, but not limitation, as used in the description of embodiments incorporating a hydrophilic/hydrophobic valve, the terms hydrophilic, hydrophobic, and liquid are used to describe the function and design of a filter assembly apparatus and method for liquid recovery. A liquid or process liquid is defined to be a process liquid that will spontaneously wet-out one type of filter material and not another. A hydrophilic filter material is defined as a filter material that will spontaneously wet-out in the process liquid. A hydrophobic filter material is defined as a filter material that will not spontaneously wet-out in the process liquid.

In certain applications, such as the filtration of alcohols or low-polarity liquids, a filter material with hydrophobic properties could be used in place of the hydrophilic filter material, since many of these liquids will spontaneously wet-out a hydrophobic filter material as is well known in the art. In such a case, use of a filter material with oleophobic, superhydrophobic, or other surface properties may be required to be used in place of the hydrophobic filter material in order to prevent wetting of the filter material in this position by the process liquid. Accordingly, though hydrophilic and hydrophobic filtration materials and layers are described throughout the disclosure, the use of filter materials and layers with other surface properties (such as oleophobicity and superhydrophobicity as disclosed above) to provide the desired selectivity whereas one filtration material spontaneously wets out in a liquid and one filtration material does not is within the contemplation and scope of the disclosure.

As shown in FIG. 16, a filter assembly shown designated generally as 910, includes a housing or shell 911 dimensioned to enclose a filter cartridge 930. An inlet 918, outlet 920 and an upstream vent 924 extend from housing 911. Inlet 918 extends from an upper inlet end 914 and may be aligned with the longitudinal axis of the enclosed filter cartridge 930 or may be oriented away from the longitudinal axis to accommodate any spatial requirements. Inlet 918 is in liquid communication with an upstream internal volume 934 of filter assembly 910, as defined by shell 911 and an upstream designated surface of filter element 930. Outlet 920 extends from a lower outlet end 916 of the filter assembly 910 and is in liquid communication with a core 932 of filter cartridge 930. Upstream vent 924 extends laterally or radially from an upper end of filter housing 911 and may be oriented at different angles to accommodate spatial needs.

Each port may have an optional dedicated valve to open and close the ports. If present, valve 918v is attached to inlet 918, valve 920v is attached to outlet 920 and valve 924v is attached to upstream vent port 924. Multiple combinations of passages and ports with or without valves are within the contemplation and scope of the disclosure. It should be understood that in assembly 910, ends 914 and 916 can be integral to shell wall 912 or can be removable to permit extraction and replacement of the enclosed filter cartridge 930. In the configuration shown, the two ends 914 and 916 are shown integral to shell wall 910 by way of illustration and not limitation, and the integral versus removable nature of ends 914 and 916 and filter cartridge 930 as well as the methods used to seal the assembly (including the seal of cartridge filter 930) will depend upon the intended use and operating environment as well as the configuration of the filter element installed therein. Methods used to seal the assemblies of other embodiments disclosed herein may be used also to seal the components of filter assembly 910.

To permit the recovery of liquid held up within filter assembly 910 without a dedicated recovery port, a valve filter 970 is used to perform a dual filter and valve function. Valve filter 970 may be a combination hydrophobic/hydrophilic filter material (including a filter material having either a sole hydrophilic or a sole hydrophobic property with a surface modified to have the opposite property), a hydrophobic/hydrophilic dual layer filter material and any combinations thereof. Valve filter 970 is secured in an upper end cap 931 of filter cartridge 930 and represents one way to eliminate the need for a recovery port such as those disclosed herein. A filtration material with only hydrophobic functionality may be used in the locations disclosed for valve filter 970 to permit contaminant-free recovery of liquid within the downstream portions of a filter assembly as well as downstream lines, etc. However, for embodiments that have the valve function disclosed in detail below that permits the additional recovery of upstream unfiltered fluid, use of filtration material with only hydrophobic functionality cannot be used as explained and disclosed in more detail below.

With respect to the use of a filter material at location 970 that has only a hydrophobic functionality, it should be understood that although such a filter material is suitable to perform the downstream recovery process, as disclosed in detail herein, for many of the aspects and embodiments of the liquid recovery assemblies, it will not function as a valve to maintain a pressure gradient from an upstream side 934 of processing filter 930 to a downstream side of the processing filter 930 when a recovery function is performed after the main liquid processing function. This gradient is required in order to force unfiltered liquids in upstream side 934 to the downstream side prior to initiating recovery of the filtered liquids in the downstream side of the assembly.

Figure 25:
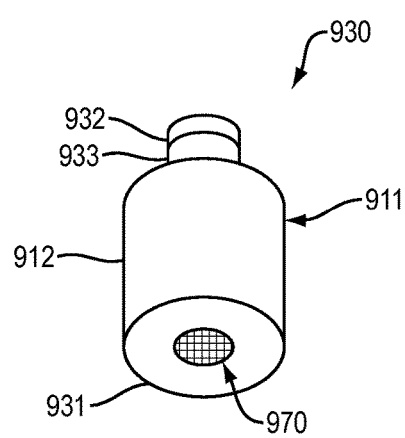
FIG. 25 is a bottom perspective view of a filter cartridge according to one embodiment of the disclosure.
Figure 26:
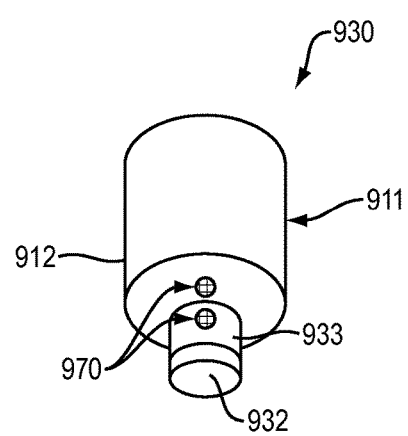
FIG. 26 is a bottom perspective view of a filter cartridge according to a further embodiment of the disclosure.

As shown in FIGS. 16, 25 and 26, filter material used at the location of valve filter 970—whether a hydrophobic filtration material or one of the dual-function filtration material embodiments—may be positioned in a variety of different locations on filter cartridge 930 including end cap 931, end cap 935 and/or an outlet port receiving segment 933 and perform the same functions described and disclosed herein with limited modification to the disclosed recovery methods. The embodiments disclosed in FIGS. 16, 25 and 26 may be used in combination with other features described within this disclosure to improve functionality and/or efficiency, e.g., dip tube 1668 shown in FIG. 23 in combination with the valve filter 970 location shown in FIG. 26). The hydrophilic layer or portion of valve filter 970 is positioned in direct contact with the downstream side of filter cartridge 930. This permits the hydrophilic component to be wetted during the main liquid processing procedure, but will not permit bulk flow through valve filter 970, as the liquid cannot pass through the hydrophobic component at pressures below the water intrusion pressure (or liquid intrusion pressure). It should be understood, that while use of the valve filter in this orientation provides advantages (such as reducing the likely hood of a liquid-lock on the hydrophobic filter material) it is possible and may even be advantageous to orient the valve filter in the reverse direction in some cases and that all orientations are within the contemplation and scope of the disclosure.

By including an appropriately selected hydrophobic filter material, layer, or surface modified hydrophobic layer, the filter material or layer prevents the bulk migration of liquids from the upstream side through filter cartridge end cap 931 and/or end cap 935 and/or an outlet port receiving segment 933 and concurrently maintains a porous and sterile (or otherwise contamination-preventing) barrier between the upstream and downstream sides of filter cartridge 930. By including an appropriately selected hydrophilic filter material or layer that becomes wetted in use, the filter material or layer prevents the bulk migration of air or gas from the upstream side of cartridge 930 through the filter cartridge end cap 931 and/or end cap 935 and/or an outlet port receiving segment 933 at pressures below the bubble point of the selected filtration material or layer. During the unfiltered liquid recovery function, this enables the filter assembly to maintain a relatively low pressure on the downstream side of processing filter cartridge 930 and a relatively higher pressure on the upstream side of cartridge 930 to drive liquids held upstream of filter cartridge 930 into the downstream portion of filter assembly 910 through the processing filter material so long as the pressure differential between the upstream and downstream sides of cartridge 930 does not exceed the bubble point of the hydrophilic filter material or layer.

During the main liquid processing function, upstream vent valve 924v is maintained in a closed position, but may be opened periodically or even continuously to evacuate gas or air from the upstream side of cartridge 930. To ensure proper functioning, the hydrophobic component of filter valve 970 is selected to have a liquid intrusion pressure that exceeds the pressure in the upstream side of filter cartridge 930 during the main liquid processing procedure, for example to accommodate processing conditions from about 1 to about 2 psi up to about 20 to about 30 psi depending on the system constraints and filtration processing conditions. Intrusion pressure is selected by adjusting the pore size and/or surface properties (such as surface energy) of the hydrophobic filter material.

Filtration materials constructed with polytetrafluoroethylene (PTFE), polyvinylidene fluoride (PVDF), and polyethylene with naturally occurring low surface energies as well as filtration materials (including those naturally or typically modified to become hydrophilic) that have been modified to achieve low surface energies are known to resist the flow of aqueous liquids (with sufficiently high surface tensions) and therefore will exhibit an intrusion pressure for such liquids. The value of the intrusion pressure is further dependent on the pore size of the filtration media. In the case of membranes constructed from PTFE, PVDF, and polyethylene, water intrusion pressures exceeding 30 psi are typical for membranes of 0.2 µm pore size ratings and below.

Once the main processing function is performed to recover the resident filtered liquids (resident in filter core 932 and other downstream locations), and unfiltered liquids in the upstream internal volume 934, pressurized gas is introduced via inlet 918, or vent 924 via a peristaltic pump, compressed gas source, or like device. It should be understood that the valve associated with the port to which the pump or compressed gas is attached will be open while the other upstream port valve(s) will be closed so as to permit the creation of a pressure gradient from the upstream side of filter cartridge 930 to the downstream side. Since the hydrophobic component of valve filter 970 will freely permit the passage of gas, it is the hydrophilic portion or layer of valve filter 970 that will prevent gas from passing from the upstream side of filter cartridge 930 to the downstream side via valve filter 970 until the bubble point of the hydrophilic component of valve filter 970 is exceeded. Thus, a pore size for the hydrophilic component can be selected to achieve the desired bubble point as is well known in the art (or cracking pressure of the valve filter).

Filtration materials constructed with hydrophilized polyethersulfone, nylon, cellulose acetate, cellulose nitrate, hydrophilized PVDF, polycarbonate, as well as others well known in the art with pore sizes greater than or equal to that of the processing filtration material pore size (dependent also on the material properties and morphology) will have bubble points in a range that lower the gas pressure required to bypass filter cartridge 930 by way of valve filter 970 in comparison to the gas pressure required to bypass the processing filtration material itself. The surface energy of the membrane is chosen such that it is spontaneously wetted by the processing liquid and will depend on the material chosen as well as the membrane manufacture or modification. Selecting a hydrophilic filtration material with the appropriate bubble point ensures a positive pressure gradient from the upstream to the downstream side to facilitate the forcing of unfiltered liquids in upstream internal volume 934 into the downstream side as filtered liquid.

To evacuate the filtered liquids remaining in core 932, the gas pressure is increased to exceed the bubble point pressure of the hydrophilic component of valve filter 970. This causes gas to flow through valve filter 970 to force filtered liquids in core 932 into outlet 920 and ultimately out of the filter assembly (clearing downstream lines, if present) with the added assistance of gravity should outlet 920 be oriented at a gravitationally lower end of the filter cartridge. It should be understood the orientation of the filter cartridge can be reversed with the inlet end positioned lower than the outlet end, or any rotation of the filter assembly between the two extreme positions to accommodate any spatial needs in assemblies to which the filter assembly is attached. In some orientations, it may be necessary or advantageous to implement additional features described within this disclosure to improve functionality and/or efficiency (e.g. the dip tube 1668 feature shown in FIG. 23 in combination with the valve filter 970 location shown in FIG. 26).

It should be further understood that the functions of the various ports can be reversed wherein outlet 920 is reassigned as an inlet port, inlet port 918 is reassigned as an outlet port, core 932 is reassigned as an upstream internal volume and upstream internal volume 934 is reassigned as the downstream side. The orientation of valve filter 970 must be reversed such that the hydrophilic filter material layer or side of valve filter 970 is positioned in direct contact with the downstream side of filter cartridge 930, now volume 934. This will permit the hydrophilic component to be wetted during the main liquid processing procedure, but will not permit bulk flow through valve filter 970 as the liquids cannot pass through the hydrophobic component. With this orientation, the valve filter 970 will still perform the intended function.

Figure 24:
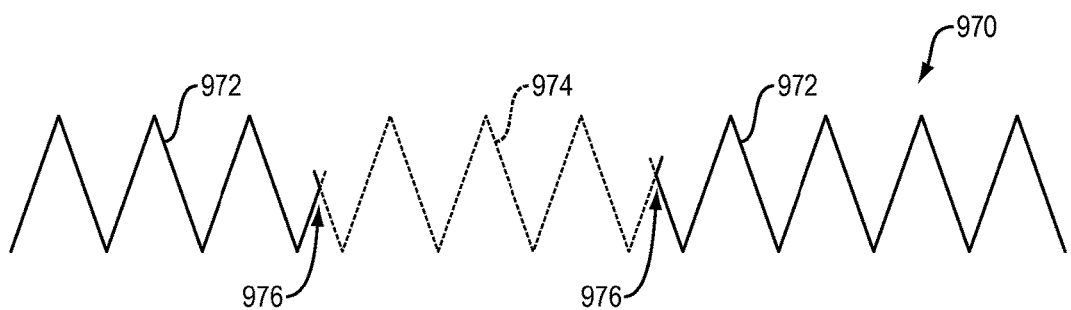
FIG. 24 is a sectional view of a combination hydrophobic/hydrophilic pleated membrane according to another embodiment of the disclosure.

As previously stated, valve filter 970 may be constructed in a variety of configurations including a hydrophobic material with one side or layer modified to be hydrophilic, a hydrophilic material with one side or layer modified to be hydrophobic, or dual or multi-layer filter materials or filter materials with layers dedicated hydrophobic or hydrophilic. The configurations may also take on various alternatives such as a pleated configuration shown in FIG. 24, with a pleated hydrophobic or combination hydrophobic/hydrophilic filter material, hydrophobic/hydrophilic dual layer filter material, or hydrophobic/hydrophilic filter material portion 974 sandwiched between two hydrophilic portions 972 joined as seams 976. Section 972 and 974 can be sealed by many methods well known in the art, including thermal sealing, ultrasonic thermal sealing, adhesive bonding, thermal melt sealing, solvent bonding and combinations thereof.

Figure 27:
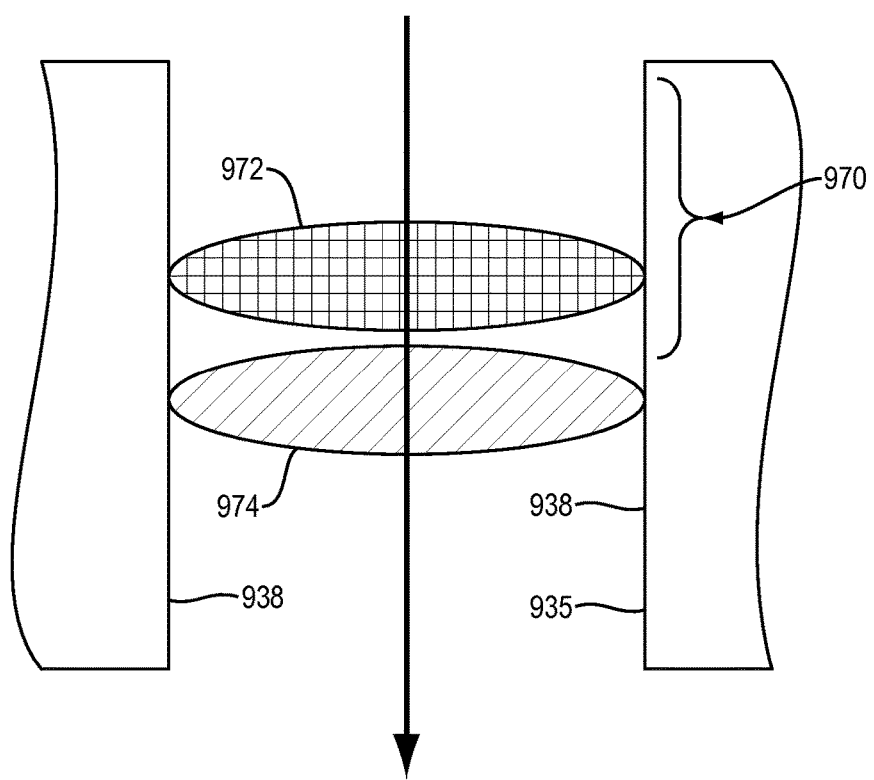
FIG. 27 is a side perspective view of a dual layer hydrophobic/hydrophilic membrane according to another aspect of the disclosure.

Referring now to FIG. 27, in another aspect of the disclosure, a multi-layer hydrophilic/hydrophobic filter subassembly is shown designated generally as 970. In this multi-layer embodiment, subassembly 970 includes a hydrophobic layer 972 and a hydrophilic layer 974 arranged in a layer configuration wherein the plane occupied by the layers is substantially orthogonal to the direction of gas flow shown in FIG. 27 via the arrow in bold. It should be understood the orientation of subassembly 970 relative to the direction of gas/liquid flow can be modified to accommodate different applications and to address any spatial requirements. The channel defined as 938 is formed or provided according to the specific embodiment in which the valve filter is incorporated. As illustratively shown in FIG. 25, channel 938 is formed as a bore through end cap 931 that receives valve filter subassembly 970 and directs the flow through valve membrane 970 in the general direction depicted by the arrow in FIG. 27.

It should be understood that in some applications of the valve membrane, the layered arrangement shown in FIG. 27 can be reversed if, for example, the valve were to function as a liquid filter valve rather than a gas valve as may be required in some applications. To function as a liquid filter valve (which restricts the flow of liquid up until a cracking pressure defined now by the hydrophobic filter material's intrusion pressure), the valve could function independent of the orientation of the hydrophilic/hydrophobic filtration media arrangement so long as the hydrophilic filtration material were chosen to provide the desired filtration efficiency and the hydrophobic filtration material were chosen to provide the appropriate cracking pressure based on the liquid intrusion pressure for the liquid intruding into the pores of the hydrophobic filtration material.

Figure 28:
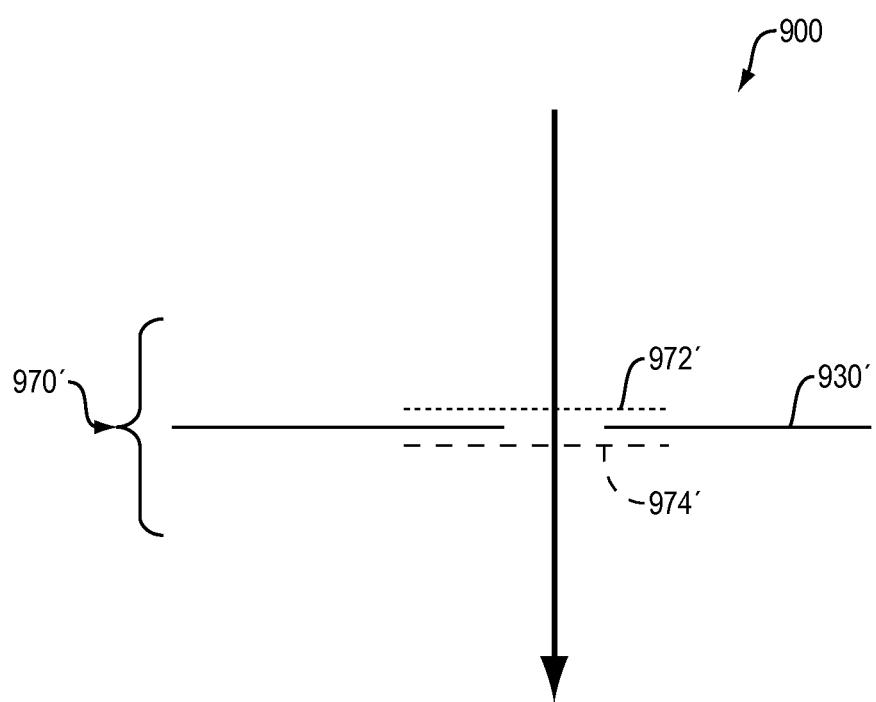
FIG. 28 is a side perspective view of a hydrophilic/hydrophobic membrane embedded into a membrane according to a further aspect of the disclosure.

Referring now to FIG. 28, in a further aspect of the disclosure, a combined hydrophilic/hydrophobic valve and processing filter assembly shown designated generally as 900 includes a processing filter material 930' having a gap, bore, slit, or other portal configuration that allows fluid to bypass the processing filter formed therein. A hydrophobic filter material 972' is placed over one side of filter material 930' and a hydrophilic filter material 974' is placed over the other side of filter material 930' to form a hydrophilic/hydrophobic valve within the processing filter material field. Filtration materials 972' and 974' are secured to processing filter 970' via thermal or sonic bonding or by other methods for securing filtration materials as disclosed herein or by other methods for securing filtration materials as is known in the art. It should be known that although FIG. 28 depicts hydrophobic filter membrane 972' placed over one side of filter material 930' and hydrophilic filter membrane 974' placed over the other side of filter material 930', other configurations are possible in which both materials are bonded to one or the other side of filter material 930'. In the configuration shown, the valve functions to permit the passage of gases once the bubble point of the wetted hydrophilic filtration material is exceeded.

Figure 29:
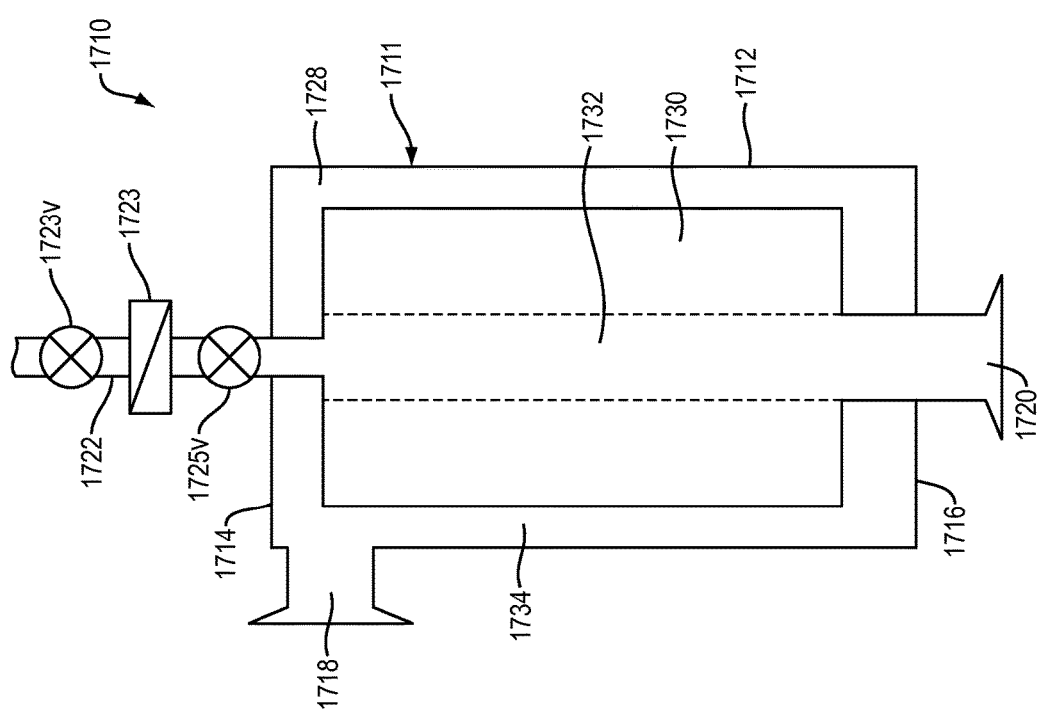
FIG. 29 is a sectional view in elevation of an "L" shaped liquid recovery assembly with a secondary valve positioned between the assembly housing and a recovery filter according to an aspect of the disclosure.

Referring now to FIG. 29, in another aspect of the disclosure, a liquid recovery filter assembly shown generally as 1710 includes many of the components and elements disclosed above for filter assembly 410, i.e., a filter housing or shell designated generally as 1711 having a shell wall 1712 and mutually opposed first or upper and second or lower ends designated 1714 and 1716, respectively, and defining an internal volume 1728. As shown in this illustrative embodiment, a toroidal filter element 1730 is secured therein. An upstream designated surface of filter element 1730 and surrounding housing 1711 define an upstream volume 1734 therebetween. Filter element 1730 has a hollow core 1732. Although not shown, an optional upstream vent port and an optional associated upstream vent port valve (such as that shown in FIG. 4) may be included and extend from upper end 1714. Also not shown, but also optional is an upstream or inlet side drain port and an associated drain port valve (such as that shown in FIG. 4) that, if included, extends from lower end 1716.

An upstream or inlet port 1718 of filter assembly 1710 extends radially in close proximity to, or from, upper end 1714. A downstream or outlet port 1720 extends downwardly from lower end 1716 and substantially coaxially from filter housing 1711 although the coaxial orientation can be displaced to accommodate specific spatial needs. A recovery port 1722 extends from upper end 1714 and is in fluid communication with filter core 1732.

A recovery filter 1723 is secured to port 1722 between the two ends of the port and is in fluid communication with a lumen formed by the port. Recovery filter 1723 should be selected from among the same construction material options and the same property/characteristic options disclosed for recovery filter 223. A recovery port valve 1722v is secured to port 1722 on a side of recovery filter 1723 distal from upper end 1714. Valve 1722v is maintained in a closed position during normal filtering operations and is opened to permit the introduction of pressurized air or gas to recover filtered liquids resident in the filter core (or to function as a vent). An optional recovery filter protection valve 1725v may be secured to vent port 1722 between upper end 1714 and recovery filter 1723. Valve 1725v is maintained in a closed position during normal filtering operations to protect recovery filter 1723 from being wetted by the liquids flowing through filter assembly 1710. Similar valves may be incorporated into the other embodiments disclosed herein in order to protect recovery filters from being wetted by the liquids flowing through the filter assemblies. Multiple combinations of passages and ports with or without valves are within the contemplation and scope of the disclosure.

The liquid flow paths through filter assembly 1710 during normal filtering operations and during the drainage or recovery of filtered liquids from filter assembly 1710 are essentially the same as those disclosed above for filter assembly 410. Recovery port valve 1722v, and to the extent incorporated into the filter assembly, any upstream vent port valve and any upstream drain port valve are closed during normal filtering operations. To the extent an upstream inlet valve and/or a downstream outlet valve are incorporated into the filter assembly to control flow into inlet 1718 and flow out of outlet 1720, respectively, those optional valves are maintained in an open position to permit flow through the filter assembly 1710.

Figure 31:
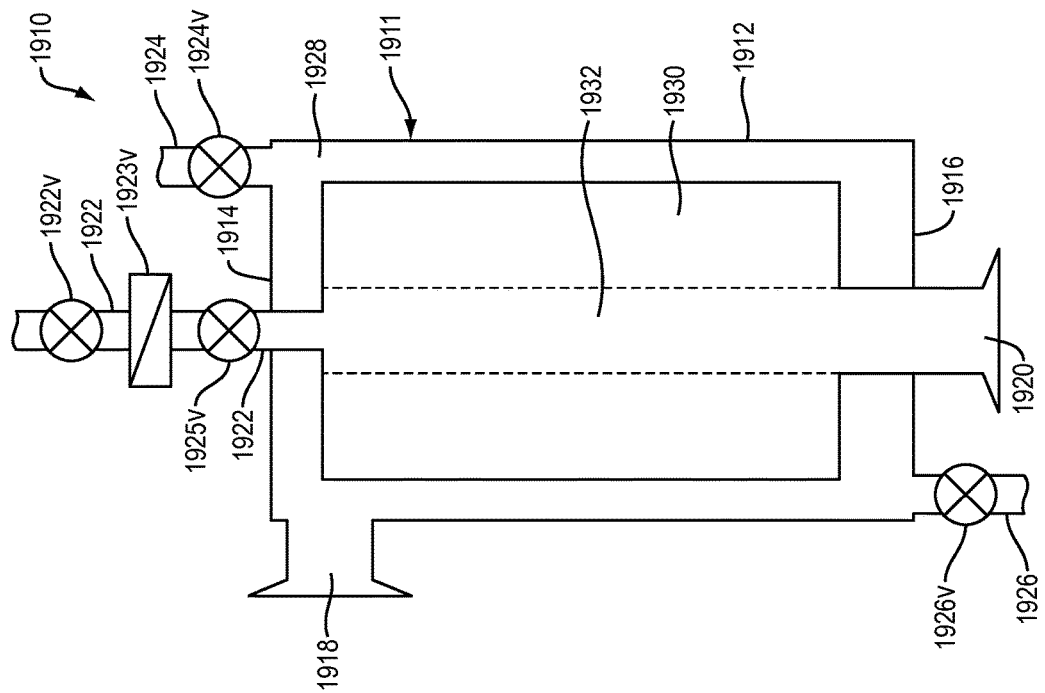
FIG. 31 is a sectional view in elevation of an "L" shaped liquid recovery assembly with a secondary valve positioned between the assembly housing and a recovery filter with an upstream drain port and an upstream vent port according to yet another aspect of the disclosure.

Referring now to FIGS. 29 and 31, liquid recovery filter assemblies shown generally as 1710 and 1910 include many of the same components and features; however, optional upstream vent port 1924 and associated optional valve 1924v as well as optional upstream vent port 1926 and associated optional valve 1926v shown in FIG. 31 for embodiment 1910 are not depicted in FIG. 29 for embodiment 1710. As all accessory vent and drain ports are optional, the function of 1710 and 1910 are essentially the same, and the reference character designations for filter assembly 1710 correspond to, and may be transferred to, filter assembly 1910 by removing the second digit "7" of each reference character and replacing it with a "9".

During normal filtering and recovery operations, filter assemblies 1710 and 1910 are operated in the same manner as disclosed for filter assembly 410 and other similar assemblies. The positions of the valves present on filter assemblies 1710 and 1910 (open, closed, partially open) during normal filtering and recovery operations are identical to the corresponding valve positions of the corresponding valves of filter assembly 410 during normal filtering and recovery operations, e.g., upstream vent port valve 1724v or 1924v, if present, and upstream drain port valve 1726v or 1926v, if present, (corresponding to upstream vent port valve 424v and upstream drain port valve 426v) are commonly closed during the primary filtration function. As such, the disclosure regarding the operation of filter assembly 410 for normal (primary) filtering and recovery operations is incorporated here by reference.

The configuration of filter assemblies 1710 and 1910 may also perform the intended liquid filter and recovery functions when the liquid flow is reversed through the assembly. It should be understood that to operate filter assemblies 1710 and 1910 in the reverse flow direction, the filter assemblies may have to be spatially reoriented gravitationally to have reassigned ports positioned in locations to optimize performance with respect to their reassigned functions. For example, a port reassigned as an outlet port should be oriented gravitationally in a low or down position relative to the body of the filter assembly. This requirement may be eliminated in some embodiments if a dip tube (disclosed herein) is used.

In one possible reverse functional configuration, the assembly is reoriented such that outlet port 1720 or 1920, reassigned as an inlet port, is located at the gravitational top or high position. Optional upstream drain port 1726 or 1926 and, if present, optional drain port valve 1726v or 1926v, are reassigned as a downstream recovery port and optional downstream recovery port valve, respectively, and will incorporate an inline recovery filter similar to, or the same as, recovery filter 1723 or 1923. Recovery port 1722 or 1922 and, if present, optional recovery port valve 1726v or 1926v are reassigned as an upstream drain port and optional reassigned upstream drain port valve, respectively, and often maintained in a closed condition during the main filtering operation.

The use of a recovery filter 1723 or 1923 on port 1722 or 1922 is optional in this functional configuration and may need to be removed in certain cases, as disclosed above. When used in this manner, liquid introduced into port 1720 or 1920 (with valve 1720v or 1920v open, if present), flows into core 1732 or 1932 (or the lumen of the filter element if constructed from, for example, hollow fiber or tubular material), and radially outwardly through filter element 1730 or 1930 into internal volume 1734 or 1934 (now a downstream volume) and out of the filter assembly through port 1718 or 1918 as processed liquid. In this functional configuration, the remaining port(s) (port 1724 or 1924 in the embodiment shown in FIG. 31, but not in FIG. 29) is/are maintained in a closed condition (by, for example, closing valve 1724v or 1924v in the embodiment shown in FIG. 31, but not shown in FIG. 29), or could be eliminated from the embodiment, as use of these ports risk contamination of the downstream filtered liquid when not coupled with a recovery filter.

The procedure to remove the resident unfiltered and filtered liquid within assembly 1710 or 1910 when operated in the reverse direction is the same as that disclosed for filter assembly 410 when operated in the reverse direction. Accordingly, the procedure disclosed for removing filtered and unfiltered liquid from filter assembly 410 when operated in a reverse direction is incorporated here by reference with respect to filter assembly 1710 or 1910.

Figure 30:
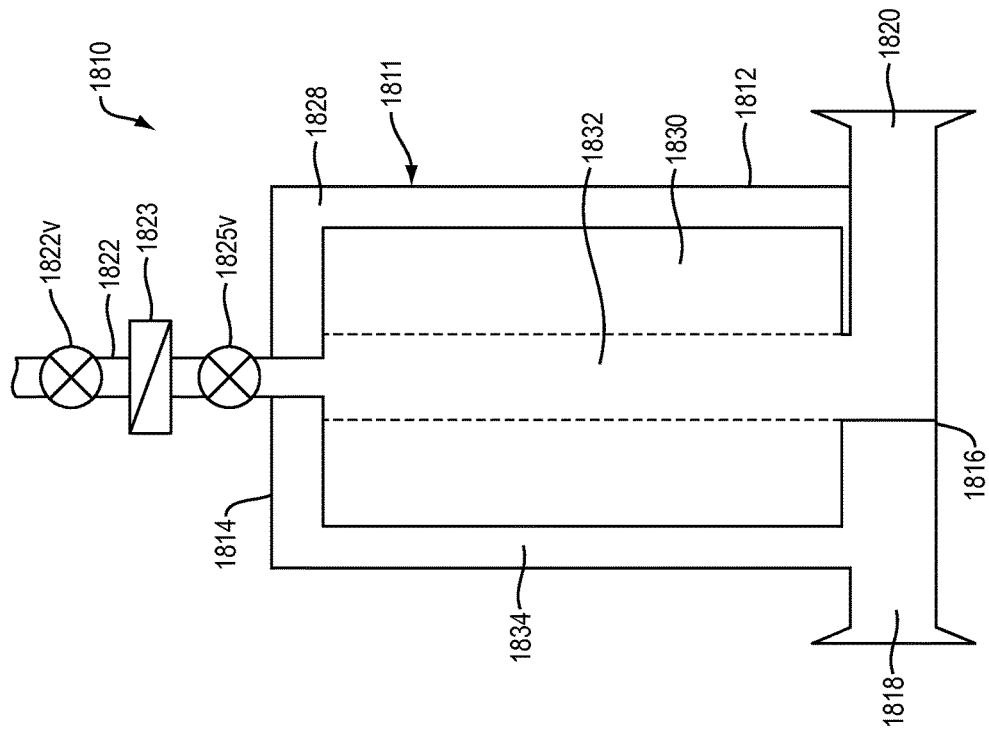
FIG. 30 is a sectional view in elevation of a "T" shaped liquid recovery assembly with a secondary valve positioned between the assembly housing and a recovery filter according to a different aspect of the disclosure.

Referring now to FIG. 30, in another aspect of the disclosure, a liquid recovery filter assembly shown generally as 1810 includes many of the components and elements disclosed above for filter assembly 1710, with the primary difference being the orientation of the inlet port and the outlet port. In filter assembly 1710, the ports are arranged in a "T" configuration with inlet port 1818 occupying substantially the same plane as outlet port 1820, similar to the embodiment 510 of FIG. 5. In this configuration, inlet port 1818 extends radially outwardly from a bottom end of filter assembly 1810 while outlet port 1820 extends radially outwardly from the bottom end in a direction substantially opposite the direction of inlet port 1818. It should be understood that the relative orientation and direction of the two ports can be modified to extend radially from a variety of different orientations to accommodate any particular application or spatial requirement.

A filter housing or shell 1811 having a shell wall 1812 with mutually opposed first or upper and second or lower ends designated 1814 and 1816, respectively, collectively define an internal volume 1828. A toroidal filter element 1830 is secured therein. An upstream designated surface of filter element 1830 and surrounding housing 1811 define an upstream or inlet volume 1834 therebetween. Filter element 1830 has a hollow core 1832. Although not shown, an upstream vent port and an optional associated upstream vent port valve (such as that shown in FIG. 5) may be included and extend from upper end 1814. Also not shown, but also optional is an upstream drain port and an optional associated drain valve (such as that shown in FIG. 5) that, if included, extends from the lower or downstream end 1816.

A recovery port 1822 extends from upper end 1814 and is in liquid communication with filter core 1832. A recovery filter 1823 is secured to port 1822 between the two ends of the port and is in fluid communication with a lumen formed by the port. Recovery filter 1823 should be selected from among the same construction material options and the same property/characteristic options disclosed for recovery filter 223. A recovery port valve 1822v is secured to port 1822 on a side of recovery filter 1823 distal from upper end 1814. Valve 1822v is maintained in a closed position during normal filtering operations and is opened to permit the introduction of pressurized gas to recover filtered liquids resident in the filter core. An optional recovery filter protection valve 1825v may be secured to recovery port 1822 between upper end 1814 and recovery filter 1823. Valve 1825v is maintained in a closed position during normal filtering operations to protect recovery filter 1823 from being wetted by the liquids flowing through filter assembly 1810. Similar valves may be incorporated into the other embodiments disclosed herein in order to protect recovery filters from being wetted by the liquids flowing through the filter assemblies. Multiple combinations of passages and ports with or without valves are within the contemplation and scope of the disclosure.

The liquid flow paths through filter assembly 1810 during normal filtering operations and during the drainage or recovery of filtered liquids in filter assembly 1810 are essentially the same as those disclosed above for filter assembly 510. Recovery port valve 1822v, and to the extent incorporated into the filter assembly, any upstream vent port valve and any upstream drain port valve are closed during normal filtering operations. To the extent an inlet valve and/or an outlet valve are incorporated into the filter assembly to control flow into inlet 1818 and flow out of outlet 1820, respectively, those optional valves are maintained in an open position to permit flow through filter assembly 1810.

Figure 32:
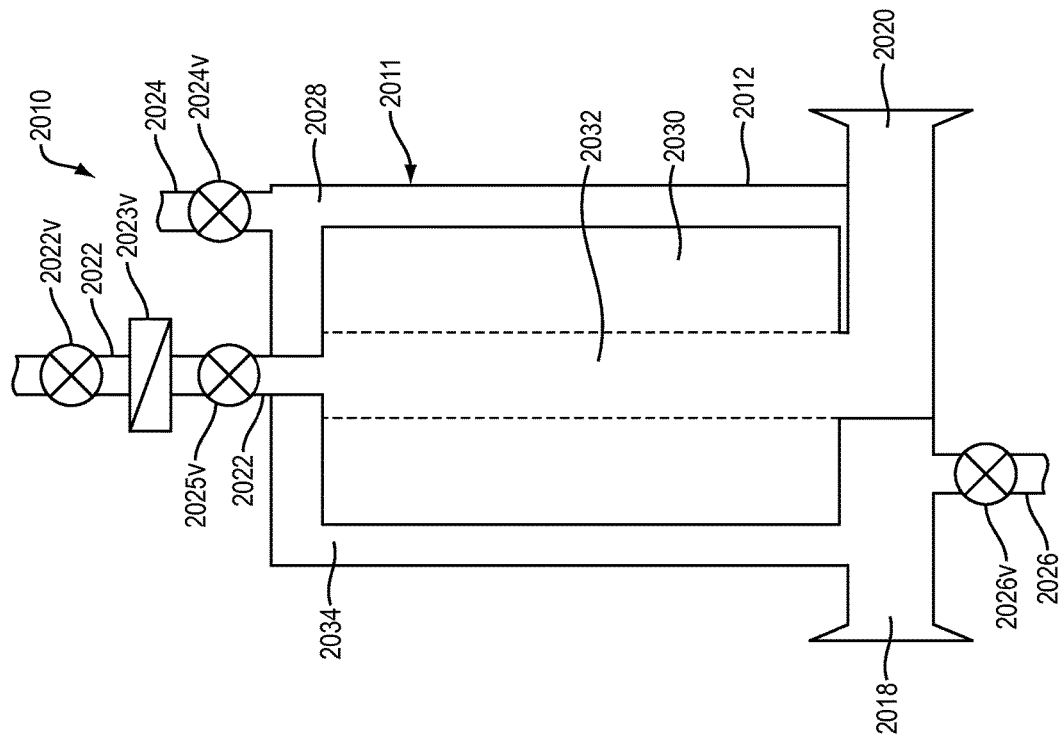
FIG. 32 is a sectional view in elevation of a "T" shaped liquid recovery assembly with a secondary valve positioned between the assembly housing and a recovery filter with an upstream drain port and an upstream vent port according to yet another aspect of the disclosure.

Referring now to FIGS. 30 and 32, liquid recovery filter assemblies shown generally as 1810 and 2010 include many of the same components and features, however, optional upstream vent port 1824 and associated optional valve 1824v as well as optional upstream vent port 1826 and associated optional valve 1826v shown in FIG. 30 for embodiment 1810 are not depicted in FIG. 32 for embodiment 1810. As all accessory vent and drain ports are optional, the function of 1810 and 2010 are essentially the same, and the reference character designations for filter assembly 1810 correspond to, and may be transferred to, filter assembly 2010 by removing the first and second digits "18" of each reference character and replacing them with a "20".

During normal filtering and recovery operations, filter assemblies 1810 and 2010 is operated in the same manner as disclosed for filter assembly 510. The positions of the valves present on filter assembly 1810 and 2010 (open, closed, partially open) during normal filtering and recovery operations are identical to the corresponding valve positions of the corresponding valves of filter assembly 510 during normal filtering and recovery operations, e.g., upstream vent port valve 1824v and 2024v, and upstream drain port valve 1826v and 2026v (corresponding to upstream vent port valve 524v and upstream drain port valve 526v) are commonly closed during the primary filtration function. As such, the disclosure regarding the operation of filter assembly 510 for normal (primary) filtering and recovery operations is incorporated here by reference.

The configuration of filter assembly 1810 and 2010 may also perform the intended liquid filter and recovery functions when the liquid flow is reversed through the assembly. It should be understood that to operate filter assembly 1810 and 2010 in the reverse flow direction, the filter assembly may have to be spatially reoriented gravitationally to have reassigned ports positioned in locations to optimize performance with respect to their reassigned functions. For example, a port reassigned as an outlet port should be oriented gravitationally in a low or down position relative to the body of the filter assembly. This requirement may be eliminated in some embodiments if a dip tube (disclosed hereinbelow) is used.

In one possible reverse functional configuration, again, similar to that disclosed for 510, the assembly may be maintained in the orientation shown schematically in FIGS. 30 and 32, such that outlet port 1820 or 2020, reassigned as an inlet port, remains located at the gravitational bottom or low position. It should be noted that reorientation is not necessary for this functional configuration compared to the orientation shown as the reassigned outlet port is located at the gravitational bottom or low position in the orientation shown schematically in FIGS. 30 and 32. Upstream vent port 1824 or 2024 is reassigned as a downstream recovery port and will incorporate an inline recovery filter and optional associated recovery filter valves and recovery filter protection valves similar to, or the same as, recovery filter 1823 or 2023 and optional associated valves. Recovery port 1822 or 2022 is reassigned as an upstream vent port and often maintained in a closed condition during the main filtering operation.

The use of a recovery filter 1823 or 2023 on port 1822 or 2022 is optional in this functional configuration. When used in this manner, liquid introduced into port 1820 or 2020 (with valve 1820v or 2020v open, if present), flows into core 1832 or 2032 (or the lumen of the filter element if constructed from, for example, hollow fiber or tubular material), and radially outwardly through filter element 1830 or 2030 into internal volume 1834 or 2034 (now a downstream volume) and out of the filter assembly through port 1818 or 2018 as processed liquid. In this functional configuration, the remaining port(s), if present, (port 1826 or 2026 in the embodiment shown in FIG. 32 but not shown in FIG. 30) is/are maintained in a closed condition (by, for example, closing valve 1826v or 2026v in the embodiment shown in FIG. 32 but not shown in FIG. 30) or could be eliminated from the embodiment, as use of these ports risk contamination of the downstream filtered liquid when not coupled with a recovery filter. Once the intended volume of liquid is filtered through assembly 1810 or 2010, valve 1820v or 2020v may be closed to cease flow.

The procedure to remove the resident unfiltered and filtered liquid within assembly 1810 or 2010 when operated in the reverse direction is the same as that disclosed for filter assembly 510 when operated in the reverse direction. Accordingly, the procedure disclosed for removing filtered and unfiltered liquid from filter assembly 510 when operated in a reverse direction is incorporated here by reference with respect to filter assemblies 1810 or 2010.

Figure 33:
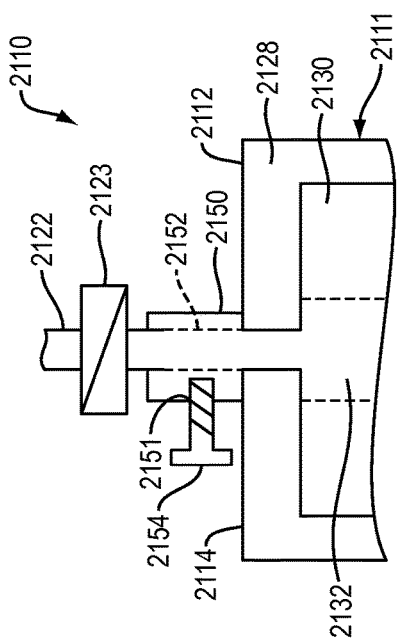
FIG. 33 is a partial sectional view in elevation and in partial phantom of a liquid recovery assembly with a collapsible valve with a screw-type shutoff in an open position according to yet another aspect of the disclosure.
Figure 34:
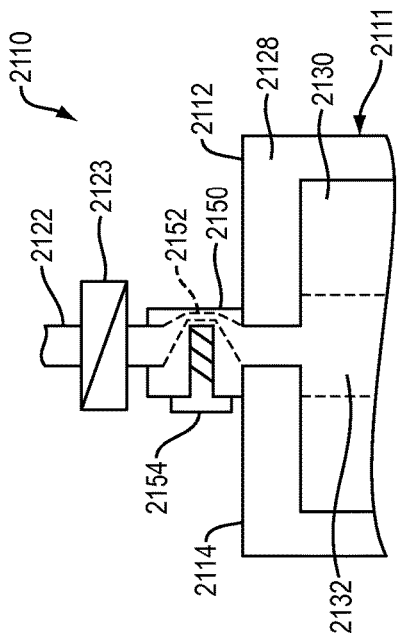
FIG. 34 is a partial sectional view in elevation and in partial phantom of a liquid recovery assembly with a collapsible valve with a screw-type shutoff in a closed position according to still another aspect of the disclosure.

Referring now to FIGS. 33 and 34, in another aspect of the disclosure, a recovery filter protection valve assembly is incorporated into a liquid recovery filter assembly designated generally as 2110. The recovery filter protection valve assembly shown on assembly 2110 is meant to be illustrative and not limiting with respect to recovery filter protection valve assemblies suitable for use in the disclosed filter assemblies. Filter assembly 2110 includes many of the same features as prior disclosed embodiments including a housing or shell 2111 having a shell wall 2112 with an upper end 2114 and a lower end (not shown) that in combination define an internal volume 2128. A filter element 2130 having a downstream core 2132, or other type of filter element, as disclosed herein, is secured in internal volume 2128 with any of the methods for securing filter elements disclosed herein. Filter assembly 2110 may include any or all of the upstream and/or downstream ports and optional associated valves disclosed with respect to other filter assembly embodiments disclosed herein.

Filter assembly 2110 also includes a recovery port 2122 that incorporates an in-line recovery filter protection valve body 2150 between recovery filter 2123 and core or downstream volume 2132. A collapsible recovery filter protection valve tube 2152 is contained within valve body 2150 and defines the flow path through valve body 2150. A recovery filter 2123 is secured in-line with port 2122 and is in fluid communication with filter core 2132 via port 2122 and tube 2152. Recovery filter 2123 should be selected from among the same construction material options and the same property/characteristic options disclosed for recovery filter 223.

Valve body 2150 extends upwardly from upper end 2114 and may terminate at any point between volume 2132 and recovery filter 2123. Valve body 2150 defines a chamber to attach to port 2122 and to provide a surface to assist compression of tube 2152. A bore 2151 is formed in a sidewall of body 2150 to receive a tube compression bolt or pin 2154. Bolt 2154 may include threading with corresponding mated threading formed on the surface of bore 2151. It should be understood that the method used to advance and retract bolt 2154 may be accomplished by other methods such as bolt treading and a retainer clip secured inside body 2150 with a bore dimensioned to engage the threading of bolt 2154. Tube 2152 is compressed by torqueing bolt 2154 onto a sidewall of tube 2152 so as to compress the sleeve against the inner wall of body 2150 as shown in FIG. 34. To reopen the tube lumen, bolt 2154 is backed off tube 2152 as shown in FIG. 33. An optional rigid, or otherwise protective material, not shown, may be included between bolt 2154 and tube 2152 to protect tube 2152 from damage and wear caused by contact or interaction with bolt 2154. The cylindrical edge of the terminus of bolt 2154 may be radiused to prevent the edge from tearing into tube 2152 when compressed against the tube.

A first or lower end of recovery port 2122 extends from upper end 2114 and is in fluid communication with core 2132 of filter element 2130. Filter element 2130 is secured in housing 2111 by any of the means disclosed herein including mated surfaces with O-rings, thermal or sonic welding, adhesive and the like. The same methods to join the components together may be used if a filter cartridge is secured in shell housing 2111. A second or upper end of the recovery port 2122 extends above or beyond a top surface of body 2150. Recovery filter 2123 is secured within a top end of recovery port 2122 and is in fluid communication with a lumen of recovery port 2122. It should be understood that body 2150 may be dimensioned to house recovery filter 2123 within its borders and may be used to eliminate the need for a capsule to enclose recovery filter 2123.

Tube 2152 may be secured to port 2122 by dimensioning an internal cross-sectional diameter of tube 2152 to be greater than the outer cross-sectional diameter of port 2122. Tube 2152 is then slipped onto the outer wall of port 2122 and secured by the elasticity of the material used to construct tube 2152 that constricts onto tube 2122. Barbs, adhesives, thermal and/or sonic bonding, other methods disclosed herein as well as any method known in the art for connecting fluid pathways may also be used. It should be understood that the dimensional orientation of the parts may be reversed whereby the outside cross-sectional diameter of tube 2152 is smaller than the inner cross-sectional diameter of port 2122. In this configuration, tube 2152 is inserted into port 2122 and secured with adhesive, thermal and/or sonic bonding, crimping and the like as well as any method disclosed herein or known in the art for connecting tubular fluid pathways. The means to join the two tubular elements may include another tube (not shown) that functions as an internal or external coupling sleeve, or as an additional component inserted into or around an outer surface of port 2122 and tube 2152.

The materials used to make tube 2152 may be chosen to be the same materials of construction used for the shell, end caps, ports of the filters disclosed herein and may include, but are not limited to, polypropylene, polyethylene, nylon, polyester, fluoropolymers, metals and metallic alloys, etc. It is important to select a materials that will not react to, or interact with, the materials intended to be introduced into the filter assembly.

Figure 35:
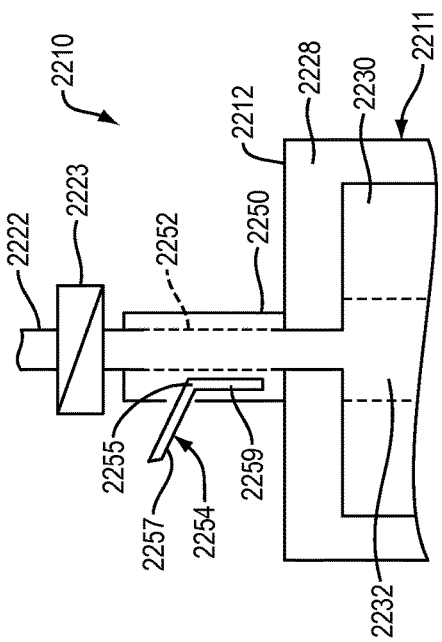
FIG. 35 is a partial sectional view in elevation and in partial phantom of a liquid recovery assembly with a collapsible valve with a lever-type shutoff in an open position according to a further aspect of the disclosure.
Figure 36:
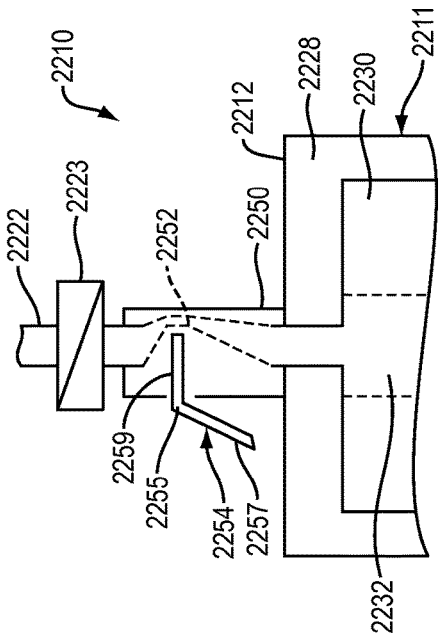
FIG. 36 is a partial sectional view in elevation and in partial phantom of a liquid recovery assembly with a collapsible valve with a lever-type shutoff in a closed position according to a further aspect of the disclosure.

Referring now to FIGS. 35 and 36, in yet another aspect of the disclosure, a liquid recovery filter assembly shown designated generally as 2210 includes essentially the same corresponding features of filter assembly 2110 except bolt 2154 is not present in this embodiment. To open and close tube 2252, a lever control 2254 is used.

A recovery filter protection valve body 2250 is dimensioned to receive lever control 2254. Lever control 2254 is secured to body 2250 via an axle (not shown) about which control 2254 can rotate from a closed position (tube compression position shown in FIG. 36) to an open position (tube open position shown in FIG. 35). Stops may be incorporated into body 2250 to limit the range of motion of lever control 2254. A slot is formed in body 2250 to receive the axle and optional bearing used to secure lever control 2254 and to permit free rotation about the axle. A tube impinging segment 2259 is positioned inside body 2250. A lever operating segment 2257 extends from the axle outside body 2250. In an open position, tube impinging segment 2259 is either disengaged from tube 2252 or in registration against it, but not compressing the tube to an extent that would restrict flow through the lumen within tube 2252. In a closed position, impinging segment 2259 is registered against tube 2252 and compressing it against an inner wall of post 2250 to close the lumen and prevent fluid and/or gas flow through the sleeve. An optional rigid, or otherwise protective material, not shown, may be included between impinging segment 2259 and tube 2252 to protect tube 2252 from damage and wear caused by contact with and impingement by 2259. Any surface of impinging segment 2259 that contacts tube 2252 may be radiused to prevent tearing of the tube.

The orientation of impinging segment 2259 is determined by the operation and orientation of operating segment 2257. In an open position, operating segment is in an "up" position as shown in FIG. 35. In a closed position, operating segment 2257 is in a "down" position shown in FIG. 36. It should be understood that the orientation of lever 2254 can be reversed on the axle whereby the operating segment is in a "down" position in the open position and in an "up" position in the closed position. Lever 2254 can be manually or automatically operating with a step motor and the like.

Referring now to FIG. 37, in a further aspect of the disclosure, a liquid recovery filter assembly shown designated generally as 2310 includes essentially the same corresponding features as most of the embodiments disclosed herein with the addition of a check valve 2352 secured in a downstream recovery port 2322 between a recovery filter 2323 (similar to, or the same as, recovery filter 223) and a filter core or downstream volume 2332 rather than a conventional valve or the collapsible valves of filter assembly embodiments 2110 and 2210. The check valve provides a means for limiting liquid and/or gas flow to one direction, into the core. This enables the filtered liquid to be recovered by introducing a gas through recovery port 2322 into recovery filter 2323 and into core 2332. Check valve 2352 prevents fluids from flowing into filter 2323.

The materials used to construct valve 2352 include natural and synthetic rubbers, elastomers, plastics, and other materials disclosed herein as well as other materials known in the art to construct one-way valves. As with other features of the disclosed embodiments, material selection should take into account the liquids and gases that will contact the valve.

Referring now to FIGS. 38 and 39, in a still further aspect of the disclosure, a liquid recovery filter assembly shown designated generally as 2410 includes a check valve 2452 to prevent flow between a filter element core 2432 and a recovery filter 2423 (similar to, or the same as, recovery filter 223). Check valve 2452 includes an upper (closest to recovery filter 2423) porous or otherwise non-contiguous layer 2456 secured in and fully integral with recovery port 2422 such that all fluid passing from filter 2423 to core 2432 must pass through the pores or openings in layer 2456. A lower non-porous or otherwise flow-restrictive layer 2458 is secured to upper layer 2456 at one or more points such that it is held in position, but may be bent or angled away from layer 2458 if force is applied. In FIG. 39, it is shown that a center section of layer 2458 is secured to upper layer 2456, while an outer annular (or other shape) segment 2460 of lower layer 2458 is free to rotate or bend away from upper layer 2456, and is dimensioned to contact the inner wall of recovery port 2322 when flattened against upper layer 2456 so as to create a seal when in a closed position.

Operation of valve 2452 is determined by pressure gradient. During regular filtering operations with the processing filter, a pressure gradient is created with a higher pressure below the valve and a lower pressure above the valve as shown in FIG. 39. This pressure gradient causes segment 2460 to remain in a closed position and prevent liquids in the downstream side of the processing filter from gaining access to recovery filter 2423.

Following the primary filtering operation, to recover filtered liquids remaining in the downstream side, pressurized gas is introduced into recovery port 2422 and flows through check valve 2452. The addition of the pressurized gas reverses the pressure gradient to now have the higher pressure on the upper side of valve 2452. This causes segment 2460 to rotate or bend downwardly so as to permit the gas to pass beyond valve 2452 and into downstream volume or core 2432. Any sudden reversal of the pressure gradient will cause the segment 2460 to rotate or bend back up into a closed position and protect recovery filter 2423 from the liquids in the filter assembly.

Upper layer 2456 may be constructed from the same materials of construction used for the shell, end caps and ports of the filter assemblies disclosed herein and may include, but are not limited to polypropylene, polyethylene, nylon, polyester, fluoropolymers, metals and metallic alloys, etc. Further, upper layer 2456 may be constructed as a recovery filter using the same materials and considerations disclosed for recovery filter 223. If layer 2456 is constructed as a recovery filter with properties capable of ensuring the purity of fluids passing through layer 2456 are appropriate for contact with the filtered liquid, recovery filter 2423 can be eliminated from recovery port 2422. Additional supportive layers or materials may be necessary to provide structural as well as fluid integrity to layer 2423, if constructed as a recovery filter. Lower layer 2458 may be constructed from natural and synthetic rubbers, elastomers, plastics, and other materials disclosed herein as well as other materials known in the art to construct one-way valves. As with other embodiments, material selection should take into account the liquids and gases the materials will contact.

Figure 40:
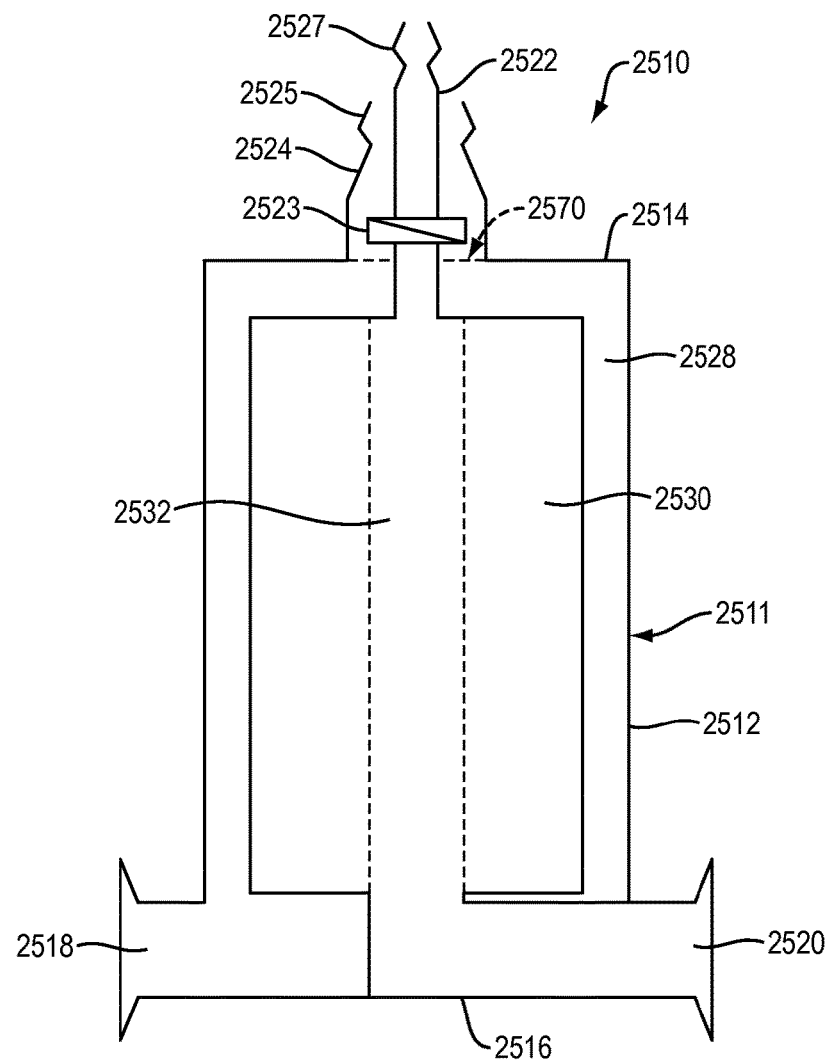
FIG. 40 is a side sectional view in elevation and in partial phantom of a liquid recovery assembly with a concentrically arranged outlet and recovery port according to yet another aspect of the disclosure.
Figure 46:
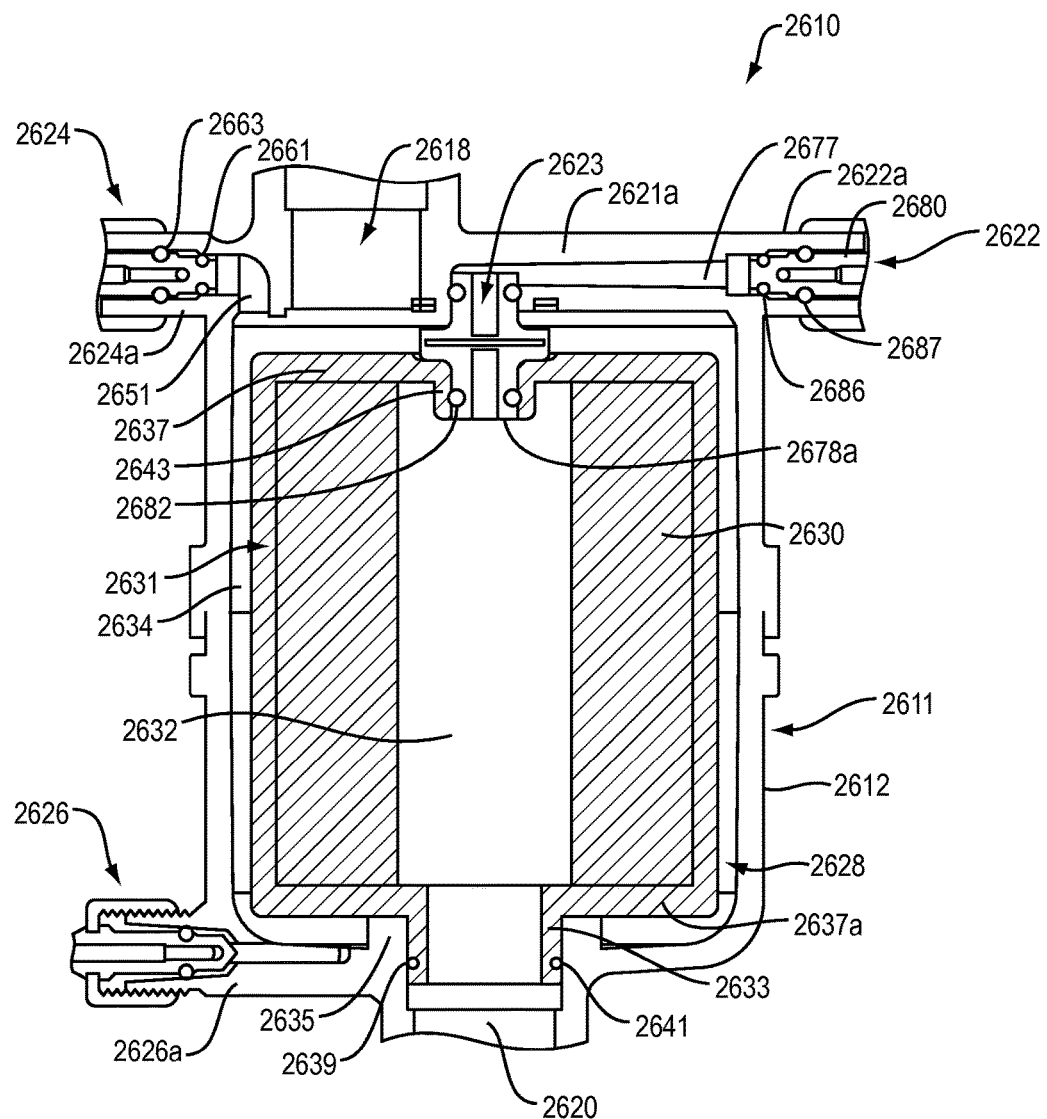
FIG. 46 is a side sectional view of the liquid recovery assembly shown in FIGS. 41 and 42.
Figure 49:
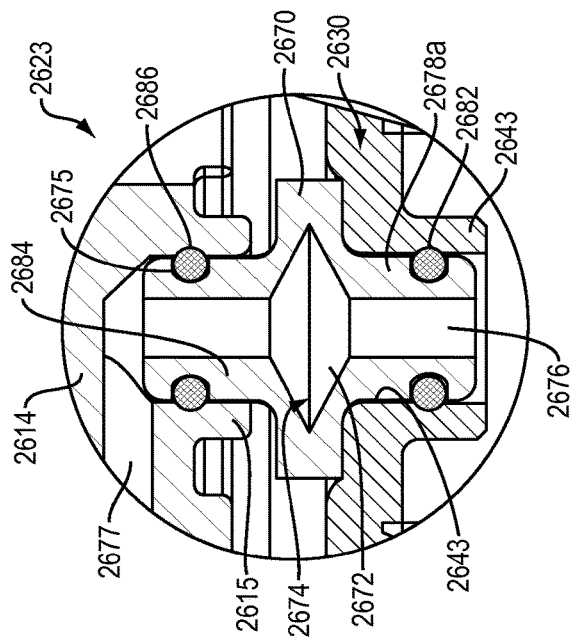
FIG. 49 is a side sectional view of a recovery filter subassembly according to the embodiment of the disclosure shown in FIGS. 41 and 42.

Referring now to FIG. 40, in yet another aspect of the disclosure, a liquid recovery filter assembly shown designated generally as 2510 includes an upstream vent port 2524 coaxially arranged with a downstream recovery port 2522. This embodiment provides an additional means to reduce the overall size of the filter assembly when external spatial requirements require a more compact filter assembly design.

Filter assembly 2510 includes most of the features of the other filter assembly embodiments disclosed herein including a housing or shell 2511, shell wall 2512, internal volume 2528, upper housing end 2514, lower housing end 2516, filter element 2530 secured in the housing, filter core 2532, inlet port 2518, outlet port 2520 and recovery filter 2523 (similar to, or the same as, recovery filter 223), secured in line and in fluid communication with the lumen of downstream recovery port 2522. It should be understood that although this embodiment is shown in the "T" configuration (inlet and outlet ports orientation), the coaxial upstream and downstream vent and recovery ports can be incorporated into any of the other filter assembly configurations disclosed herein.

As shown, filter assembly 2510 includes upstream vent port 2524 that extends from upper end 2514 and is dimensioned to enclose recovery filter 2523 and downstream recovery port 2522. A distal end of port 2524 includes a barb 2525 to receive a hose/tube or other further assembly. Quick connects, sterile clamps and the like may also be secured to upstream vent port 2524. In this configuration, vent port 2524 may be used to integrity test the filter assembly.

Downstream recovery port 2522 is connected to and/or in fluid communication with filter core 2532. The method to connect port 2522 to core 2532 is the same as disclosed for other filter assembly embodiments disclosed herein. Port 2522 has a cross-sectional diameter smaller than the cross-sectional diameter of upstream vent port 2524 and is arranged in a substantially coaxial arrangement with a shared longitudinal axis. It should be understood that downstream recovery port 2522 may be offset so as to have an independent axis and remain contained within upstream vent port 2524. An optional stabilizing ring 2570 may be secured to, or in close proximity to, upper end 2514 and to downstream recovery port 2522 to stabilize the port in the filter assembly. Ring 2570 is formed with slots or perforations to permit liquids and/or gases to pass between an upstream volume of the filter assembly and upstream vent port 2524.

Recovery filter 2523 is secured to downstream recovery port 2522 within the inner wall of upstream vent port 2524. An annular gap exists between the perimeter of filter 2523 and the inner wall of port 2524 to permit fluid and/or gas flow in the port. Alternatively, the capsule for recovery filter 2523 may be secured to the inner wall of upstream vent port 2524 at one or more points to add structural support. Gaps between the contact/connection points provide the pathways for fluid/gas flow through upstream vent port 2524. A distal end of downstream recovery port 2522 includes a downstream vent barb 2527 to receive a hose/tube or other further assembly. Quick connects, sterile clamps and the like may also be secured to downstream recovery port 2522.

Referring now to FIGS. 41, 42, 46-49, 53-56 and 59-65 in yet another aspect of the disclosure, a liquid recovery filter assembly shown designated generally as 2610 includes a recovery filter subassembly secured within the assembly's housing or shell so as to provide a more compact filter assembly and to provide additional structural protection for the recovery filter. Filter assembly 2610 includes many of the same features as the other filter assembly embodiments disclosed herein. A housing or shell 2611 having a shell wall 2612 with an upper end or upper end cap 2614 and a lower end or lower end cap 2616 that, in combination, define an internal volume 2628. As shown in FIGS. 41 and 42, shell 2611 is a two-piece design with the shell ends being integral to one half, or one section of shell wall 2612, the two sections of which are secured together via thermal bonding, or other method to form the shell wall. It should be understood that shell 2611 may also be formed with a single piece shell wall with one integral end and one end cap, or with two end caps. A filter element 2630 having a downstream core 2632 is secured in internal volume 2628. An inlet port 2618 is in fluid communication with an inlet channel 2619 and with an upstream portion 2634 of internal volume 2628 (defined by the inner surfaces of shell wall 2612, upper end 2614, outlet end or end 2616 and an outer upstream designated surface of filter element 2630). An outlet port 2620 is in fluid communication with filter core 2632.

In the embodiment shown, filter assembly 2610 has an upstream vent port subassembly 2624, an upstream drain port subassembly 2626 and a downstream liquid recovery port subassembly 2622 that also functions as a downstream vent port. Each port includes an optional bleed valve with each valve having a valve stem, valve adjustment cap and O-ring(s) to create sliding seals as disclosed in more detail below.

Filter element 2630 may be in a cartridge form wherein a filter cage designated generally as 2631 is superposed about the filter media and defines an upstream boundary of the filter media portion of the filter element. Cage 2631 is formed from non-porous materials such as those disclosed herein as being suitable for formation of the various filter assembly housing embodiments. Cage 2631 is formed with bores, channels and/or a lattice-like structure to permit liquids and gases to pass from upstream volume 2634 into the enclosed filter material. An upper cage end cap 2637 is secured to, or integral with, filter cage 2631 and is formed from a non-porous material like cage 2631 with or without bores and/or channels, or a lattice-like structure to permit liquid transmission from the upstream side to the filter material inside the cage. A lower cage end cap 2637a is secured to, or integral with, filter cage 2631 and is formed also from a non-porous material like cage 2631 with or without bores and/or channels, or a lattice-like structure to permit liquid transmission from the upstream side to the filter material inside the cage. The filter cage and filter cage end caps collectively define a filter cartridge chamber within which is secured filter material. The enclosed filter material may be thermally bonded to one or both end caps, or alternatively, may be potted at one or both ends with an adhesive to form a smooth continuous surface for one or both end caps.

Filter element 2630 has additional features to secure the cartridge to housing 2611. Specifically, a lower hollow post 2633 extends downwardly from a main body of filter element 2630. An inner wall of post 2633 defines a post lumen in liquid communication with filter core 2632 and outlet channel 2621. Lower end or end cap 2616 has a filter cartridge lower receiving sleeve 2635 with an inner diameter dimensioned to receive lower post 2633. A lower O-ring annular channel 2639 is formed on the outer surface of post 2633 and/or an inner surface of sleeve 2635 to receive a lower O-ring 2641 to form a substantially liquid-tight, friction-type and/or compressive-type seal between the sleeve and the post. The channel defined by sleeve 2635 is in fluid communication with core 2632 and outlet port 2620. It should be understood that the post and sleeve combination as disclosed for this embodiment can be formed also in an opposite configuration with the hollow post formed on the lower end, or end cap and the sleeve formed on filter element 2630. It should also be understood that other methods disclosed herein as well as other methods known in the art (e.g., a luer lock design) can be used to connect upper and/or lower ends of element 2630 to shell or housing 2611 and remain within the scope of the disclosure.

With respect to alternative methods to secure filter cartridge 2630, lower post 2633 may be permanently secured to lower end 2616, or to an inner wall of outlet port 2620 as shown and disclosed in more detail herein. The means used to permanently secure post 2633 to the sleeve of lower end 2616 (or the opposite sleeve and post alternative disclosed above) include thermal or sonic bonding, adhesive as well as combinations of the different bonding methods. The use of a permanent method of bonding the cartridge to the housing eliminates the need for an O-ring seal and any modifications necessary to incorporate an O-ring seal.

An upper filter element sleeve or bore 2643 is formed on a top end of filter element 2630 and is dimensioned to receive a segment of a recovery filter subassembly designated generally as 2623, disclosed in detail below. Alternatively, the upper portion of filter element 2630 can be configured as a hollow upper post (not shown) such as lower post 2633 to receive recovery filter subassembly 2623. It should also be understood that other methods disclosed herein as well as other methods known in the art can be used to connect the upper and/or the lower ends of element 2630 to shell 2611 and remain within the scope of the disclosure. By way of illustration, the methods used to permanently secure lower post 2633 to the lower end cap or outlet port may also be used with respect to sleeve 2643 or the alternative upper post configuration. An O-ring seal may also be used as disclosed in more detail herein.

Recovery filter subassembly shown designated generally as 2623 is dimensioned to fit within housing 2611. Subassembly 2623 has a recovery filter housing, capsule or shell 2670 having portions defining a recovery filter chamber 2672 dimensioned to receive and support a recovery filter 2674 (at least functionally similar to, or the same as, recovery filter 223). Housing 2670 has further portions defining a fluid channel 2677 in fluid communication with processing filter core 2632 and with a lumen or channel of a recovery port 2622a. Subassembly 2623 has a hollow core receiving lower post 2678a extending downwardly from housing 2670 and proximal to filter cartridge 2630. Post 2678a is dimensioned to fit within sleeve 2643 and has an annular channel 2680a formed in an outer surface dimensioned to receive an O-ring 2682 to create a substantially liquid-tight, friction-type seal between the sleeve and the post. O-ring 2682 is seated in channel 2680 and has an outer surface that registers against an inner wall of sleeve 2633 to create the seal.

It should be understood that channel 2680a may also be formed on the inner wall of sleeve 2643 to receive the O-ring and have an inner surface of the O-ring register against a substantially smooth outer surface of lower post 2678a. Moreover, more than one O-ring and/or O-ring/channel combination may be used to secure each post and sleeve combination as shown in FIG. 22. It should be further understood that other means known in the art to attach recovery filter subassembly 2623 to filter element 2630 may be used and remain with the scope of the disclosure.

Figure 63:
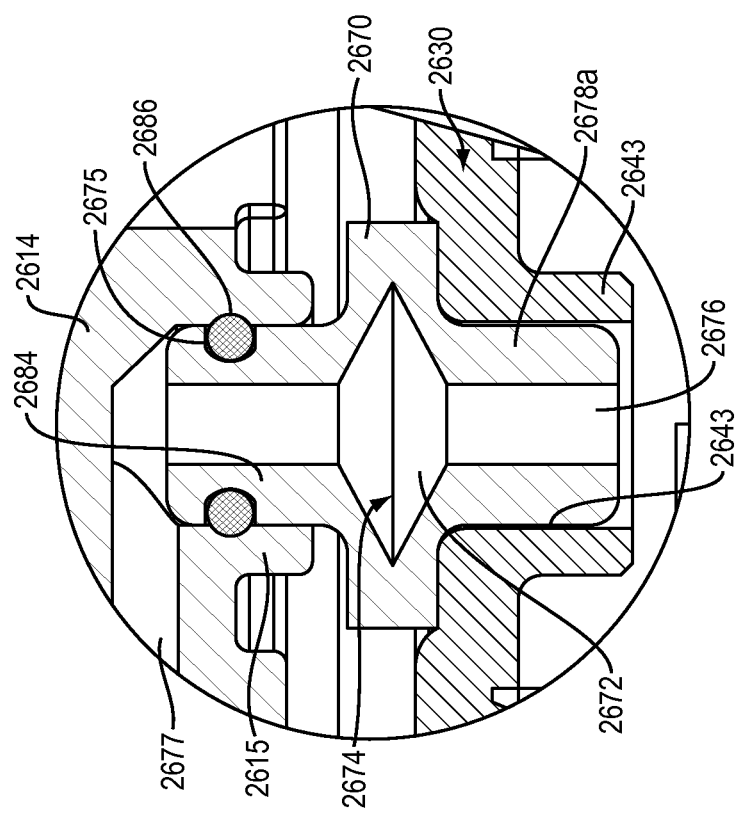
FIG. 63 is a side sectional view of an internal recovery filter subassembly with an upper attachment post secured with an O-ring seal and a lower attachment post permanently secured to a filter element according to one embodiment of the disclosure.
Figure 65:
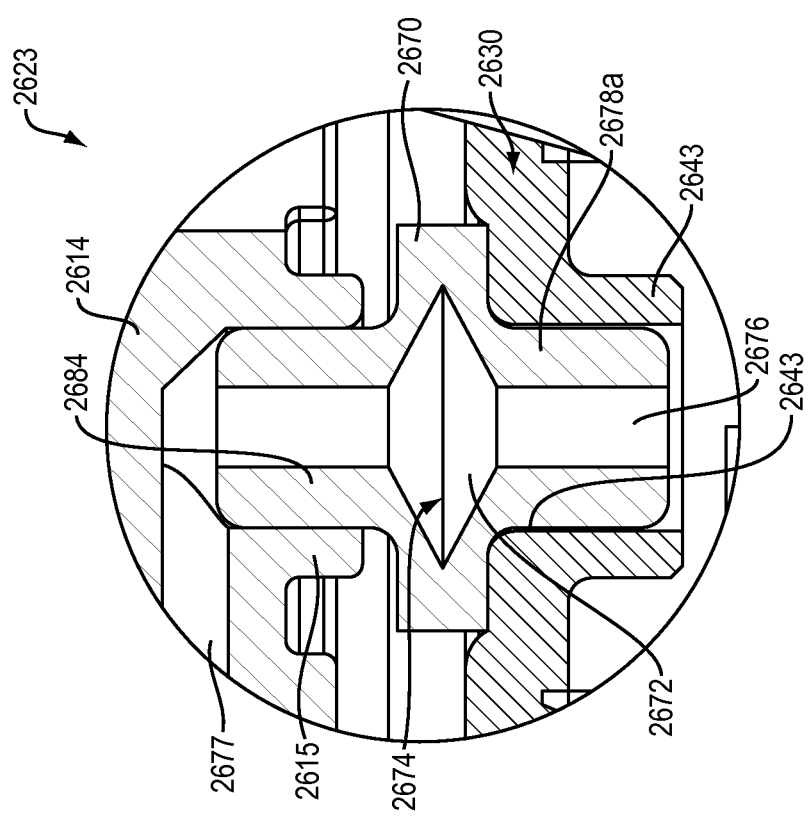
FIG. 65 is a side sectional view of an internal recovery filter subassembly with an upper attachment post and a lower attachment post both permanently secured to a housing assembly upper end cap and a filter element, respectively, according to a further embodiment of the disclosure.

With respect to other methods to secure filter subassembly 2623 to filter element 2630, as shown in FIGS. 63 and 65, post 2678a may be permanently sealed to sleeve 2643. The means used to permanently secure post 2678a to sleeve 2643 (or the opposite sleeve and post alternative disclosed above) include thermal or sonic bonding, adhesive as well as combinations of the different bonding methods. The use of a permanent method of bonding filter cartridge 2630 to recovery filter assembly 2623 eliminates the need for an O-ring seal and any modifications necessary to incorporate an O-ring seal such as channel 2680a.

Subassembly 2623 further has a hollow upper post 2684 that extends upwardly from housing 2670 and distal from filter core 2632 to provide a structural means to secure subassembly 2623 to filter assembly upper end or upper end cap 2614. Upper post 2684 has portions defining an annular upper O-ring channel 2675 formed on an outer wall and dimensioned to receive an O-ring 2686 secured therein. Upper end cap 2614 has portions defining a sleeve 2615 dimensioned to receive upper post 2684 and O-ring 2686. O-ring 2686 registers against an inner wall of sleeve 2615 so as to create a substantially liquid-tight, friction-type and/or compressive-type seal between subassembly 2623 and upper end 2614. It should be understood that upper O-ring channel 2675 can be formed instead on the inner wall of sleeve 2615 to receive the O-ring, an inner surface of which will register against an outer wall of upper post 2684 to create the seal. Other means disclosed herein or known in the art may also be used to secure subassembly 2623 to upper end 2614 and remain within the scope of the disclosure.

Figure 64:
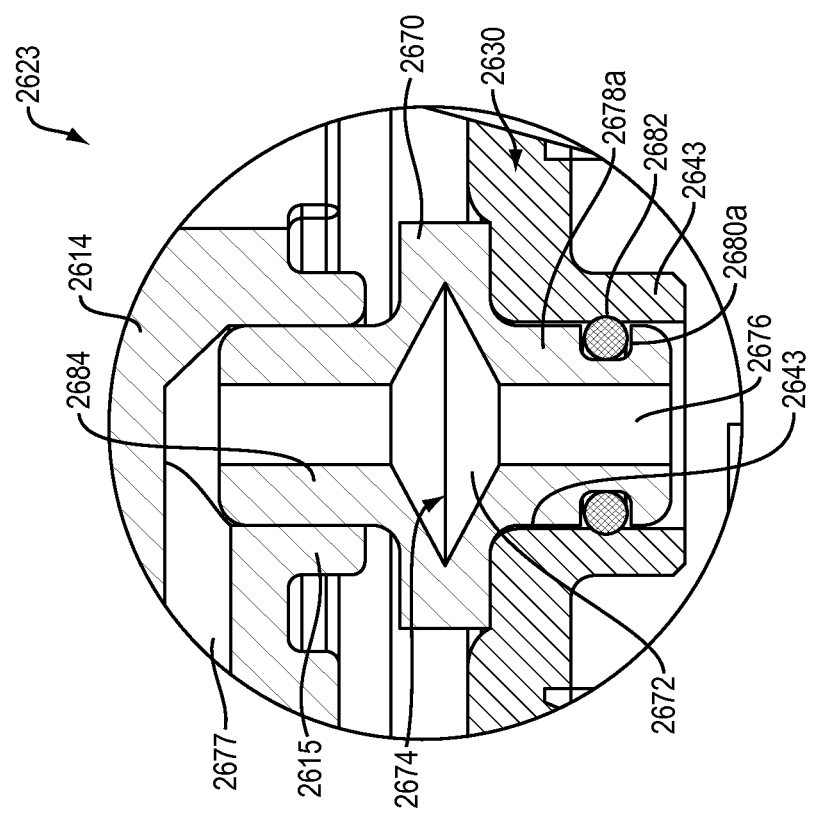
FIG. 64 is a side sectional view of an internal recovery filter subassembly with an upper attachment post permanently secured to a filter housing upper end cap and a lower attachment post secured with an O-ring seal to a filter element according to another embodiment of the disclosure.

With respect to other methods to secure filter subassembly 2623 to upper end 2614, as shown in FIGS. 64 and 65, post 2684 may be permanently sealed to sleeve 2615. The means used to permanently secure post 2684 to sleeve 2615 (or the opposite sleeve and post alternative disclosed above) include thermal or sonic bonding, adhesive as well as combinations of the different bonding methods. The use of a permanent method of bonding filter assembly upper end cap 2615 to recovery filter assembly 2623 eliminates the need for an O-ring seal and any modifications necessary to incorporate an O-ring seal such as channel 2675.

To maintain a fluid path from core 2630 to the lumen or channel of recovery port 2622a, the depth of upper end or upper end cap sleeve 2615 is dimensioned to be greater than the length of upper post 2684 so as to create a gap that connects the fluid path from the lumen of recovery port 2622a to channel 2677. In this configuration, an upper surface of the main body of recovery filter subassembly 2623 registers against an annular shoulder defined by a lower edge of upper sleeve 2615. In an alternative embodiment, the depth of sleeve 2615 can be dimensioned to be the same as the length of upper post 2684 so that a top end of the post registers against a bottom of sleeve 2615. In this configuration, a radial channel (not shown) is formed on a top end of upper post 2684 to connect the lumen of recovery port 2622a to channel 2677 and any channels disclosed herein as being therebetween.

The combination of upper end or end cap 2614, recovery filter subassembly 2623 and the upper portion of filter element 2630 provide the means to anchor the top end of filter element 2639 to housing 2611. It should be understood for embodiments that present the recovery filter in-line with the recover port, outside the filter assembly housing, that the same sleeve/post configuration used to secure the recovery filter subassembly inside the housing can also be used to secure the upper end of the filter element directly to the housing without the use of O-rings. FIGS. 63-65 show illustrative examples of one post (FIGS. 63 and 64), or both (FIG. 65) posts of recovery filter assembly 2623 permanently fixed, i.e. without an O-ring seal. Other construction alternatives to secure the filter element to the filter housing are disclosed hereinbelow.

The internalization of recovery filter subassembly 2623 does not require any special consideration with respect to function and use. The procedures disclosed herein with respect to the primary liquid processing function and the filtered liquid recovery function for filter assembly 210 apply equally to filter assembly 2610. The disclosure of those procedures is therefore incorporated here by reference with respect to filter assembly 2610.

Upper end/upper end cap 2614 has additional portions defining a radially extending recovery port connector 2621a that defines recovery channel 2677 in fluid communication with fluid channel 2676 and with a lumen or channel of recovery port 2622a. An exterior surface of recovery port 2622a is formed with a pin 2622b to receive, control and limit the movement range of an adjustable recovery port cap 2688 as disclosed in more detail below. An internal surface of recovery port 2622a is formed with two differently dimensioned channels with a first outer channel 2678 having a cross-sectional diameter greater than the cross-sectional diameter of an inner recovery port channel 2679. The junction of the two channels may take the form of a defined annular shoulder or an annular sloped surface that joins the two differently dimensioned channels.

A recovery port valve stem 2680 dimensioned to fit within channels 2678 and 2679 is substantially cylindrical in shape and has portions that define a recovery port valve stem channel 2681 open at a distal end and closed at a proximal end relative to recovery port 2622. A radially disposed, recovery port valve stem bore 2682 is formed toward the proximal end so as to intersect valve stem channel 2681 and provide liquid communication between channel 2681 and recovery channel lumen 2677 via recovery port channels 2678 and 2679.

An outer surface of valve stem 2680 is formed with two segments having different diameters, the junction of which form an annular shoulder or barb-like ring. A recovery valve stem proximal segment 2683 that defines at least a part of the proximal end terminus for channel 2681 has a cross-sectional diameter dimensioned to fit within the inner recovery port channel 2679. A recovery valve stem distal segment 2684 has a cross-sectional diameter dimensioned to fit within outer recovery port channel 2678. The transition between the two valve stem surfaces may form a defined annular shoulder, or may be an annular sloped surface from a substantially smooth transition between the two differently sized valve stem surfaces. A distal tip of valve stem 2680 may be formed with a barbed feature or other end modification to receive tubes, connectors, quick connects and the like.

Proximal segment 2683 has a recovery valve stem first annular channel 2685 formed thereon and dimensioned to receive a first recovery valve O-ring 2686. Distal segment 2684 has a recovery valve stem second annular channel 2687a formed thereon and dimensioned to receive a second recovery valve O-ring 2687. An outer surface of first valve O-ring 2686 registers against the inner wall of inner recovery port channel 2679 to form a substantially liquid-tight seal. An outer surface of second valve O-Ring 2687 registers against an inner wall of outer recovery port channel 2678 to form a substantially liquid-tight seal. It should be understood that the seals formed by these O-rings are meant to be sliding seals in that the valve stem can freely move within recovery port 2622 along a longitudinal axis of the recovery port. Valve stem 2680 motion is restricted by an adjustable recovery port valve cap 2688 disclosed in detail below.

In a closed position, first valve O-Ring 2686 registers against the wall of recovery port channel 2679 to form a liquid-tight seal and prevent fluid and/or gas from entering or exiting the recovery port. In an open position, first valve O-ring 2688 is positioned away from recovery port channel 2679 (in a distal direction) so as to create a fluid path from channel 2677 (shown in FIG. 46), to inner recovery port channel 2679 to the larger outer recovery port channel 2678 in through radial recovery port valve stem bore 2682 then into valve stem channel 2681 and out (or into) the filter assembly depending upon the direction of flow. Radial bore 2682 is positioned on the valve stem at a point or location between the two O-rings so that when the valve stem is moved into any position within its range of travel, liquids cannot escape between the interface of recovery port 2622*a* and valve stem 2680.

As shown in FIGS. 59-62, adjustable recovery port valve cap 2688 has an inner wall that defines a valve cap channel 2689. The wall is formed with a helically oriented slot 2688*a* dimensioned to receive pin 2688*b* that projects into the slot from external surface of recovery port 2622*a*. The slot may be formed with an enlarged distal end 2688*c* to provide a releasable locking edge that pin 2688*b* registers against when the port is in a closed condition. This helps prevent unwanted opening of the valve without the deliberate use of force to open the valve. The length of axial travel of valve stem 2680 within recovery port 2622*a* is determined by the length of slot 2688*a* with the ends of the slot functioning as stops that limit the length of axial travel. Opening and closing the valve is performed by rotating cap 2688 about an external surface of recovery port 2622*a* in either a clockwise, or counterclockwise direction.

The cross-sectional diameter of channel 2689 is dimensioned to permit cap 2688 to fit on, and rotate freely about, the external surface of recovery port 2622*a*. A distal end defines an annular radially inwardly projecting ridge or lip 2690 with a cross-sectional diameter smaller than the cross-sectional diameter of valve cap channel 2689. An annular cap-receiving channel 2691 is formed on valve stem 2680 to receive ridge 2690. Alternatively, the channel may be formed by two substantially parallel recovery valve stem annular rings or walls 2692 formed on the outer surface of the valve stem and spaced to receive ridge 2690. Regardless whether the channel is formed below the outer surface of the valve stem or thereon, the cross-sectional diameter of cap-receiving channel 2691 is smaller than the cross-sectional diameter of ridge 2690 and the cross-sectional diameter of walls 2692 (or the cross-sectional diameter of the valve stem if the channel is formed below the outer surface of the valve stem) are greater than the cross-sectional diameter of ridge 2690.

This configuration traps the relative location of ridge 2690 and thus cap 2688 on valve stem 2680 so that rotation in either direction (clockwise, counterclockwise) of cap 2688 and its movement along the external surface of recovery port 2622*a* via the slot and pin configuration causes a corresponding axial movement of the valve stem to retreat from, or advance into, recovery port 2622*a* to open and close the valve, respectively. As should be understood in the art, angular orientation of the slot on the cap can be altered to cause valve closure by turning the cap in either direction. In one orientation, rotation of the cap clockwise will close the valve. In a second orientation, rotation of the cap in a counterclockwise direction will close the valve. Ridge 2690 freely rotates about valve stem 2680 and delivers axial force to the valve stem by registering against at least the leading channel wall in the direction the cap is moved along recovery port 2622*a*. This configuration permits manual or automated control of the bleed valve.

Referring again to FIGS. 41, 42, 46 and now also to FIGS. 47, 48, 53 and 54, upper end/upper end cap 2614 has further additional portions that define an axially extending upstream vent channel 2651 that defines a lumen in fluid communication with upstream volume 2634 and with a lumen of an upstream vent port 2624*a*. An exterior surface of upstream vent port 2624*a* is formed with a pin 2705 to receive, control and limit the movement range of an adjustable upstream vent cap 2652 as disclosed in more detail below. An internal surface of upstream vent port 2624*a* is formed with two differently dimensioned channels with a first outer vent channel 2653 having a cross-sectional diameter greater than the cross-sectional diameter of a second inner vent channel 2654. The junction of the two channels may take the form of a defined annular shoulder or an annular sloped surface that joins the two differently dimensioned channels.

An upstream vent port valve stem 2655 dimensioned to fit within vent channels 2653 and 2654 is substantially cylindrical in shape and has portions that define a vent port valve stem channel 2656 open at a distal end and closed at a proximal end relative to vent port 2624*a*. A radially disposed, vent port valve stem bore 2657 is formed toward the proximal end so as to intersect valve stem channel 2656 and provide liquid communication between channel 2656 and a lumen of vent port channel 2651 (shown in FIG. 46).

An outer surface of valve stem 2655 is formed with two segments having different diameters, the junction of which forms an annular shoulder or barb-like ring. A vent valve stem proximal segment 2658 that defines at least a part of the proximal end terminus for channel 2656 has a cross-sectional diameter dimensioned to fit within inner vent port channel 2654. A vent valve stem distal segment 2659 has a cross-sectional diameter dimensioned to fit within outer vent port channel 2653. The transition between the two valve stem surfaces may form a defined annular shoulder, or may be an annular sloped surface to from a substantially smooth transition between the two differently sized valve stem surfaces. A distal tip of vent valve stem 2655 may be formed with a barbed feature or other end modification to receive tubes, connectors, quick connects and the like.

Vent valve stem proximal segment 2658 has a vent valve stem first annular channel 2660 formed thereon and dimensioned to receive a first vent valve O-ring 2661. Vent valve stem distal segment 2659 has a vent valve stem second annular channel 2662 formed thereon and dimensioned to receive a second vent valve O-ring 2663. An outer surface of first valve O-ring 2661 registers against the inner wall of inner vent port channel 2654 to form a substantially liquid-tight seal. An outer surface of second valve O-Ring 2663 registers against an inner wall of outer vent port channel 2653 to form a substantially liquid-tight seal. It should be understood that the seals formed by these O-rings are meant to be sliding seals in that the valve stem can freely move within vent port 2624*a* along a longitudinal axis of the vent port. Vent valve stem 2655 motion within the vent port is restricted by adjustable vent port valve cap 2652 disclosed in detail below.

Figure 47:
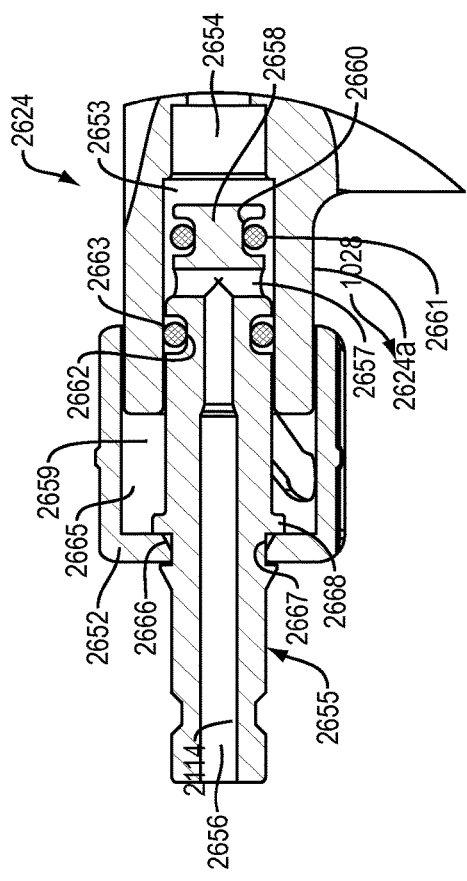
FIG. 47 is a side sectional view of the vent port bleed valve of the liquid recovery assembly shown in FIGS. 41 and 42 in an open position.
Figure 48:
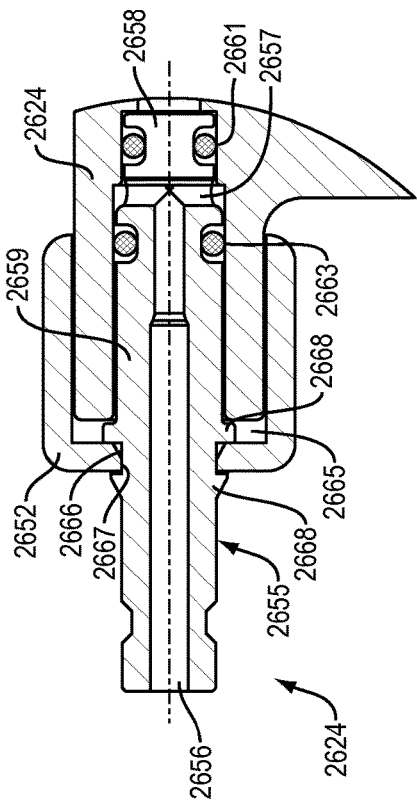
FIG. 48 is a side sectional view of the vent port bleed valve shown in FIG. 47 in a closed position.

In a closed condition as shown in FIG. 47, first valve O-ring 2661 registers against the wall of inner vent port channel 2654 to form a liquid-tight seal and prevent fluid and/or gas from entering or exiting the vent port. In an open condition, first valve O-ring 2661 is away from vent port channel 2654 (in a distal direction) so as to create a fluid path from vent channel 2651 to inner vent port channel 2654 to the larger outer vent port channel 2653 in through radial vent port valve stem bore 2657 then into valve channel 2656 and out (or into) the filter assembly depending upon the direction of flow. It should be noted that radial bore 2657 is positioned between the two O-rings so that in any valve stem position, liquids cannot escape between the interface of vent port 2624*a* and vent port valve stem 2655.

Adjustable upstream vent port valve cap 2652 has an inner wall that defines a valve cap channel 2665. The wall is formed with a helically oriented slot 2704 dimensioned to receive pin 2705 that projects into the slot from the external surface of vent port 2624*a*. The slot may be formed with an enlarged distal end 2706 to provide a releasable locking edge that pin 2705 registers against when the port is in a closed condition. This helps prevent unwanted opening of the valve without the deliberate use of force to open the valve. The length of axial travel of valve stem 2673 within vent port 2624a is determined by the length of slot 2704 with the ends of the slot functioning as stops that limit the length of axial travel. Opening and closing the valve is performed by rotating cap 2652 about the external surface of vent port 2624a in either a clockwise, or counterclockwise direction.

The cross-sectional diameter of channel 2665 is dimensioned to permit cap 2652 to fit on, and rotate freely about, the external surface of vent port 2624a. A distal end defines an annular radially inwardly projecting ridge or lip 2666 with a cross-sectional diameter smaller than the cross-sectional diameter of valve cap channel 2665. An annular cap-receiving channel 2667 is formed on valve stem 2655 to receive ridge 2666. Alternatively, the channel may be formed by two substantially parallel annular vent valve stem rings or walls 2668 formed on the outer surface of the valve stem and spaced to receive ridge 2666. Regardless whether the channel is formed below the outer surface of the valve stem or thereon, the cross-sectional diameter of cap-receiving channel 2667 is smaller than the cross-sectional diameter of ridge 2666 and the cross-sectional diameter of walls 2668 (or the cross-sectional diameter of the valve stem if the channel is formed below the outer surface of the valve stem) are greater than the cross-sectional diameter of ridge 2666.

This configuration traps the relative location of ridge 2666 and thus cap 2652 on valve stem 2655 so that rotation in either direction (clockwise, counterclockwise) of cap 2652 and its movement along the external surface of vent port 2624a via the slot and pin configuration causes a corresponding axial movement of the valve stem to retreat from, or advance into, vent port 2624a to open and close the valve, respectively. Ridge 2666 freely rotates about valve stem 2655 and delivers axial force to the valve stem by registering against at least the leading channel wall in the direction the cap is moved along the external surface of vent port 2624a. This configuration permits manual or automated control of the vent port bleed valve.

Figure 55:
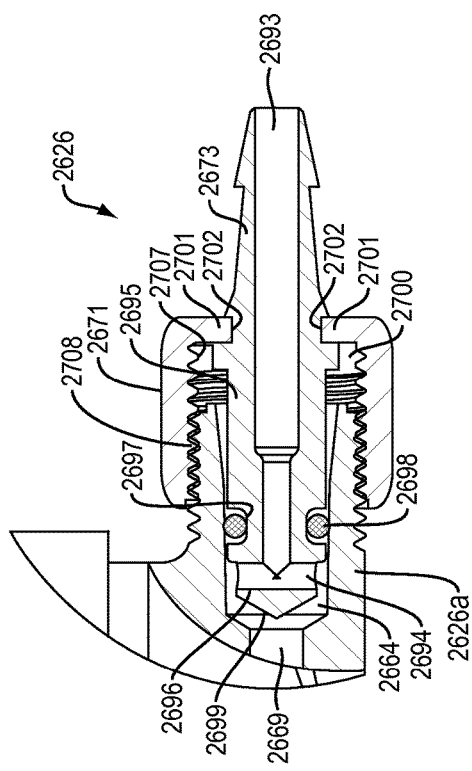
FIG. 55 is a side sectional view of a drain port valve subassembly in an open position according to the embodiment of the disclosure shown in FIGS. 41 and 42.
Figure 56:
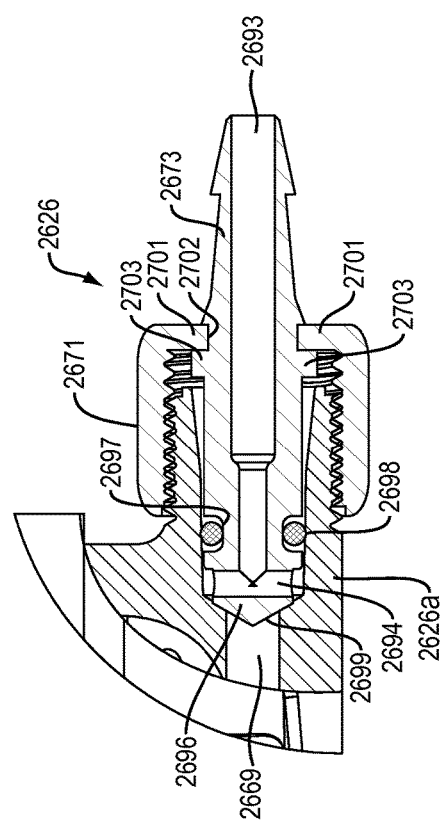
FIG. 56 is a side sectional view of the drain port valve subassembly shown in FIG. 55 with the valve in a closed position.

Referring again to FIGS. 41, 42, 46 and now also to FIGS. 55 and 56, lower end/lower end cap 2616 has portions that define a radially extending upstream drain channel 2669 that defines a lumen in fluid communication with upstream volume 2634 and with a lumen or channel 2664 of upstream drain port 2626a. Channel 2664 may have a slight conical shape or tapered shape in cross-section with the larger end of the taper extending toward the distal end of the drain port as shown in FIGS. 55 and 56. This configuration permits increased fluid flow through the port with increased opening of the port. An exterior surface of upstream drain port 2626a is formed with threading 2708 to receive an adjustable upstream drain cap 2671 as disclosed in more detail below. The cross-sectional diameter of the drain port channel 2664 is greater than the cross-sectional diameter of drain channel 2669.

An upstream drain port valve stem 2673 dimensioned to fit within drain port channel 2664 is substantially cylindrical in shape and has portions that define a drain port valve stem channel 2693 open at a distal end and closed at a proximal end relative to drain port 2626a. A radially disposed, drain port valve stem bore 2694 is formed toward a proximal end of channel 2693 so as to intersect channel 2693 and provide fluid communication between channel 2693 and drain channel 2669 via drain port channel 2664. An outer surface of valve stem 2673 is formed with two segments having different diameters, the junction of which creates an annular shoulder or barb-like ring. A drain valve stem proximal segment 2695 has a cross-sectional diameter dimensioned to be smaller than the cross-sectional diameter of drain port channel 2664 so as to form an annular gap between the surfaces. A drain valve stem distal segment 2696 that defines at least a part of the proximal end terminus for channel 2693 has a cross-sectional diameter dimensioned to fit more snugly within the drain port channel (at the smallest diameter of the taper), so as to form a smaller annular gap relative to the gap formed by proximal segment 2695 and channel 2664. The transition between the two valve stem surfaces may form a defined annular shoulder, or may be an annular sloped surface to from a substantially smooth transition between the two differently sized valve stem surfaces.

A proximal tip 2699 of drain port valve stem 2673 is conical in shape and functions like a needle valve. Movement of valve stem 2673 toward channel 2669 causes an extreme proximal end of conical tip 2699 to enter into channel 2669 until the conical surface registers against the annular leading edge of the channel (that functions as a valve seat) so as to occlude the channel lumen and prevent any egress or ingress of liquids and/or gases out of, or into, the filter assembly. An opposite distal tip of drain port valve stem 2673 may be formed with a barbed feature or other end modification to receive tubes, connectors, quick connects and the like.

Drain valve stem distal segment 2696 has a drain valve stem annular channel 2697 formed thereon and dimensioned to receive a drain valve O-ring 2698. An outer surface of drain valve O-ring 2698 registers against the lumen wall of the drain port channel to form a substantially liquid-tight seal. It should be understood that the seal formed by this O-ring is meant to be a sliding seal in that the valve stem can freely move within drain port 2626a along a longitudinal axis of the drain port without compromising the seal function of the O-ring. Drain valve stem 2673 motion within the port is restricted by adjustable drain port valve cap 2671 disclosed in detail below.

As stated, in a closed condition as shown in FIG. 56, conical tip 2699 registers against the annular leading edge of drain channel 2669 to form a liquid-tight seal and prevent fluid and/or gas from entering or exiting the drain port. In an open condition as shown in FIG. 55, conical tip 2699 is away from drain channel leading edge (in a distal direction) so as to create a fluid path from drain channel 2669 to drain port channel 2664 through radial drain port valve stem bore 2694 then into drain valve stem channel 2693 and out (or into) the filter assembly depending upon the direction of flow. It should be noted that radial bore 2694 is positioned proximal to the filter assembly relative to O-ring 2698 so that in any position, liquids cannot escape from the filter assembly between the interface of drain port 2624a and drain port valve stem 2673.

Adjustable upstream drain port valve cap 2671 has an inner wall that defines a drain valve cap channel 2700. The inner wall is formed with threading 2707 to mate with threading 2708 of drain port 2626a. The cross-sectional diameter of channel 2700 is dimensioned to permit cap 2671 to fit on, and rotate freely about, drain port 2626a. A distal end defines an annular radially inwardly projecting ridge or lip 2701 with a cross-sectional diameter smaller than the cross-sectional diameter of valve cap channel 2700. An annular cap-receiving channel 2702 is formed on valve stem 2673 to receive ridge 2701. Alternatively, the channel may be formed by two substantially parallel annular drain valve stem rings or walls 2703 formed on the outer surface of the valve stem and spaced to receive ridge 2701. Regardless whether the channel is formed below the outer surface of the valve stem or thereon, the cross-sectional diameter of cap-receiving channel 2702 is smaller than the cross-sectional diameter of ridge 2701 and the cross-sectional diameter of walls 2703 (or the cross-sectional diameter of the valve stem if the channel is formed below the outer surface of the valve stem) are greater than the cross-sectional diameter of ridge 2701.

This configuration traps the relative location of ridge 2701 and thus cap 2671 on valve stem 2673 so that rotation in either direction (clockwise, counterclockwise) of cap 2671 and its movement along drain port 2626*a* via the mated threading causes a corresponding movement of the valve stem to retreat from, or advance into, drain port 2626*a* to open and close the valve, respectively. Ridge 2701 freely rotates about valve stem 2673 and delivers axial force to the valve stem by registering against at least the leading channel wall in the direction the cap is moved along drain port 2626*a*. This configuration permits manual or automated control of the vent port bleed valve.

Figure 50:
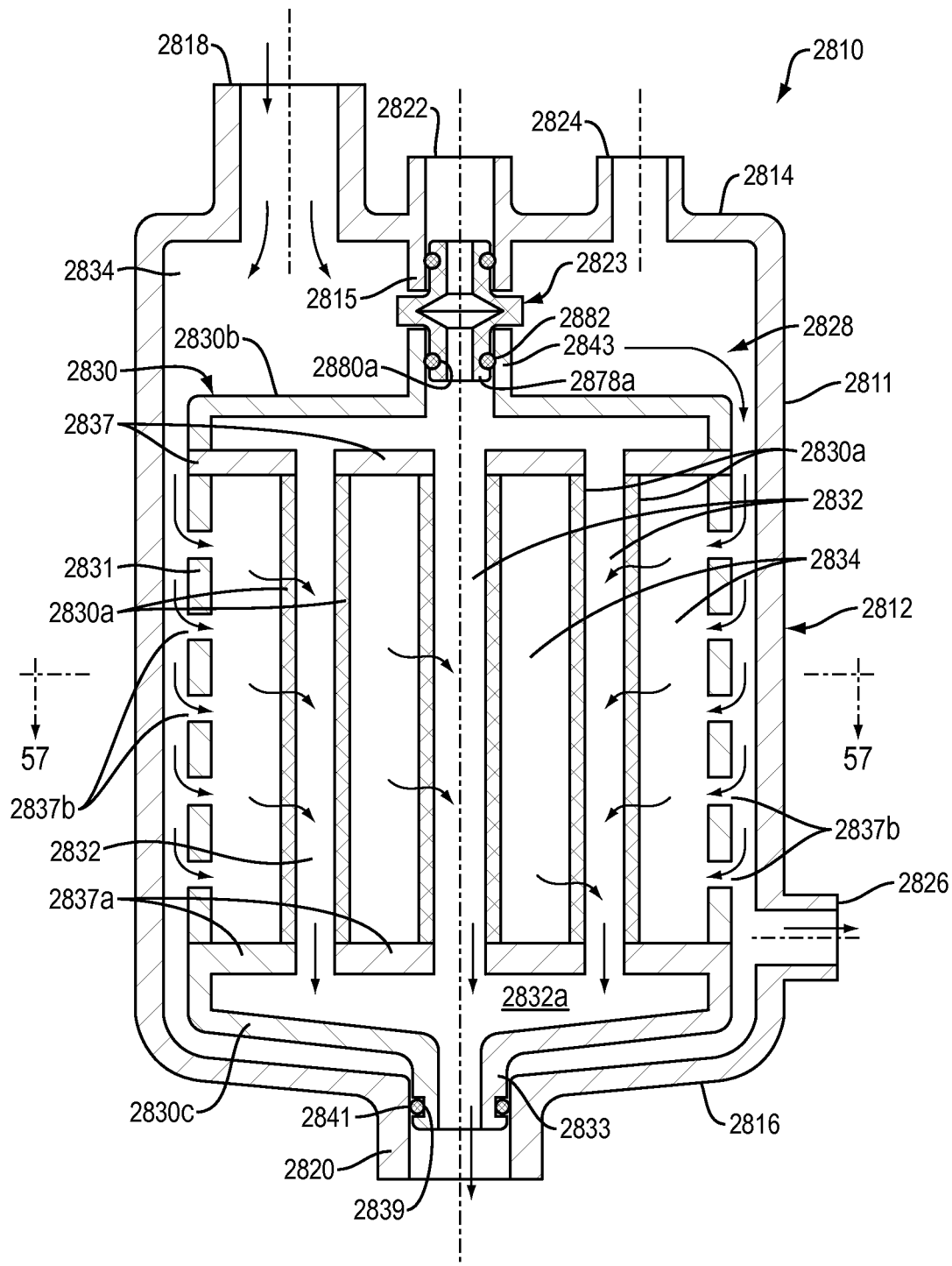
FIG. 50 is a side sectional view of a filter assembly with an enclosed recovery filter subassembly and a processing filter secured in the housing via O-ring attachment according to an embodiment of the disclosure.
Figure 57:
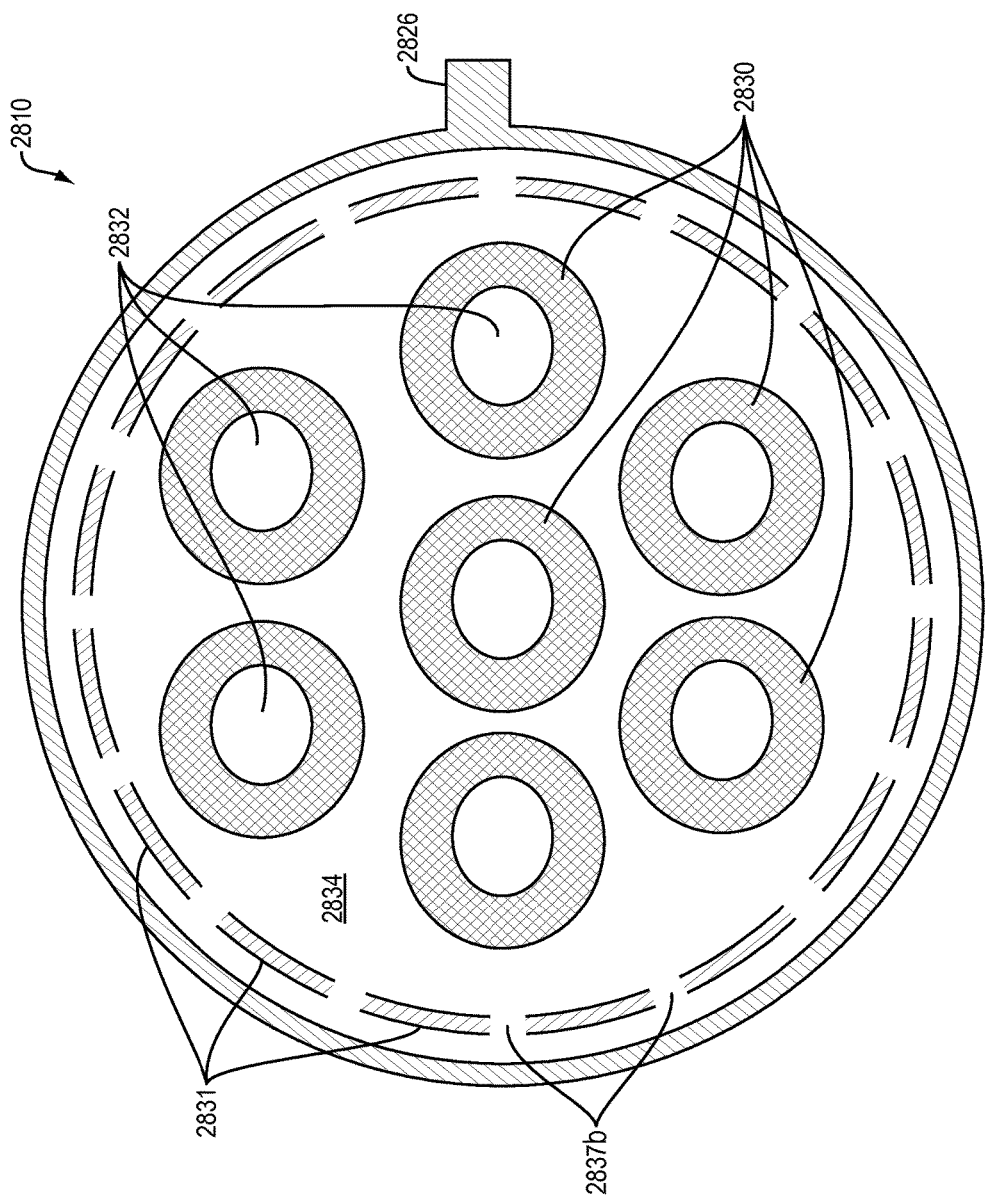
FIG. 57 is a top view of a cross-section of the bottom half of the filter assembly shown in FIG. 50.

Alternative constructions to secure the filter element to the filter assembly housing are shown in FIGS. 50-52, 57 and 58. As shown in FIGS. 50 and 57, a liquid recovery filter assembly shown designated generally as 2810 includes features corresponding to most of the features shown and disclosed for the other previously disclosed embodiments.

Filter assembly 2810 includes a housing or shell 2811 constructed from a shell wall 2812, upper end/end cap 2814, lower end/end cap 2816, the combination of which define an internal volume designated generally as 2828. The filter assembly has ports corresponding to the ports of the other disclosed filter assembly embodiments: an inlet port 2818, an outlet port 2820, a recovery port 2822, a vent port 2824, an upstream drain port 2826, and encloses a corresponding filter element designated generally as 2830 constructed in this embodiment as a filter cartridge that encloses a plurality of hollow fibers 2830*a*. An upstream volume 2834 is defined by filter housing 2811 and the collective upstream designated surfaces of hollow fibers 2830*a*. Hollow fibers 2830*a* each define a downstream core 2832. Cores 2832 are in fluid communication with a downstream collection space 2832*a* defined by a filter element lower end cap 2830*c* and a hollow fiber lower end cap 2837*a* disclosed in more detail below. Space 2832*a* is in fluid communication with outlet port 2820.

More specifically, filter cartridge 2830 includes a cage wall 2831 with openings 2837*b*, a cartridge upper end cap designated generally as 2830*b* and lower end cap 2830*c*. The end caps may be formed from the same material used for the cage wall (as well as for the filter assembly housing). A hollow fiber upper end cap 2837 and a hollow fiber lower end cap 2837*a* may be formed as potting layers constructed from a urethane or epoxy adhesive or like material with a series of openings to permit fluid communication with the downstream cores of the individual hollow fibers. Alternatively, a hollow fiber upper end cap 2837 and a hollow fiber lower end cap 2837*a* may also be formed from thermal plastic materials by thermally melting and potting the materials to the hollow fibers. This method is particularly advantageous for hollow fiber materials that are notably hard to adhere with adhesives, e.g., PTFE, PFA/MFA, PVDF and HDPE as disclosed in more detail herein.

Filter cartridge 2831 is secured to housing designated generally as 2811 via features formed on the upper and lower cartridge ends/end caps. An upper cartridge sleeve 2843 extends upwardly from upper cartridge end cap 2830*b* and is dimensioned to receive a lower post 2878*a* of a recovery filter assembly 2823 similar to the post/sleeve combination shown in FIG. 49. An annular (or other shape) recovery filter lower post channel 2880*a* is formed on lower post 2878*a*. A cartridge upper end O-ring 2882 is positioned between the sleeve and post and is secured in lower post channel 2880*a* in similar fashion to the sleeve and post configuration disclosed for recovery filter assembly 2623 shown in FIGS. 46 and 49. The upper end of recovery filter assembly 2823 is secured to upper end/end cap 2814 in the same manner and with the same options as disclosed for recovery filter assembly 2623 shown in FIGS. 46 and 49.

A lower cartridge post 2833 is dimensioned to fit within outlet port 2820 and defines a lumen in fluid communication with outlet port 2820 and downstream collection space 2832*a*. An annular O-ring channel 2839 is formed in the outer wall of post 2833 to receive and secure a cartridge lower end O-ring 2841 used to seal the registered surfaces. Alternatively, lower cartridge post 2833 may be secured to outlet port 2820 via thermal or sonic bonding, adhesives, combinations of the bonding methods and the like. These alternative bonding methods eliminate the need for O-ring 2841 and any features specific to any embodiment using an O-ring to create a seal between the lower cartridge post and the outlet port.

The components of filter assembly 2810 are constructed from the same materials disclosed for the other disclosed embodiments. Filter assembly 2810 is operated in the same manner as disclosed for filter assembly 210 as well as the other disclosed embodiments. The operation procedures disclosed for filter assembly 210 are incorporated here with respect to filter assembly 2810. By way of illustration, and not by way of limitation, the hollow fiber material may be constructed from materials selected from the group consisting of polyethersulfone (PES), polysulfone (PS), Nylon 6, Nylon 66, regenerated cellulose, mixed esters of cellulose, polycarbonate, polyester, polyacrylonitrile (PAN), polyimide, polyamide, and mixtures thereof. The hollow fiber material may also be constructed from materials selected from the group consisting of virgin or surface modified expanded Polytetrafluoro-ethylene (Teflon® PTFE) with or without lamination, phase inversion formed polyvinylidene fluoride (PVDF), perfluoroalkoxy (PFA) and its derivatives, Ethylene-clorotrifluoroethylene copolymer (ECTFE), polypropylene (PP), high density polyethylene (HDPE), ultra high molecular weight polyethylene (UHMWPE or UPE) and mixtures thereof. Inorganic materials that may be used include ceramics including alumina, zirconia and sintered stainless steel. The inner and outer diameters of the hollow fibers can vary widely as is well known and available in the art, depending upon the specific filtration applications, and can range from about 100 microns to millimeters. It should be understood that other filter materials disclosed herein and/or well known in the art may be substituted for the hollow fiber filter material and remain within the scope of the disclosure.

Figure 51:
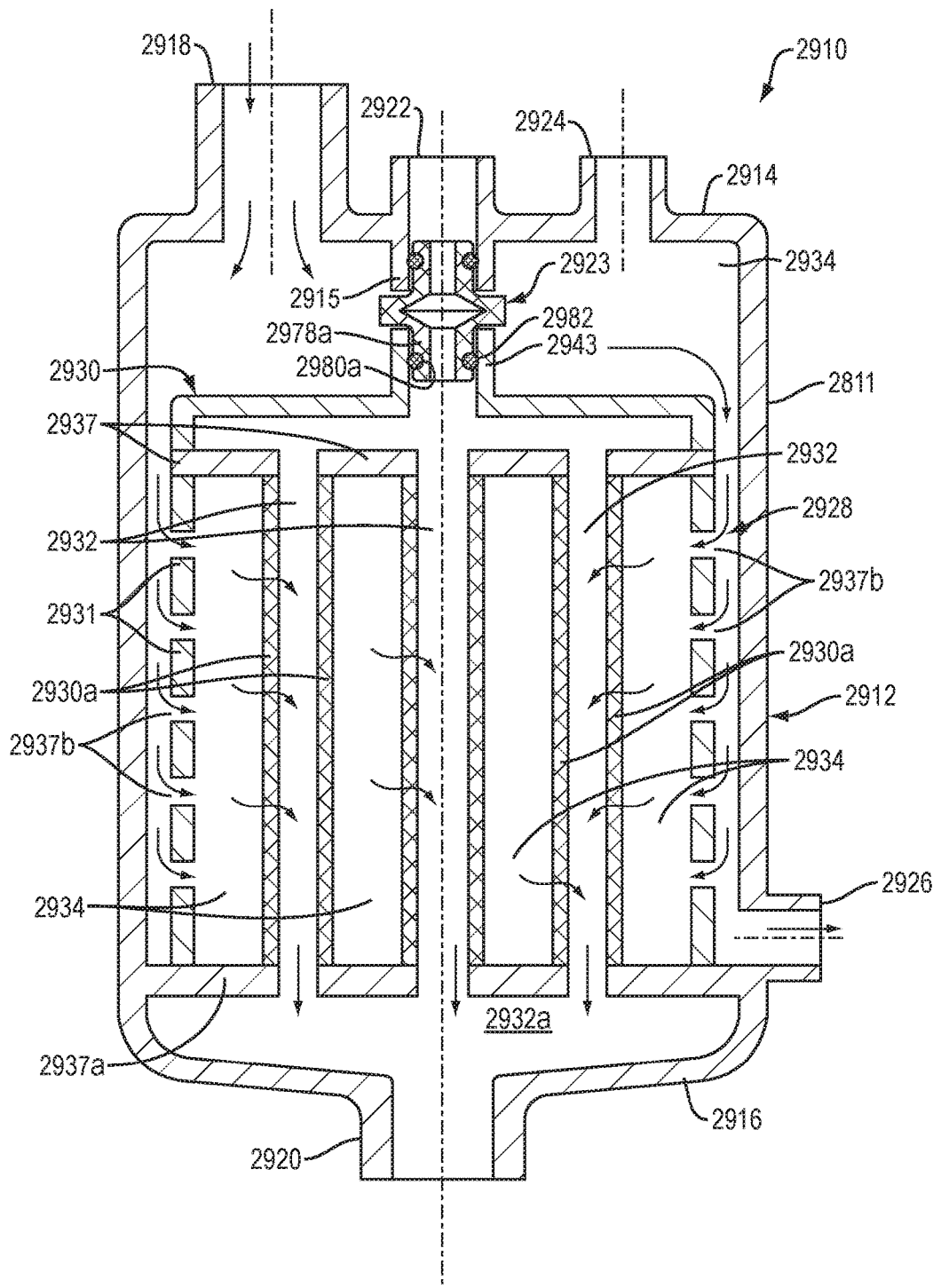
FIG. 51 is a side sectional view of a filter assembly with an enclosed recovery filter subassembly and a processing filter permanently secured to the filter assembly housing according to another embodiment of the disclosure.

Referring now to FIG. 51, in another aspect of the disclosure, another alternative configuration to secure a filter element in the form of a filter cartridge in a filter housing is shown. A liquid recovery filter assembly shown designated generally as 2910 includes features corresponding to most of the features shown and disclosed for the other previously disclosed embodiments.

The features of filter assembly 2910 that correspond to the features of the other disclosed embodiments include a housing or shell designated generally as 2911 constructed from a shell wall 2912, an upper end/end cap 2914, a lower end/end cap 2916, the combination of which define an internal volume designated generally as 2928. The filter assembly has ports corresponding to the ports of the other disclosed embodiments: an inlet port 2918, an outlet port 2920, a recovery port 2922, a vent port 2924, an upstream drain port 2926, and encloses a corresponding filter element designated generally as 2930 constructed in this embodiment as a filter cartridge that encloses a plurality of hollow fibers 2930*a*. An upstream volume 2934 is defined by filter housing 2911 and the collective upstream designated surfaces of hollow fibers 2930*a*. Hollow fibers 2930*a* each define a downstream core 2932. Cores 2932 are in fluid communication with a downstream collection space 2932*a* defined by a filter element lower end cap 2937*a* and lower end/end cap 2916. Space 2932*a* is in fluid communication with outlet port 2920.

More specifically, filter cartridge 2930 includes a cage wall 2931 with openings 2937*b*, a cartridge upper end/end cap 2930*b* and lower end/end cap 2937*a*. The end caps may be formed from the same material used for the cage wall (as well as for the filter assembly housing). A hollow fiber upper end cap 2937 and lower end cap 2937*a* may be formed as potting layers constructed from a urethane adhesive or like material with a series of openings to permit fluid communication with the downstream cores of the individual hollow fibers.

Filter cartridge 2931 is secured to housing 2911 via features formed on the upper and the lower cartridge ends/end caps. The upper end of filter cartridge 2931 is secured to a recovery filter assembly 2923 with the same construction and in the same manner as disclosed for filter cartridge 2831. The disclosure with respect to the attachment of the upper end of filter cartridge 2831 and any disclosed alternatives is incorporated here with respect to attachment of the upper end of filter cartridge 2931. The components of filter assembly 2910 that correspond to the components of filter assembly 2810 are identified by substituting a "9" for the second digit "8" with respect to the reference characters used to call out the components of filter assembly 2810.

The lower end of filter cartridge 2930 is secured to housing 2911 by thermally bonding a lower end/end cap 2937*a* to shell wall 2912. The end caps may also be bonded to the shell wall via sonic welding, adhesive and the like. The end caps may be formed from the same materials used for the cage wall (as well as for the filter assembly housing). Alternatively, a hollow fiber upper end cap 2937 and lower end cap 2937*a* may be formed as potting layers constructed from a urethane adhesive or like material with a series of openings to permit fluid communication with the downstream cores of the individual hollow fibers.

The components of filter assembly 2910 are constructed from the same materials disclosed for the other disclosed embodiments. Filter assembly 2910 is operated in the same manner as disclosed for filter assembly 210 as well as the other disclosed embodiments. The operation procedures disclosed for filter assembly 210 are incorporated here with respect to filter assembly 2910.

Figure 52:
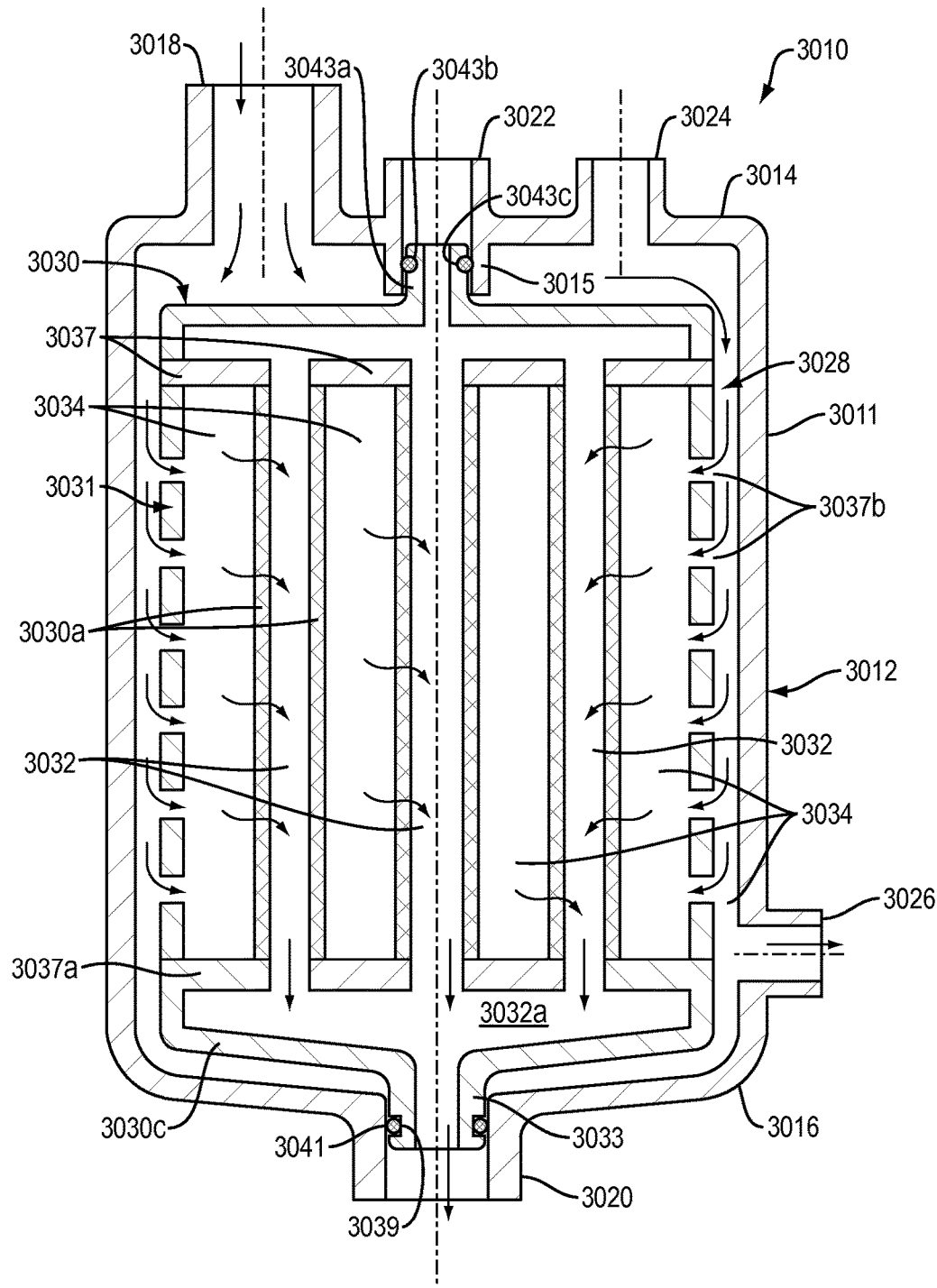
FIG. 52 is a side sectional view of a filter assembly with a processing filter secured in the housing with O-rings according to a further embodiment of the disclosure.
Figure 54:
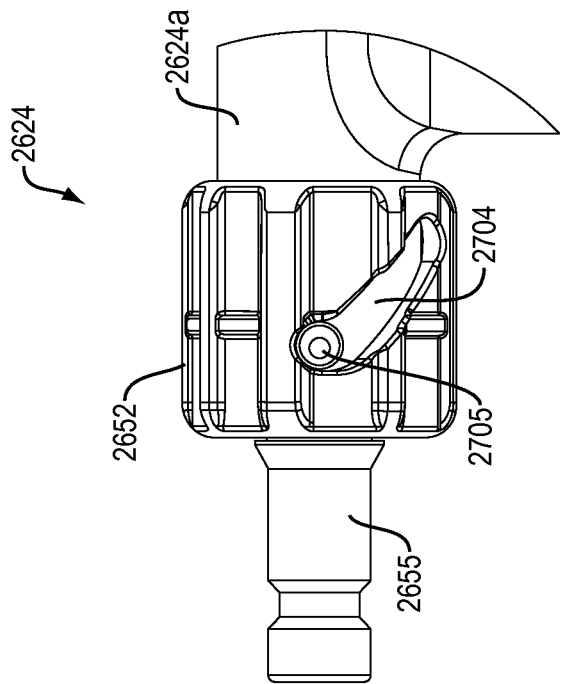
FIG. 54 is a side view of the vent port valve subassembly shown in FIG. 53 with the valve in a closed position.
Figure 53:
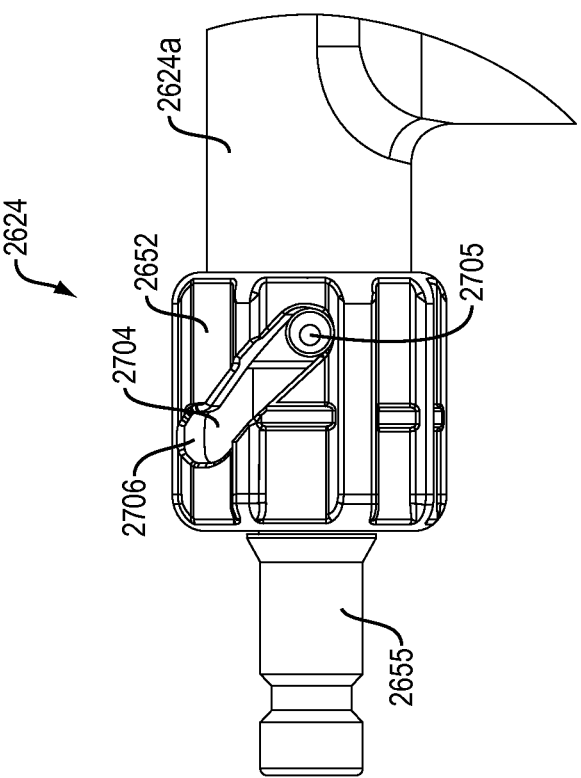
FIG. 53 is a side view of a vent port valve subassembly in an open position according to the embodiment of the disclosure shown in FIGS. 41 and 42.

Referring now to FIG. 52, in another aspect of the disclosure, a further alternative configuration to secure a filter element in the form of a filter cartridge in a filter housing is shown. A liquid recovery filter assembly shown designated generally as 3010 includes features corresponding to most of the features shown and disclosed for the other previously disclosed embodiments with the noted exception of the absence of a recovery filter. It should be understood a recovery filter will be attached to whichever port is designated as a recovery port so as to perform the intended liquid recovery function of the disclosure.

The filter assembly features corresponding to the features of the other disclosed embodiments includes a housing or shell designated generally as 3011 constructed from a shell wall 3012, an upper end/end cap 3014, a lower end/end cap 3016, the combination of which define an internal volume designated generally as 3028. The filter assembly has ports corresponding to the ports of the other disclosed embodiments: an inlet port 3018, an outlet port 3020, a recovery port 3022, a vent port 3024, an upstream drain port 3026, and encloses a corresponding filter element 3030 in the form of a filter cartridge constructed with a plurality of hollow fibers or tubular membranes 3030*a*. Filter assembly 3010 differs from filter assemblies 2810 and 2910 with respect to the means used to secure the filter element in the housing.

Filter cartridge 3030 includes a cage wall 3031 with openings 3037*b*, a cartridge upper end/end cap 3030*b* and a cartridge lower end/end cap 3030*c*. An upstream volume 3034 is defined by filter housing 3011 and the collective upstream designated surfaces of hollow fibers 3030*a*. Hollow fibers 3030*a* each define a downstream core 3032. Cores 3032 are in fluid communication with a downstream collection space 3032*a* defined by filter element lower end cap 3030*c* and a hollow fiber lower end cap 3037*a* disclosed in more detail below. Space 3032*a* is in fluid communication with outlet port 3020.

The cage and end caps may be formed from the same materials disclosed for the components of the other disclosed filter assembly embodiments. The hollow fibers (described in detail with respect to filter assembly 2810) may have additional end caps to secure the hollow fibers in cartridge 3030. A hollow fiber upper end cap 3037 and a hollow fiber lower end cap 3037*a* may be formed as potting layers constructed from a urethane adhesive or like material with a series of openings to permit fluid communication with the downstream cores of the individual hollow fibers.

Filter cartridge 3031 is secured to housing 3011 via features formed on the upper and lower cartridge ends/end caps. To secure the upper end of the cartridge, a cartridge upper post 3043*a* extends upwardly from cartridge upper end cap 3030*b* and is dimensioned to fit within a housing upper end/end cap sleeve 3015. A cartridge upper end O-ring 3043*b* positioned therebetween is secured in an annular (or other shape) upper post channel 3043*c* formed in the outer wall of post 3043*a* in similar fashion to the sleeve and post configuration disclosed for recovery filter 2623 shown in FIG. 46. Like the embodiment shown in FIG. 46, the post and sleeve configuration can be reversed with the sleeve formed on the cartridge and the post extending downwardly from the housing upper end/end cap.

To secure the lower end of the cartridge, a cartridge lower post 3033 extends downwardly from cartridge lower end cap 3030*c* and is dimensioned to fit within outlet port 3020. Post 3033 defines a lumen in fluid communication with port 3020 and downstream collection space 3032*a*. An annular (or other shape) O-ring channel 3039 is formed in the outer wall of post 3033 to receive and secure a cartridge lower end O-ring 3041 used to seal the registered surfaces.

The components of filter assembly 3010 are constructed from the same materials disclosed for the other disclosed embodiments. Filter assembly 3010 is operated in the same manner as disclosed for filter assembly 210 as well as the other disclosed embodiments. The operation procedures disclosed for filter assembly 210 are incorporated here with respect to filter assembly 3010.

Figure 58:
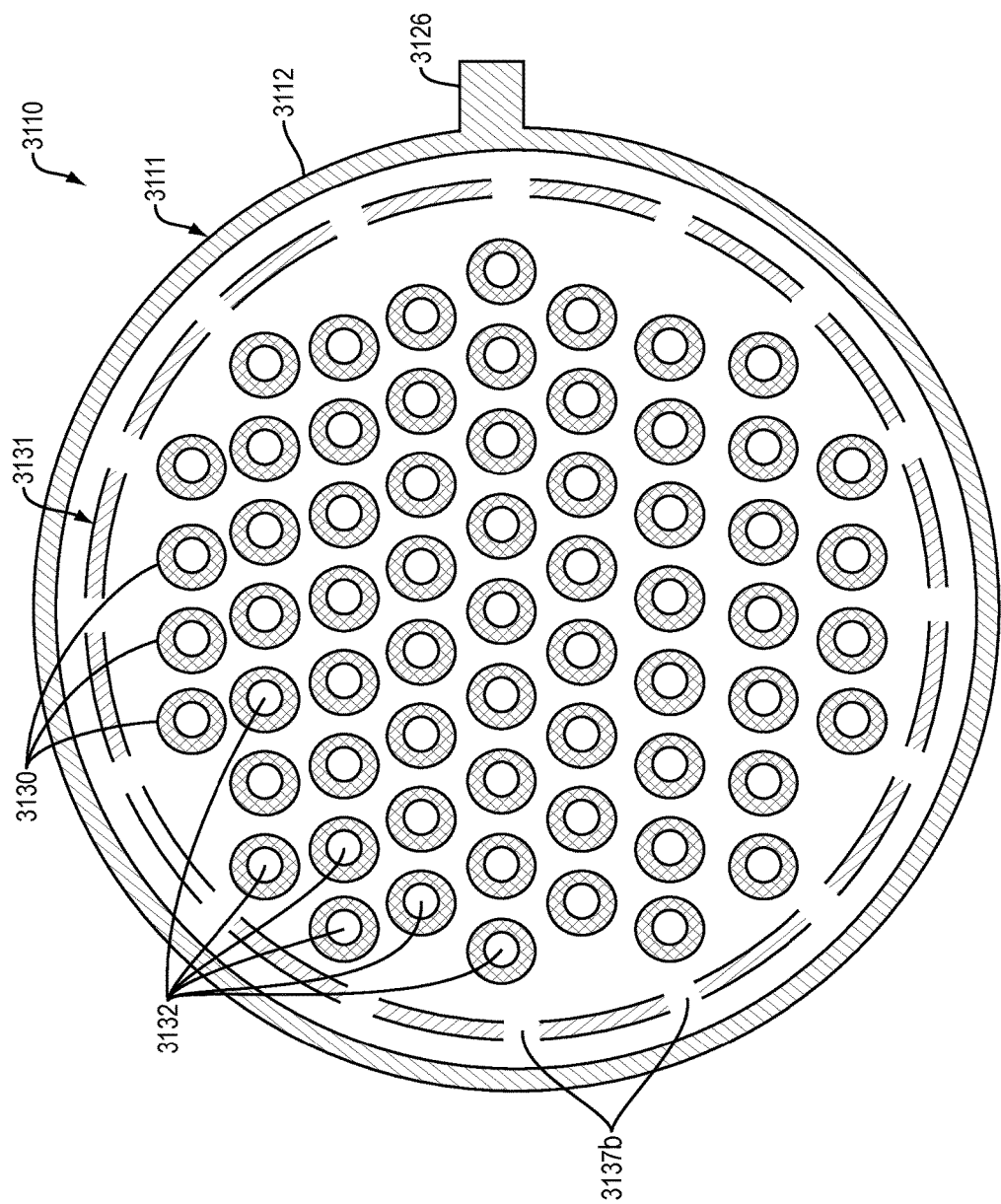
FIG. 58 is a top view of a cross-section of a filter assembly according to another embodiment of the disclosure.
Figure 59:
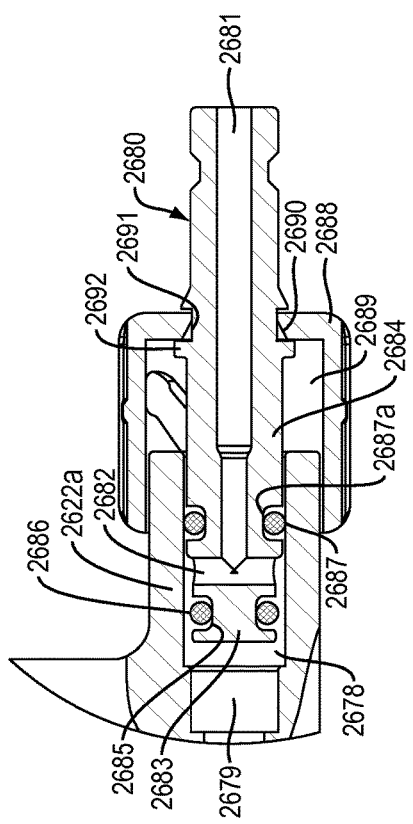
FIG. 59 is a side sectional view of the recovery port bleed valve of the liquid recovery assembly shown in FIGS. 41 and 42 in an open position.
Figure 60:
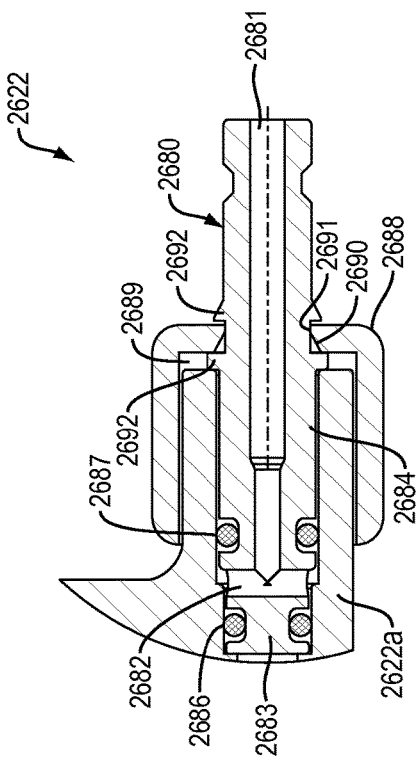
FIG. 60 is a side sectional view of the recovery port bleed valve shown in FIG. 59 in a closed position.
Figure 62:
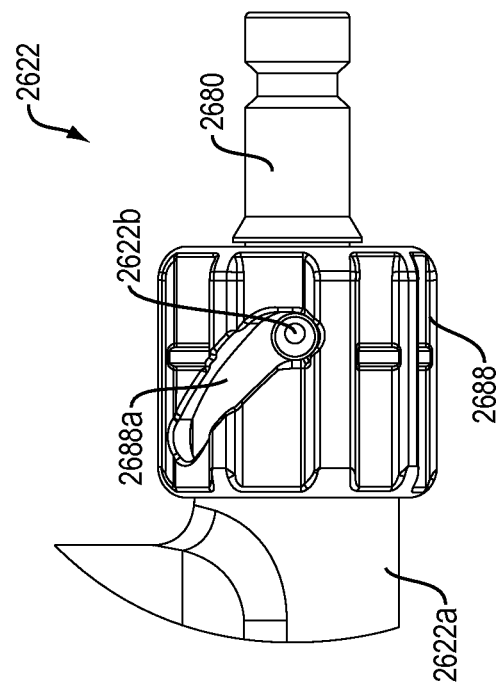
FIG. 62 is a side view of the recovery port valve subassembly shown in FIG. 61 with the valve in a closed position.
Figure 61:
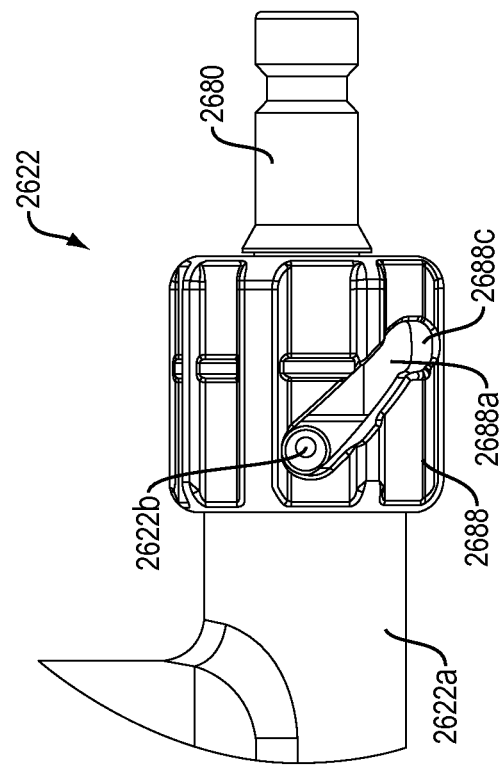
FIG. 61 is a side view of a recovery port valve subassembly in an open position according to the embodiment of the disclosure shown in FIGS. 41 and 42.

Referring now to FIG. 58, another embodiment of filter assembly 2810 is shown. A filter assembly shown designated generally as 3110 has the same features disclosed for filter assembly 2810. The components of filter assembly 3110 that correspond to the components of filter assembly 2810 are identified by substituting a "30" for the first and second digits "28" with respect to the reference characters used to call out the components of filter assembly 2810. Filter assembly 3110 differs from filter assembly 2810 in the distribution and density of hollow fibers secured in the filter cartridges. Filter assembly 3110 has a greater density of hollow fibers than filter assembly 2810.

Referring now to FIGS. 43-45, in a further aspect of the disclosure, line clearing filter assemblies are shown designated generally as 2710 and include features to permit the recovery of filtered liquids in lines downstream of a filter assembly as well as liquids in other lines or processing equipment where it is necessary to prevent the contamination of the liquids contained therein. This can be used alone, or in combination with the recovery filter for the filter assembly to which the downstream line(s) is/are attached.

A recovery port 2742 is connected to, and extends from, process fluid pathway 2780. Recovery filter 2743 is secured in-line with recovery port 2742 and houses recovery filter material 2725. In the following description of the embodiments shown designated generally as 2710, the term "downstream" is used to refer to locations, components, fluids, etc. located on the same side of recovery filter material 2725 as process fluid pathway 2780 and the term "upstream" is used to refer to locations, components, fluids, etc. located on the opposite side of recovery filter material 2725 and process fluid pathway 2780.

Recovery filter 2743 and recovery filter material 2725 are designed and situated such that all fluid passing between the upstream and downstream side must pass through the recovery filter material 2725. Recovery filter material 2725 is chosen to have the appropriate properties as disclosed previously for recovery filter 223. Process line adaptors 2782 allow connection of the line clearing filter 2710 to tubing, processing equipment, filters, filter assemblies, or other assemblies and components commonly used to transfer and perform unit operations on fluids. The embodiments shown in FIGS. 43 through 45 all show barbed adapters 2782 for connecting to tubing; however, other adapter types such as threaded connections, sanitary fittings, quick connects, luer fittings, as well as any other method for attaching filters disclosed herein as well as any other method for attaching filters as is known in the art may be used.

The process line adaptors are chosen to allow each end of the line clearing filter to connect to the desired components as disclosed previously, and therefore, each adaptor does not have to be of the same type. Further, embodiments with more than two adapters are possible and are within the consideration and scope of this disclosure. Process fluid pathway 2780 is in liquid communication with process line adaptors 2782 and in fluid communication with recovery port 2742, such that the flow of fluids from one process line adaptor 2782 to a second process line adaptor as well as flow from any process line adaptor to the downstream portion of recovery port 2742 is unobstructed. Further, flow of fluids from process line adaptor 2782 to the upstream portion of recovery port 2742 is only possible for fluids that are capable of passage through recovery filter material 2725. Recovery port adapter 2720 allows for connection to recovery port 2742 in a similar manor to process line adaptor 2782 and may be a barbed fitting, threaded connection, sanitary fitting, quick connect, luer fitting, as well as any other method for attaching filters disclosed herein as well as any other method for attaching filters as is known in the art may be used.

Optional upstream valves 2786 as shown in FIGS. 44 and 45 are used to control the flow into or out of the recovery port 2742 and can be of any suitable type (e.g., needle, ball, etc.) disclosed herein or any suitable type known in the art. Optional valve 2788 as shown in FIG. 45 can be used to control the flow into or out of the recovery port 2742 and has the additional capability of protecting recovery filter 2723 from exposure to fluids contained in process fluid pathway 2780 or limiting exposure.

When installed onto tubing, processing equipment, filters, filter assemblies, or other assemblies and components, the line clearing filter assembly can be used to clear lines of liquids resident in these components by the application of pressurized gas at the upstream side of recovery port 2742. With optional valves 2786 and 2788 opened, if present, gas travels into the process fluid pathway 2780, and clears liquid in its path. The direction of the gas flow, once within the process fluid pathway 2780, can be controlled by way of valves, or can be allowed to flow freely dependent on the application.

When used downstream of a filter assembly, particularly those without the liquid recovery features disclosed herein, the flow will primarily be in the direction away from the filter assembly, clearing lines and components further downstream, as gas cannot flow through the filter's processing membrane. However, when appropriately positioned, the line clearing filter may be used to introduce gas into the outlet or downstream port of the filter assembly, displacing resident liquid therein, thus providing a means of recovering the potentially valuable liquid.

The use of optional valve 2788 is particularly beneficial where processing fluid contained within process fluid pathway 2780 can (due to high pressures or due to the surface tension and surface energies of the processing fluid and the recovery filter material respectively) wet-out the recovery filter material 2725. Allowing the recovery filter material 2725 to wet-out can block the flow of gases through the filter material 2725 thus reducing or impeding its ability to clear lines.

Accordingly, the various embodiments of the disclosed liquid recovery filter apparatus provide an effective means to recover costly liquids used in filtering operations particularly in the pharmaceutical as well as in other industries. It should be understood that the various axial and radial configurations of the various inlet and outlet passages or ports illustratively depicted in the drawings and disclosed herein are merely exemplary, and that various other arrangements of these ports or passages are within the contemplation and scope of the disclosure that provide a means for the drainage or removal of liquid from the filter housing or shell wall, and particularly for the drainage or removal of filtered liquid from the core of the filter.

The present disclosure is not limited to the embodiments disclosed herein, but encompasses any and all embodiments and equivalents thereof within the scope of the following claims.

What we claim as new and desire to secure by Letters Patent is:

1. A liquid recovery filter assembly comprising:
   a filter housing having an upper end, a lower end opposite the upper end, and an outer wall extending between the upper end and the lower end, the housing defining an internal volume;
   a filter element disposed within the filter housing, the filter element having an upstream designated side and a downstream designated side, wherein an upstream volume is defined by the filter housing and the upstream designated side of the filter element;

an inlet port extending from the filter housing, the inlet port communicating fluidly with the upstream volume;

an outlet port extending from the filter housing, wherein the outlet port is in fluid communication with the downstream designated side of the filter element;

a recovery port extending from the filter housing, wherein the recovery port is in fluid communication with the downstream side of the filter element;

a recovery filter assembly secured inside the filter housing wherein the recovery filter assembly defines a recovery filter assembly channel in fluid communication with the downstream side of the filter element and the recovery port, and wherein the recovery filter assembly is positioned between the filter element and the recovery port.

2. The liquid recovery filter assembly of claim 1 wherein the recovery filter assembly comprises a recovery filter housing that defines a recovery filter chamber, a recovery filter secured in the filter chamber, and portions defining a recovery filter assembly channel in fluid communication with the filter chamber, recovery filter, recovery port and the downstream side of the filter element.

3. The liquid recovery filter assembly of claim 2 wherein the filter assembly further comprises a hollow lower recovery filter assembly post extending downwardly from the recovery filter housing in fluid communication with the recovery filter assembly channel and the filter element downstream side, wherein the filter element comprises a filter cartridge having a cartridge wall, an upper cartridge end cap and a lower cartridge end cap both secured to the cartridge wall, wherein the combination of the cartridge wall and end caps define a cartridge chamber within which filter material is secured; wherein the upper cartridge end cap defines an upper cartridge sleeve extending upwardly from the end cap and dimensioned to receive the lower recovery filter assembly post secured in the sleeve.

4. The liquid recovery filter assembly of claim 3 wherein the lower recovery filter assembly post further comprises at least one lower O-ring channel formed on its exterior surface, and wherein the filter assembly further comprises at least one lower recovery filter assembly O-ring secured in the at least one lower O-ring channel, and wherein the at least one lower O-ring registers against an inner wall of the upper cartridge sleeve to create a substantially liquid-tight and gas-tight seal.

5. The liquid recovery filter assembly of claim 3 wherein the recovery filter assembly further comprises a hollow upper recovery filter assembly post extending upwardly from the recovery filter housing in fluid communication with the recovery filter assembly chamber and the recovery port and wherein the filter housing upper end defines an upper end sleeve dimensioned to receive the upper recovery filter end post secured in the upper end sleeve.

6. The liquid recovery filter assembly of claim 5 wherein the upper recovery filter assembly post further comprises at least one upper O-ring channel formed on its exterior surface, and wherein the filter assembly further comprises at least one upper recovery filter assembly O-ring secured in the upper O-ring channel, and wherein the at least one upper O-ring registers against an inner wall of the upper end sleeve to create a substantially liquid-tight and gas-tight seal.

7. The liquid recovery filter assembly of claim 3 wherein the lower cartridge end cap defines a hollow lower cartridge post extending downwardly from the lower end cap in fluid communication with the downstream side of the filter element and the outlet port, and wherein the filter housing lower end defines a lower end sleeve extending upwardly from the lower end and dimensioned to receive the lower cartridge post secured in the lower end sleeve.

8. The liquid recovery filter assembly of claim 7 wherein the lower cartridge post further comprises at least one lower cartridge post O-ring channel formed on its exterior surface, and wherein the filter assembly further comprises at least one lower cartridge post O-ring secured in the at least one lower cartridge post O-ring channel, and wherein the at least one lower cartridge post O-ring registers against an inner wall of the lower end sleeve to create a substantially liquid-tight and gas-tight seal.

9. The liquid recovery filter assembly of claim 3 wherein the lower cartridge end cap defines a hollow lower cartridge post extending downwardly from the lower end cap in fluid communication with the downstream side of the filter element and the outlet port, and wherein the lower cartridge post is secured within the outlet port.

10. The liquid recovery filter assembly of claim 9 wherein the lower cartridge post further comprises at least one lower cartridge post O-ring channel formed on its exterior surface, and wherein the filter assembly further comprises at least one lower cartridge post O-ring secured in the at least one lower cartridge post O-ring channel, and wherein the at least one lower cartridge post O-ring registers against an inner wall of the outlet port to create a substantially liquid-tight and gas-tight seal.

11. The liquid recovery filter assembly of claim 1 wherein the recovery port further comprises an adjustable recovery port bleed valve secured to the port, wherein the bleed valve comprises a recovery port bleed valve stem secured in the recovery port and a recovery port bleed valve cap secured to the recovery bleed valve stem and the recovery port.

12. The liquid recovery filter assembly of claim 11 wherein the recovery bleed valve stem defines a recovery bleed valve stem channel open at a distal end relative to the recovery port and closed axially at a proximal end relative to the recovery port, wherein the bleed valve further comprises a recovery valve stem radial bore formed in the valve stem in fluid communication with the valve stem channel and the recovery port.

13. The liquid recovery filter assembly of claim 12 wherein the recovery port defines a recovery port inner channel and a recovery port outer channel in fluid communication with the inner channel, wherein the inner channel has a cross-sectional diameter less than the cross-sectional diameter of the outer channel, wherein the junction of the two channels forms a shoulder or tapered surface, wherein the recovery bleed valve stem further comprises a first recovery valve stem O-ring channel formed between the radial bore and the valve stem proximal end, wherein the filter assembly further comprises a first recovery valve stem O-ring secured in the first recovery valve stem O-ring channel and dimensioned to register against the junction of the recovery port inner and outer channels when the recovery bleed valve is in a closed position.

14. The liquid recovery filter assembly of claim 13 wherein the recovery port valve stem further comprises a second recovery valve stem O-ring channel formed between the distal end of the valve stem and the radial bore, wherein the filter assembly further comprises a second recovery valve stem O-ring secured in the second recovery valve stem O-ring channel and dimensioned to register against the wall of the recovery port outer channel.

15. The liquid recovery filter assembly of claim 14 wherein the recovery port further comprises a pin extending radially outwardly from the recovery port, and wherein the recovery bleed valve cap defines a helical slot dimensioned to receive the pin, wherein ends of the slot define the range of travel of the recovery port valve stem.

16. The liquid recovery filter assembly of claim 15 wherein the recovery bleed valve cap further comprises a recovery cap annular radially inwardly projecting ridge at a distal end relative to the recovery port, and wherein the recovery port valve stem defines a recovery cap receiving channel on its exterior surface within which the ridge is positioned, wherein the cross-sectional diameter of an opening defined by the ridge is greater than the cross-sectional diameter of the recovery cap receiving channel and less than the cross-sectional diameter of the recovery port valve stem to permit the free rotation of the ridge within the channel.

17. The liquid recovery filter assembly of claim 1 further comprising an upstream vent port extending from the filter housing, wherein the upstream vent port is in fluid communication with the upstream volume.

18. The liquid recovery filter assembly of claim 17 wherein the recovery port further comprises an adjustable vent port bleed valve secured to the port, wherein the bleed valve comprises a vent port bleed valve stem secured in the vent port and a vent port bleed valve cap secured to the vent port bleed valve stem and the vent port.

19. The liquid recovery filter assembly of claim 18 wherein the vent port bleed valve stem defines a vent port bleed valve stem channel open at a distal end relative to the vent port and closed axially at a proximal end relative to the vent port, wherein the bleed valve further comprises a vent valve stem radial bore formed in the valve stem in fluid communication with the valve stem channel and the vent port.

20. The liquid recovery filter assembly of claim 19 wherein the vent port defines a vent port inner channel and a vent port outer channel in fluid communication with the inner channel, wherein the inner channel has a cross-sectional diameter less than the cross-sectional diameter of the outer channel, wherein the junction of the two channels forms a shoulder or tapered surface, wherein the vent bleed valve stem further comprises a first vent valve stem O-ring channel formed between the radial bore and the valve stem proximal end, wherein the filter assembly further comprises a first vent valve stem O-ring secured in the first vent valve stem O-ring channel and dimensioned to register against the junction of the vent port inner and outer channels when the vent bleed valve is in a closed position.

21. The liquid recovery filter assembly of claim 20 wherein the vent port valve stem further comprises a second vent valve stem O-ring channel formed between the distal end of the valve stem and the radial bore, wherein the filter assembly further comprises a second vent valve stem O-ring secured in the second vent valve stem O-ring channel and dimensioned to register against the wall of the vent port outer channel.

22. The liquid recovery filter assembly of claim 21 wherein the vent port further comprises a pin extending radially outwardly from the vent port, and wherein the vent bleed valve cap defines a helical slot dimensioned to receive the pin, wherein ends of the slot define the range of travel of the vent port valve stem.

23. The liquid recovery filter assembly of claim 22 wherein the vent bleed valve cap further comprises a vent cap annular radially inwardly projecting ridge at a distal end relative to the vent port, and wherein the vent port valve stem defines a vent cap receiving channel on its exterior surface within which the ridge is positioned, wherein the cross-sectional diameter of an opening defined by the ridge is greater than the cross-sectional diameter of the vent cap receiving channel and less than the cross-sectional diameter of the vent port valve stem to permit the free rotation of the ridge within the channel.

24. The liquid recovery filter assembly of claim 1 further comprising a drain port extending from the filter housing, wherein threading is formed, or disposed on an outer wall of the drain port and wherein the drain port is in fluid communication with the upstream volume.

25. The liquid recovery filter assembly of claim 24 wherein the drain port comprises a drain port bleed valve, wherein the drain port bleed valve comprises a drain port bleed valve stem secured in the drain port and a drain port bleed valve cap secured to an outer wall of the drain port and to the drain port valve stem.

26. The liquid recovery filter assembly of claim 25 wherein the drain port bleed valve stem defines a drain port bleed valve stem channel open at a distal end relative to the recovery port and closed axially at a proximal end relative to the drain port, wherein the proximal end has a conical shape and wherein the bleed valve further comprises a drain port valve stem radial bore formed in the valve stem in fluid communication with the valve stem channel and the drain port.

27. The liquid recovery filter assembly of claim 26 wherein the drain port defines a drain port inner channel and a drain port outer channel in fluid communication with the inner channel, wherein the inner channel has a cross-sectional diameter less than the cross-sectional diameter of the outer channel, wherein the junction of the two channels forms a shoulder or tapered surface valve seat, wherein the proximal end of the drain port valve stem registers against the valve seat when the drain port bleed valve is in a closed position.

28. The liquid recovery filter assembly of claim 27 wherein the drain port outer channel is tapered in cross-section wherein the taper increases in cross-sectional diameter toward the distal end of the drain port.

29. The liquid recovery filter assembly of claim 27 wherein the drain port valve stem further comprises a drain port valve stem O-ring channel formed between the distal end of the valve stem and the radial bore, wherein the filter assembly further comprises a drain port valve stem O-ring secured in the drain port valve stem O-ring channel and dimensioned to register against the wall of the drain port outer channel.

30. The liquid recovery filter assembly of claim 28 wherein the drain port valve cap defines a drain valve cap channel dimensioned to fit about an outer wall of the drain port, wherein an inner wall of the drain valve cap is formed with threading to engage with the corresponding threading on the outer wall of the drain port.

31. The liquid recovery filter assembly of claim 29 wherein the drain port valve cap further comprises an annular radially inwardly projecting drain valve cap ridge at a distal end relative to the drain port, and wherein the drain port valve stem defines a drain port cap receiving channel on its exterior surface within which the ridge is positioned, wherein the cross-sectional diameter of an opening defined by the ridge is greater than the cross-sectional diameter of the drain port cap receiving channel and less than the cross-sectional diameter of the drain port valve stem to permit the free rotation of the ridge within the channel.

* * * * *